United States Patent
Inagaki et al.

(10) Patent No.: US 6,504,529 B1
(45) Date of Patent: Jan. 7, 2003

(54) INFORMATION PROCESSOR INPUT DEVICE THEREOF AND DISPLAY DEVICE

(75) Inventors: Yukihide Inagaki, Yokohama (JP); Hideki Kamimaki, Fujisawa (JP); Tsuyoshi Nakagawa, Hadano (JP); Koichi Kimura, Kamakura (JP); Hideaki Gemma, Hadano (JP)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 09/179,870

(22) Filed: Oct. 28, 1998

(30) Foreign Application Priority Data

Oct. 28, 1997 (JP) .............................. 9-295439

(51) Int. Cl.$^7$ ................................................. G09G 5/00
(52) U.S. Cl. ....................... 345/168; 345/158; 345/211; 341/20; 341/22
(58) Field of Search ......................... 345/168, 156–158, 345/161, 211, 163–166; 341/20–23, 176, 173; 725/27

(56) References Cited

U.S. PATENT DOCUMENTS

| | | | | |
|---|---|---|---|---|
| 5,307,297 A | * | 4/1994 | Iguchi et al. | |
| 5,877,747 A | * | 3/1999 | Kitao et al. | 345/160 |
| 6,072,520 A | * | 6/2000 | Yuen et al. | 725/27 |
| 6,262,713 B1 | * | 7/2001 | Brusky et al. | 345/158 |

FOREIGN PATENT DOCUMENTS

| | | |
|---|---|---|
| JP | 5108257 | 4/1993 |
| JP | 6195163 | 7/1994 |

OTHER PUBLICATIONS

Jordan, Edward Et Al. "Reference Data for Engineers" Howard W. Sams & Co., 7$^{th}$ Edition pp. 2–10 through 2–12, 1985.*

* cited by examiner

Primary Examiner—Richard Hjerpe
Assistant Examiner—Frances Nguyen
(74) Attorney, Agent, or Firm—Antonelli, Terry, Stout & Kraus, LLP

(57) ABSTRACT

An information processor including a keyboard, a main body and a display device. The keyboard is provided with plural infrared-ray emission elements which are located at different positions so as to face in different directions, and an identifying code setting switch for setting the identification code of the keyboard into an infrared-ray signal transmitted from each infrared-ray emission element. The main body includes plural infrared-ray receiving elements which are located at different positions so as to face in different directions, an identifying code setting switch for setting the identification code of the keyboard, and a keyboard controller for judging whether the same identification code as set by the identification code setting switch is contained in the infrared-ray signal which is received by any one of the infrared-ray receiving elements.

35 Claims, 39 Drawing Sheets

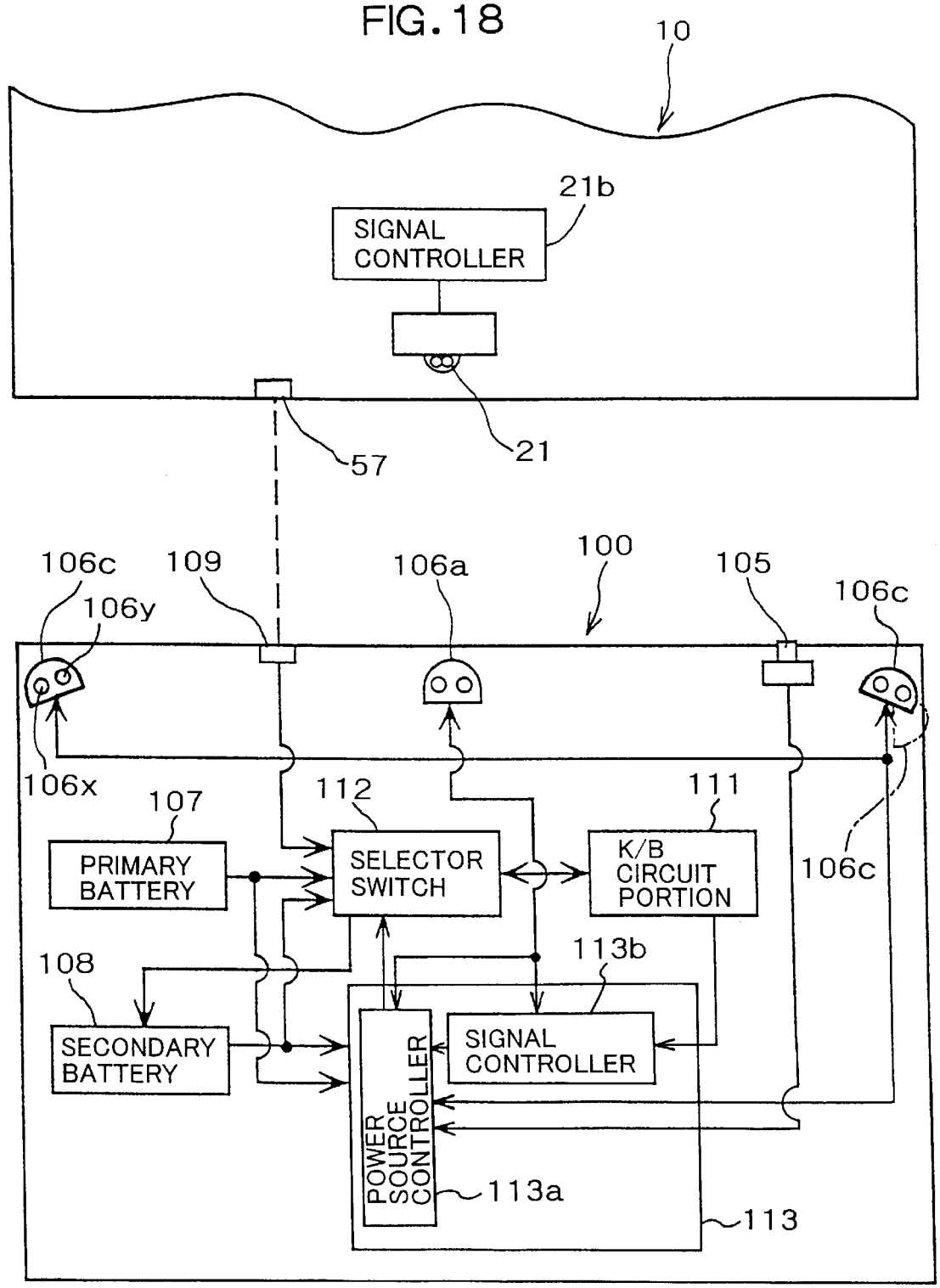

DATA

INFORMATION PROCESSOR INPUT DEVICE THEREOF AND DISPLAY DEVICE

BACKGROUND OF THE INVENTION

1. Field of the Invention

The present invention relates to an information processor, an input device thereof and a display device, and particularly to a communication technique for performing communications between an input device and the main body of an information processor containing CPU or a display device.

2. Description of the Related Art

One type of information processor, known as a "personal computer" is disclosed in Japanese Laid-open Patent Application No. Hei-6-195163, for example.

The information processor disclosed in the above publication comprises a main body having a CPU, a keyboard connected to the main body through a cable, and a cordless key unit which transmits/receives signals to/from the keyboard under a wireless (radio) condition. The cordless key unit is provided with a transmitter for transmitting infrared-ray signals or the like, and the keyboard is provided with a receiver for receiving the infrared-ray signals or the like. The signal from the transmitter of the cordless key unit is received by the receiver of the keyboard, and then transmitted to the main body through the cable.

Further, an information processor disclosed in Japanese Laid-open Patent Application No. Hei-5-108257 comprises a mouse having a transmitter for transmitting infrared-ray signals and a main body thereof which contains a receiver for receiving the infrared-ray signals.

Each of the above information processors is designed so that data transmission/reception (data communication) between the main body of the information processor and the keyboard or the mouse serving as input means is performed under a wireless (radio) condition (i.e., each information processor is developed in order to perform the cordless communication).

Recently, information processors are being used under such an environment as shown in FIG. 40. When a desktop personal computer 1 is used as the information processor, it is a recent tendency that the depth dimension of the image processor is large because a CRT is used as a display device 2 and thus the information processor takes up a large amount of space on a desk. For example, most business men, dealers relating to the securities business, etc. usually use portable computers 3 in addition to their desk top type computes because they are required to often arrange data, make data files open, etc. at other places (which are remote from their offices). Therefore, when each of them puts his/her portable personal computer 3 on his/her desk in addition to a large-size desktop personal computer 1, and further puts documents and writing materials on the desk, the effective area on the desk in which the user can freely work is remarkably reduced, and also the top of the desk becomes very cluttered.

SUMMARY OF THE INVENTION

As described above, in many cases, various equipment, documents, writing materials, etc. are arranged in a disorderly manner around the information processor on the desk. Therefore, the conventional information processors have such a problem that when documents or the like are located between the main body of the information processor and the cordless input means, a communication problem may occur between the main body and the input means.

The present invention has been implemented in view of the problem of the prior art, and has an object to provide an information processor, an input device thereof and a display device which can suppress the communication problem between the main body of the information processor or the display device and the input device to the minimum level.

Therefore, in order to attain the above object, a first information, processor according to the present invention which includes a main body having a CPU for performing various data processing, an input device for inputting data to the main body and a display device for displaying the data on a screen in accordance with an instruction from the main body, is characterized in that the input device includes:

plural input-side transmission means which transmit signals under wireless (radio) conditions and are disposed at different positions so as to face in different directions;

input-side identification code setting means for setting an identification code of the input device in the signals to be transmitted from the input-side transmission means, one of the main body and the display device includes:

body-side reception means for receiving the radio signals from the input-side transmission means; and body-side identification code setting means for setting the identification code of the input device, and the main body includes signal control means for judging whether the same identification code as set by the body-side identification code setting means exists in the signal received by!the body-side reception means, and processing the signals received by the body-side reception means.

A second information processor to attain the above object is characterized in that in the first information processor, a plurality of body-side reception means are provided, and the plural body-side reception means are provided at different positions from one another.

A third information processor to attain the above object is characterized in that in the second information processor, the main body has a body cover having a front surface and right and left side surfaces, and the plural body-side reception means are respectively provided on the front surface, the left side surface and the right side surface, respectively.

A fourth information processor to attain the above object is characterized in that in the third information processor, a signal directivity guide portion is provided to each of the left side surface and the right side surface of the body cover to enhance the reception performance of each of the body-side reception means provided to the left side surface and the right side surface for radio signals transmitted from the front-surface side direction.

A fifth information processor to attain the above object is characterized in that in the second information processor the display device has a display screen and a display device cover which covers the edge of the display screen and has a front surface at the same side as the display screen, and at least one of the plural body-side reception means is provided to the front surface of the display device cover.

A sixth information processor to attain the above object is characterized in that in the first information processor, the plural input-side transmission means are input-side optical signal transmission means for transmitting optical signals as the radio signals, the body-side reception means is body-side optical signal reception means for receiving the optical signals as the radio signals, and the body-side optical signal reception means includes an optical guide having an optical input portion for receiving the optical signal and an optical output portion for outputting the optical signals from the optical input portion, and a light receiving element for receiving the optical signals from the optical output portion of the optical guide and converting the optical signals to electrical signals.

A seventh information processor to attain the above object is characterized in that in the sixth information processor the optical guide is designed such that the optical input portion has at least a one-dimensional spread, and the optical signal received at any position of the optical input portion is guided to the optical output portion.

An eighth information processor to attain the above object is characterized in that in the sixth information processor the body-side optical signal reception means has a plurality of optical guides, the respective optical input portions of the plural optical guides are located at different positions from one another, and each of the optical output portions of the plural optical guides is located so that the light receiving element can receive the optical signal from each optical output portion.

A ninth information processor to attain the above object is characterized in that in the seventh information processor, the main body includes a body cover having a front surface, and the at least one-dimensionally-spreading optical input portion of the optical guide is exposed from at least the front surface of the body cover.

A tenth information processor to attain the above object is characterized in that in the seventh information processor, the display device includes a display screen and a display device which covers the edge of the display screen and has a front surface formed at the same side as the display screen, the at least one-dimensionally spreading optical input portion of the optical guide being exposed from at least the front surface of the display device cover.

An eleventh information processor to attain the above object is characterized in that in any one of the first to tenth information processors, the input device has signal control means for adding data corresponding to a series of operations from the external of the input device into the radio signals transmitted from the plural input-side transmission means, and controlling the respective input-side transmission means to transmit the radio signals containing the same data plural times.

A twelfth information processor to attain the above object is characterized in that in any one of the first to fourth information processors and the sixth to ninth information processors, the input device is a keyboard, each of the main body and the keyboard has a connection end face through which the main body and the keyboard are mutually connected to each other, the connection end face of the main body is provided with the body-side reception means, normal-use transmission means which is one of the plural input-side transmission means is provided to the connection end of the keyboard so as to confront the body-side reception means when the keyboard is connected to the main body, and the keyboard includes connection detection means for detecting whether the connection with the main body is established, and power source control means for allowing only the normal-use transmission means in the plural input-side transmission means to perform signal transmission when the connection with the main body is detected by the detection means and allowing all the input-side transmission means to perform the signal transmission when the disconnection from the main body is detected by the connection detection means.

A thirteenth information processor to attain the above object is characterized in that in any one of the first to eleventh information processors, the input device is a keyboard, and each of the main body and the keyboard has a connection end face through which the connection is established therebetween, the main body includes a power source circuit for supplying power to various types of operating components containing the CPU and a power supply terminal for supplying power from the power source circuit to the keyboard, the keyboard includes a primary battery accommodating portion in which a primary battery for supplying power to the various types of operating components mounted in the keyboard is accommodated, a secondary battery which is chargeable and serves to supply power to the various types of operating components mounted in the keyboard, a power receiving terminal connected to the secondary battery, the power receiving terminal being connected to the power supply terminal of the main body when the connection with the main body is established, switching means for allowing only one of the primary battery and the secondary battery to supply the power to the various types of operating components mounted in the keyboard, and power source control means for instructing the switching means to preferentially use a predetermined one of the primary battery and the secondary battery, and detecting a power amount stocked in each of the primary battery and the secondary battery, and instructing the switching means to use the other battery when the power amount of the predetermined one battery is below a predetermined power amount.

In order to attain the above object, a fourteenth information processor including a main body having CPU for performing various types of processing, an input device for inputting data to the main body and a display device for performing a screen display in accordance with an instruction from the main body, is characterized in that one of the input device, the main body or the display device includes: one or more first transmission/reception means each comprising transmission means for transmitting signals under radio conditions and reception means which receives the signal under the radio conditions and is provided so as to be integral with or adjacent to the transmission means; and signal control means for controlling the transmission means of the first transmission/reception means so that when the reception means of any one of the one or more transmission/reception means receives a radio signal, the transmission means of the transmission/reception means concerned is controlled to transmit a reception establishment signal in cooperation with the reception means, and the other of the input device and the main body or the display device includes: a plurality of second transmission/reception means each comprising transmission means for transmitting signals under the radio conditions, and reception means which receives signals under the radio conditions and is provided so as to be integral with or adjacent to the transmission means; and power source control means for controlling power supply to the transmission means of the plural second transmission/reception means so that when at least one of the plural second transmission/reception means receives the reception establishment signal, it is assumed according to a predetermined rule that communication is established between one of the second transmission/reception means and the first transmission/reception means transmitting the reception establishment signal, and the power supply to the transmission means of the second transmission/reception means concerned is continued while the power supply to the other transmission means of the second transmission/reception means is intercepted.

A fifteenth information processor to attain the above object is characterized in that in the fourteenth information processor, the reception establishment signal is the same as the signal transmitted from the second transmission/reception means.

A sixteenth information processor to attain the above object is characterized in that in the fourteenth or fifteenth information processor, the rule for the reception of the reception establishment signal by the plural second transmission/reception means is determined so that one of the second plural transmission/reception means which receives the earliest reception establishment signal or receives the strongest reception establishment signal is set as the second transmission/reception means which establishes the communication with the first transmission/reception means.

A seventeenth information processor to attain the above object is characterized in that in any one of the fourteenth to sixteenth information processors, the second transmission/reception means is further provided with signal control means, and when, under the condition that the communication establishment between one second transmission/reception means and the first transmission/reception means is judged by the power source control means, another second transmission/reception means receives a radio signal from another equipment, the signal control means independently controls each of signals which are transmitted/received to/from both the one second transmission/reception means and the other second transmission/reception means which receives the radio signal from the other equipment.

An eighteenth information processor to attain the above object is characterized in that in the seventeenth information processor, when, under a condition that the communication establishment between one second transmission/reception means and the first transmission/reception means is judged by the power source control means and another second transmission/reception means receives a radio signal from another equipment, so that it is required to transmit signals from the transmission means of the other transmission/reception means to the other equipment, the power control means is made to re-start the power supply to the transmission means of the other second transmission/reception means.

A nineteenth information processor to attain the above object is characterized in that in any one of the fourteenth to eighteenth information processors, at least one of the plural second transmission/reception means is provided so as to be movable or changeable in its facing direction.

A twentieth information processor to attain the above object is characterized in that in any one of the fourteenth to nineteenth information processors, the second transmission/reception means has identification code setting means for setting an identification code thereof in a signal to be transmitted therefrom, and the first transmission/reception means includes identifying code setting means for setting the identification code of the second transmission/reception means, wherein the signal control means of the first transmission/reception means judges whether the same identification code as set by the identification code setting means of the first transmission/reception means exists in the signal received by the first transmission/reception means, and if the same identification code exists, the signal control means processes the signal received by the first transmission/reception means and controls the first transmission/reception means to transmit the reception establishment signal.

A twenty-first information processor to attain the above object is characterized in that in any one of the fourteenth to twelfth information processors, the input device is a keyboard, and each of the main body and the keyboard has a connection end face through which the connection therebetween is made, the connection end face of the main body is provided with the transmission/reception means, the connection end face of the keyboard is provided with one normal-use transmission/reception means of the plural input-side transmission/reception means is provided so as to confront the transmission/reception means of the main body when the keyboard is connected to the main body, and the keyboard includes: connection detection means for detecting whether the connection with the main body is established; and power source control means for controlling the plural transmission/reception means so that only the normal-use transmission/reception means of the plural transmission/reception means is allowed to perform signal transmission when the connection with the main body is detected by the detection means, and all the plural transmission/reception means are allowed to perform signal transmission when the disconnection from the main body is detected by the connection detection means.

A twenty-second information processor to attain the above object is characterized in that in any one of the fourteenth to twenty second information processors, the input device is a keyboard, each of the main body and the keyboard has a connection end face through which the connection therebetween is made, the main body has a power source circuit for supplying power to various types of operating components containing the CPU and a power supply terminal for supplying power from the power source circuit to the keyboard, the keyboard includes a primary battery accommodating portion in which a primary battery for supplying power to the various types of operating components mounted in the keyboard is accommodated, a secondary battery which is chargeable and serves to supply power to the various types of operating components mounted in the keyboard, a power receiving terminal connected to the secondary battery, the power receiving terminal being connected to the power supply terminal of the main body when the connection with the main body is established, switching means for allowing only one of the primary battery and the secondary battery to supply the power to the various types of operating components mounted in the keyboard, and power source control means for instructing the switching means to preferentially use a predetermined one of the primary battery and the secondary battery, and detecting a power amount stocked in each of the primary battery and the secondary battery, and instructing the switching means to use the other battery when the power amount of the predetermined one battery is below a predetermined power amount.

A twenty-third information processor to attain the above object is characterized in that in any one of the first to eleventh information processors and the fourteenth to twentieth information processors, the input device is a keyboard.

A twenty fourth information processor to attain the above object is characterized in that in any one of the first to eleventh information processors and the fourteenth to twentieth information processors, the input device is a mouse.

According to the above-described information processors, the main body or the display device can receive radio signals from the input device at plural places. Therefore, even if any foreign object exists between the main body or the display device and the input device or the orientation of the input device with respect to the main body or the display device is changed, the communication problems between the main body (the display device) and the input device due to these factors can be avoided.

Further, according to the fourteenth to twenty fourth information processors, each of which has the power source control means, the power supply to the transmission means which are not required to be used can be cut-off, so that the power consumption can be reduced. Further, according to the twentieth information processor having the identification code setting means, an apparatus from which a received signal is transmitted can be identified. Therefore, radio interference with another apparatus can be avoided.

BRIEF DESCRIPTION OF THE DRAWINGS

FIG. 18 is a circuit block diagram of the keyboard according to the first embodiment of the present invention;

DETAILED DESCRIPTION OF PREFERRED EMBODIMENTS

Preferred embodiments according to the present invention will be described hereunder with reference to the accompanying drawings.

The information processors according to the following embodiments are designed not only to attain the above object, but also to support the requirements of various users who will increasingly appear in the future, such as users who make presentations at customer sites, users who are sensitive to the style and size of the information processors and users who must work at their homes and work places or at plural different work places, in addition to general users who have only needed to use desktop personal computers.

First, the information processor according to a first embodiment of the present invention will be described with reference to FIGS. 1 to 23.

Figure 6:
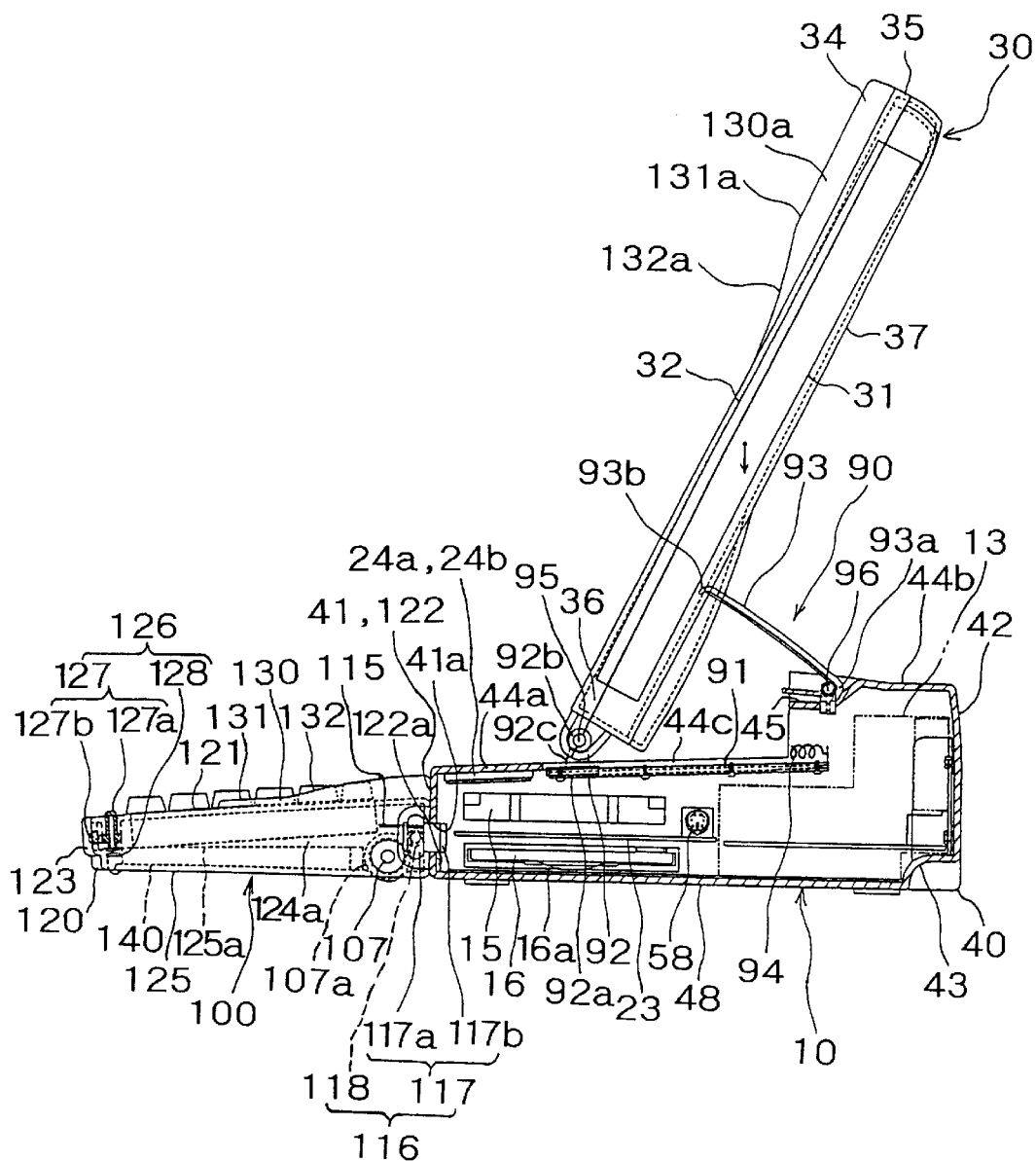
FIG. 6 is a partly-notched right side view of the information processor according to the first embodiment of the present invention (when the display device is set in an open position)

As shown in FIG. 6, the information processor of the first embodiment includes a main body 10 having a high-performance CPU for executing various operations at high speed, a display device 30 for displaying processing results, etc. obtained by the main body 10, a keyboard 100 which is freely detachably mounted on the main body 10, and a palm rest 140 which can be mounted at the lower portion of the keyboard 100.

Figure 3:
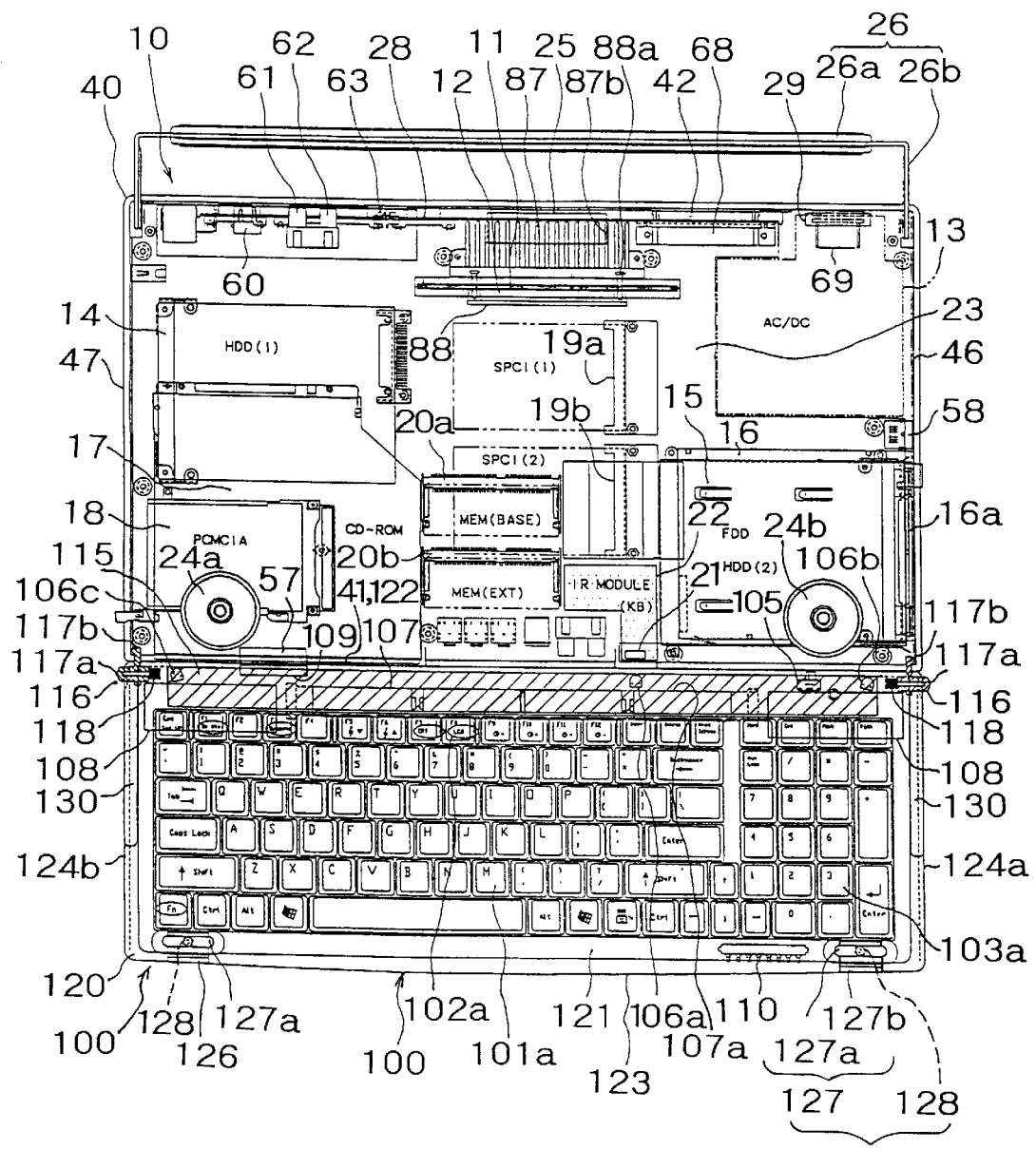
FIG. 3 is a plan view showing the information processor according to the first embodiment of the present invention (when a top cover of a main body is detached)

As shown in FIG. 3, the main body 10 includes a CPU 11 for performing various operations, a memory (not shown), an AC/DC circuit 13, two hard disk drive devices 14 and 15, a floppy disk drive device 16, a CD-ROM driving device 17, a card slot 18 for a PCMCIA (Personal Computer Memory Card International Association)-based card (hereinafter referred to as "PCMCIA card"), two card slots 19a and 19b for a card connected to an SPCI (Small Peripheral Component Interconnect) bus (hereinafter referred to "SPCI card"), two extended memory slots 20a, 20b, an IR terminal 21 for performing transmission/reception of infrared-ray signals, a circuit 22 for the IR terminal 21, a mother keyboard 23 on which the CPU 11, the memory, etc. are mounted, a CPU cooling fan 25 for cooling the CPU 11, a component cooling fan 29 for cooling installed components other than the CPU 11, a cover 40 for covering these parts, and a knob 26 with which the main body 10 is carried.

Figure 4:
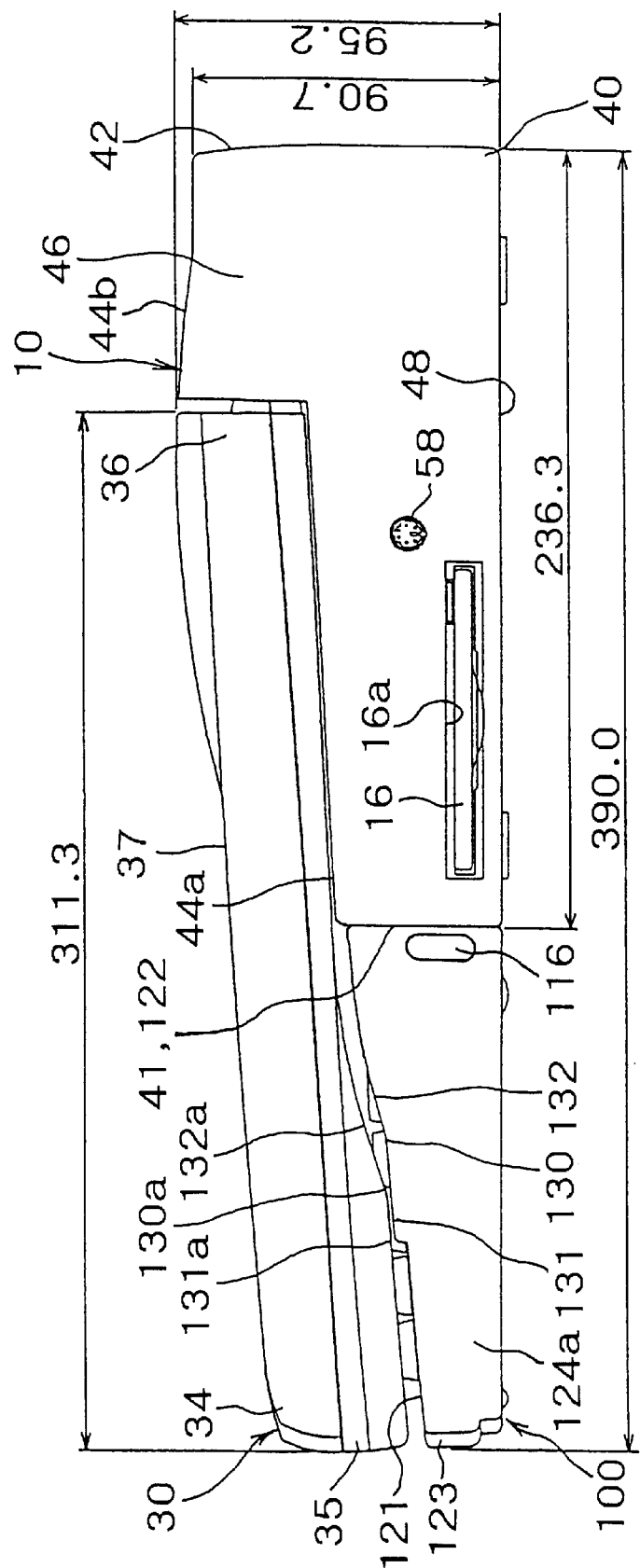
FIG. 4 is a right side view of the information processor according to the first embodiment of the present invention (when the display device is set in the closed position)
Figure 10:
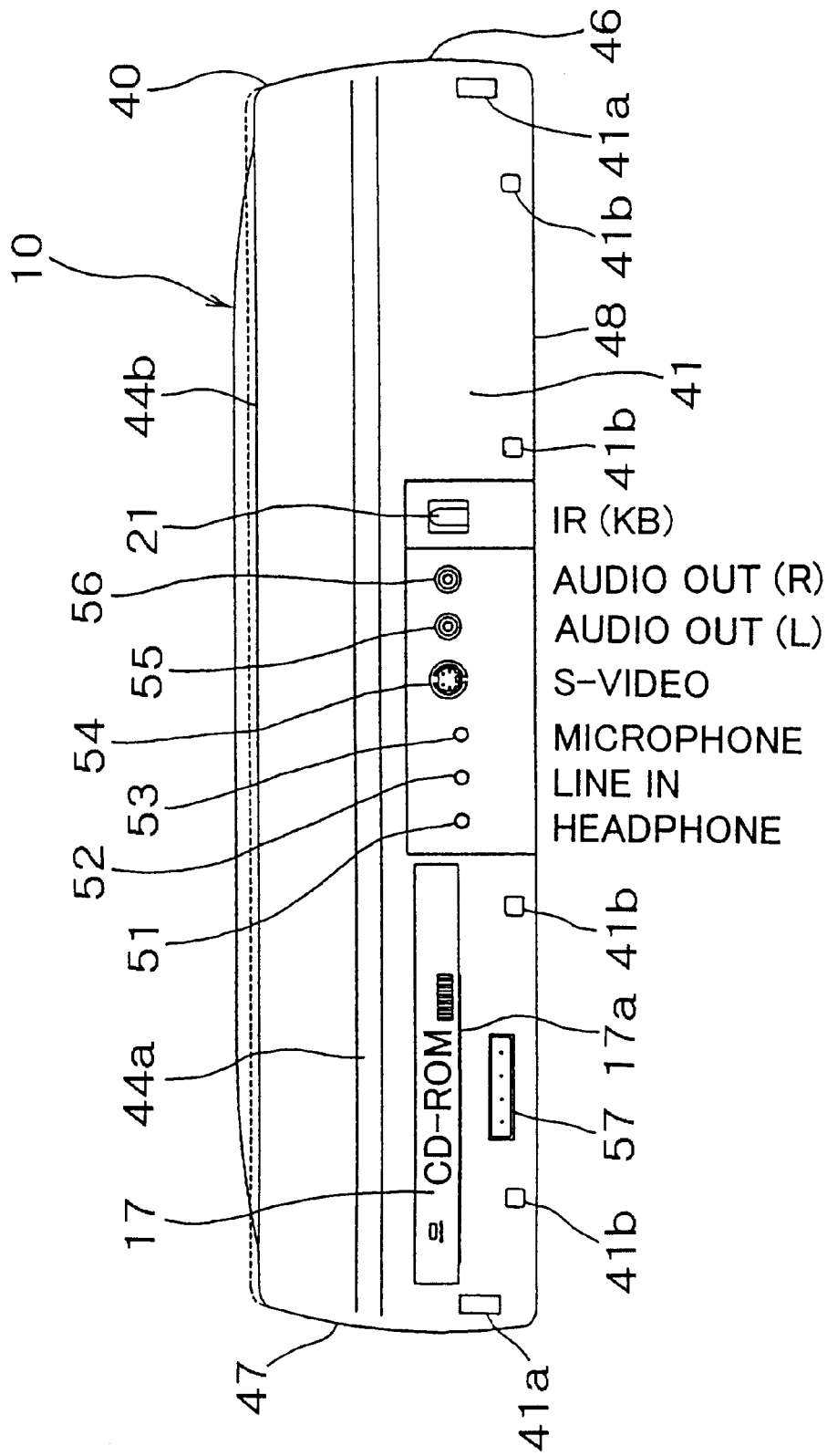
FIG. 10 is a front view showing the information processor according to the first embodiment of the present invention (when the keyboard is detached)

As shown in FIGS. 4 and 10, the main body cover 40 has a front surface (connection end face), a rear surface 42, an upper surface 44, a bottom surface 48, and both side surfaces 46 and 47. The upper surface 44 comprises a rear upper surface 44b located at the rear surface side, and a front upper surface 44a which is located at the front surface side so as to be lower in height than the rear upper surface 44b, so that a step is formed between the rear upper surface 44b and the front upper surface 44a.

As shown in FIG. 3, the CPU 11, the CPU cooling fan 25 and the component cooling fan 29 are disposed at the rear surface side, that is, at the rear portion in the main-body cover 40.

Figure 7:
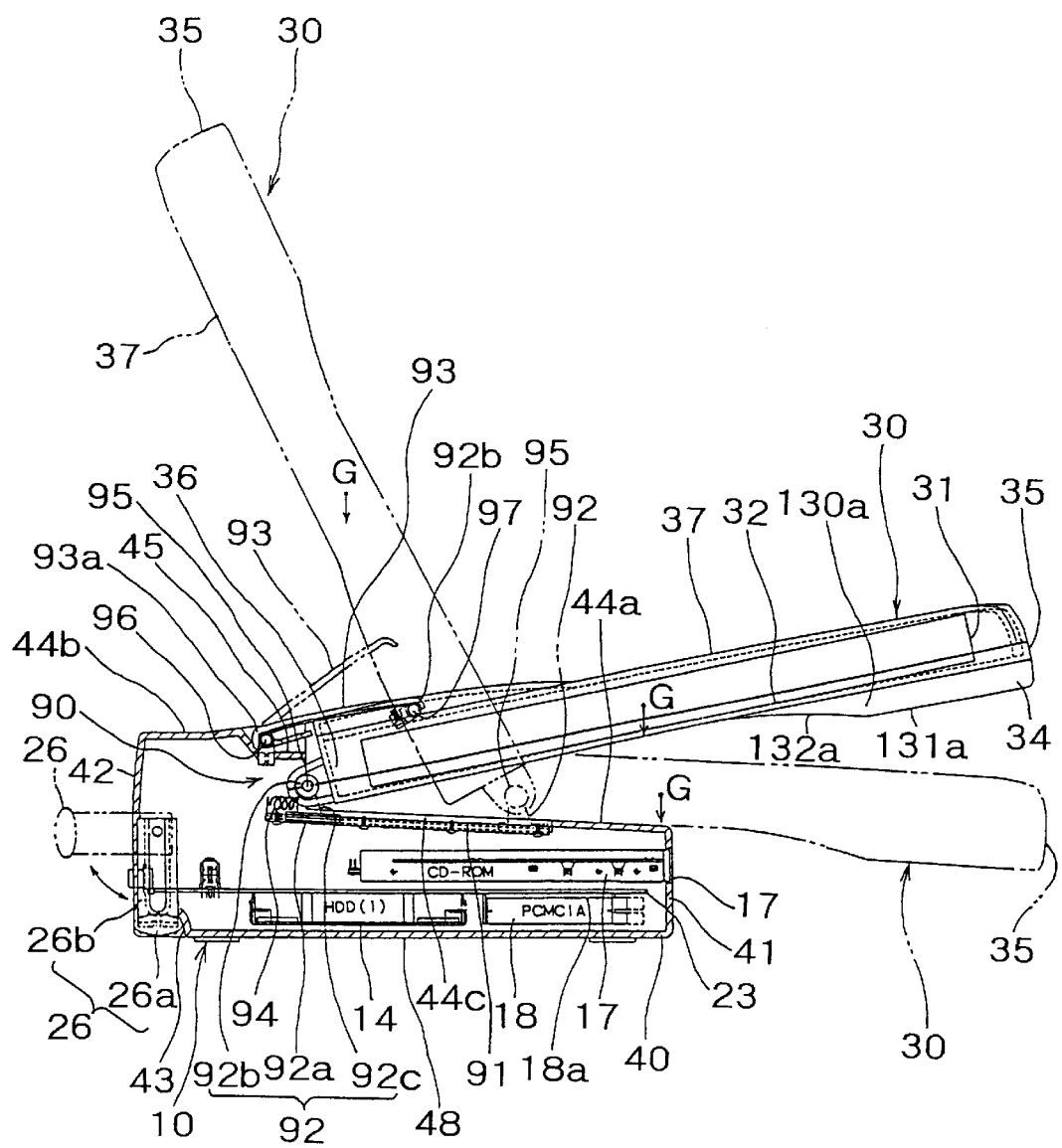
FIG. 7 is a diagram showing the operation of the display device according to the first embodiment of the present invention.
Figure 11:
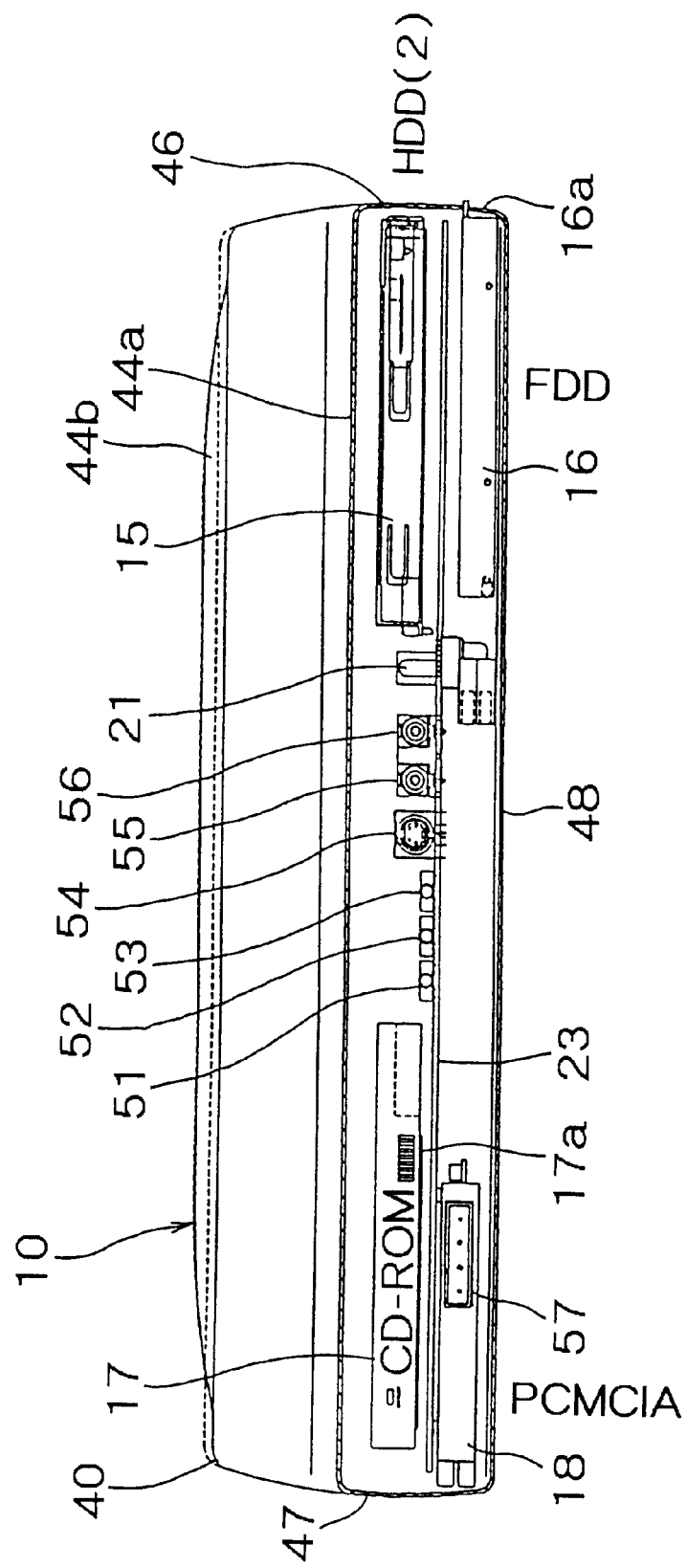
FIG. 11 is a partly-notched front view of the information processor according to the first embodiment of the present invention.

As shown in FIGS. 3, 7 and 11, the first hard disk drive device 14, the PCMCIA card slot 18, and the CD-ROM driving device 17 are disposed at the left side surface side in the main-body cover 40. The first hard disk device 14 is disposed at the rear portion of the left side surface side and at the lower side of the mother board 23, and the PCMCIA card slot 18 is disposed at the front portion of the left side surface side and at the lower side of the mother board 23.

The CD-ROM driving device 17 is disposed at the front portion of the left side surface side and at the upper side of the mother board 23. In place of the CD-ROM driving device 17, a DVD (Digital Video Disk) driving device may be used.

Figure 5:
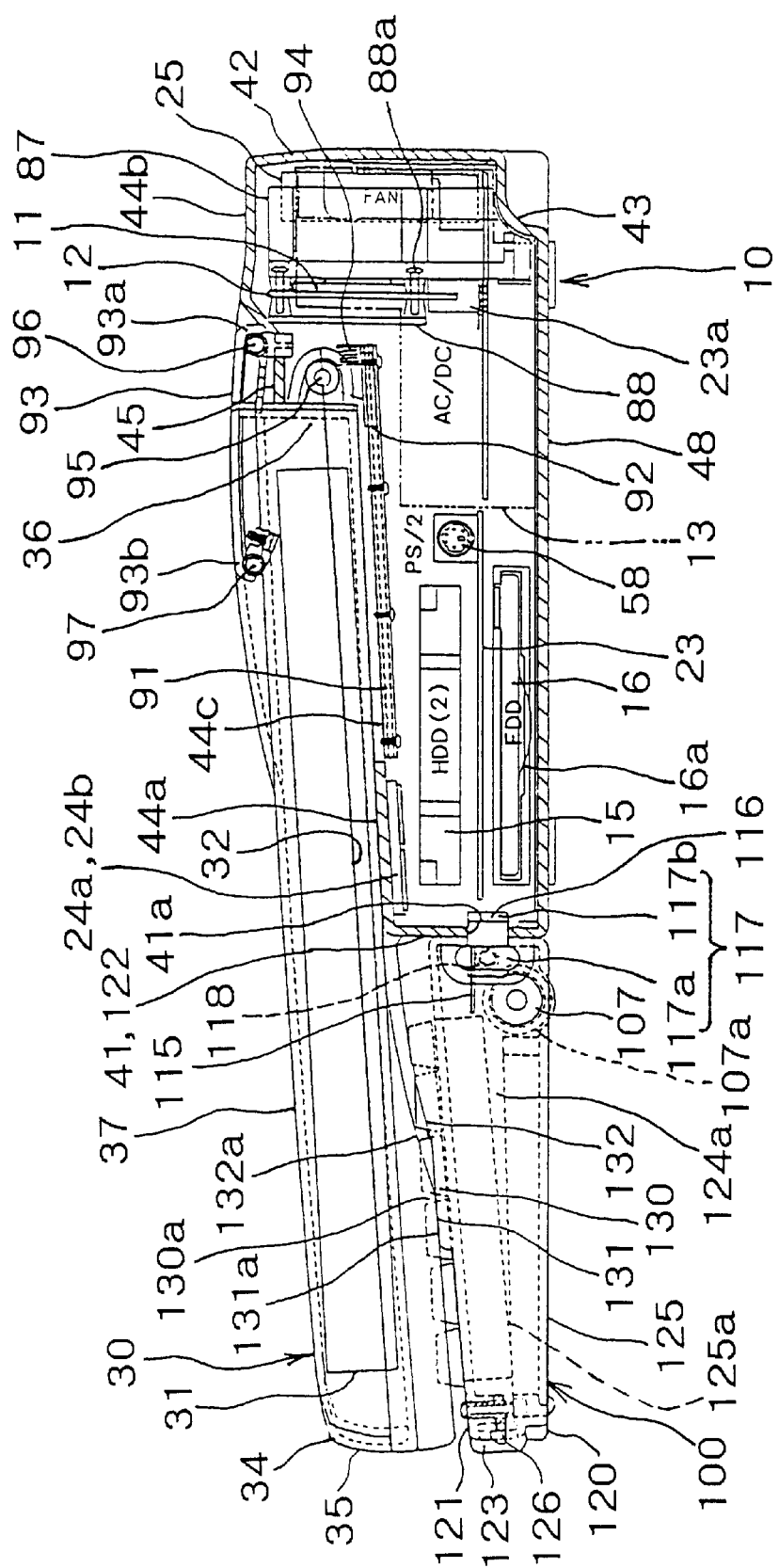
FIG. 5 is a partly-notched right side view of the information processor according to the first embodiment of the present invention (when the display device is set in the closed position)

As shown in FIGS. 3, 5 and 11, the second hard disk drive device 15, the floppy disk drive device 16 and the AC/DC circuit 13 are disposed at the right surface side in the main-body cover 40. The second hard disk drive device 15 is disposed at the front portion of the right side surface side and at the upper side of the mother board 23, and the floppy disk drive device 16 is disposed at the front portion of the right side surface side and at the lower side of the mother board 23. The AC/DC circuit 13 is disposed at the rear portion of the right side surface side.

As shown in FIG. 10, an insertion port 17a through which a CD-ROM is inserted into the CD-ROM driving device 17, connection plugs 51, 52, ..., 56 to various types of acoustic equipment, etc. a keyboard IR terminal 21 for performing transmission/reception of infrared-ray signals with the keyboard 100, a power feeding connector 57 for supplying power to the keyboard 100 are provided on the front surface (connection end face) 41 of the main-body cover 40. Specifically, as connection plugs there are provided a headphone plug 51 for connecting a headphone, a line-in plug 52 for taking in sounds from acoustic equipment, a microphone plug 53 for taking in audio data of a microphone, an S-VIDEO plug 54 for taking in video/audio data of S-VIDEO, and sound output plugs 55 and 56. On the front surface 41 of the main-body cover 40 there are formed a pawl insertion hole 41a into which a link pawl portion 117b of the keyboard 100 as described later is inserted, and a projection engaging hole 41b into which a link reinforcing projection 122a of the keyboard 100 as described later is inserted.

As shown in FIGS. 4 and 5, on the right side surface of the main body cover 40 there are provided an insertion port 16a for inserting a floppy disk into the floppy disk drive device 16, and a PS/2 connector 58 which serves as a terminal for input equipment such as the keyboard 100, the mouse or the like, and is based on PS (Personal System)/2 (registered trademark of IBM company of U.S.A).

In this embodiment, the floppy disk insertion port 16a is provided on the right side surface 46 of the main-body cover 40, but it may be provided on the front surface 41 of the main-body cover 40 as in the case of the CD-ROM insertion port 17a. In this case, it is preferable that each of the insertion ports 16a and 17a is provided at the upper portion of the front surface 41 of the main body 10 so as not to face the keyboard 100 when the keyboard 100 is mounted so that a floppy disk or CD-ROM can be inserted/taken out through each of the insertion ports 16a, 17a even in a state where the keyboard 100 is mounted on the front surface 41 of the main body 10.

As shown in FIG. 7, an insertion port 18a through which a PCMCIA card is inserted into the PCMCIA card slot 18 is provided on the left side surface of the main-body cover 40. Further, as shown in FIG. 19, a first CPU heat exhaust port 82 for exhausting heat generated by the CPU 1 is provided on the left side surface 47 of the main-body cover.

Figure 1:
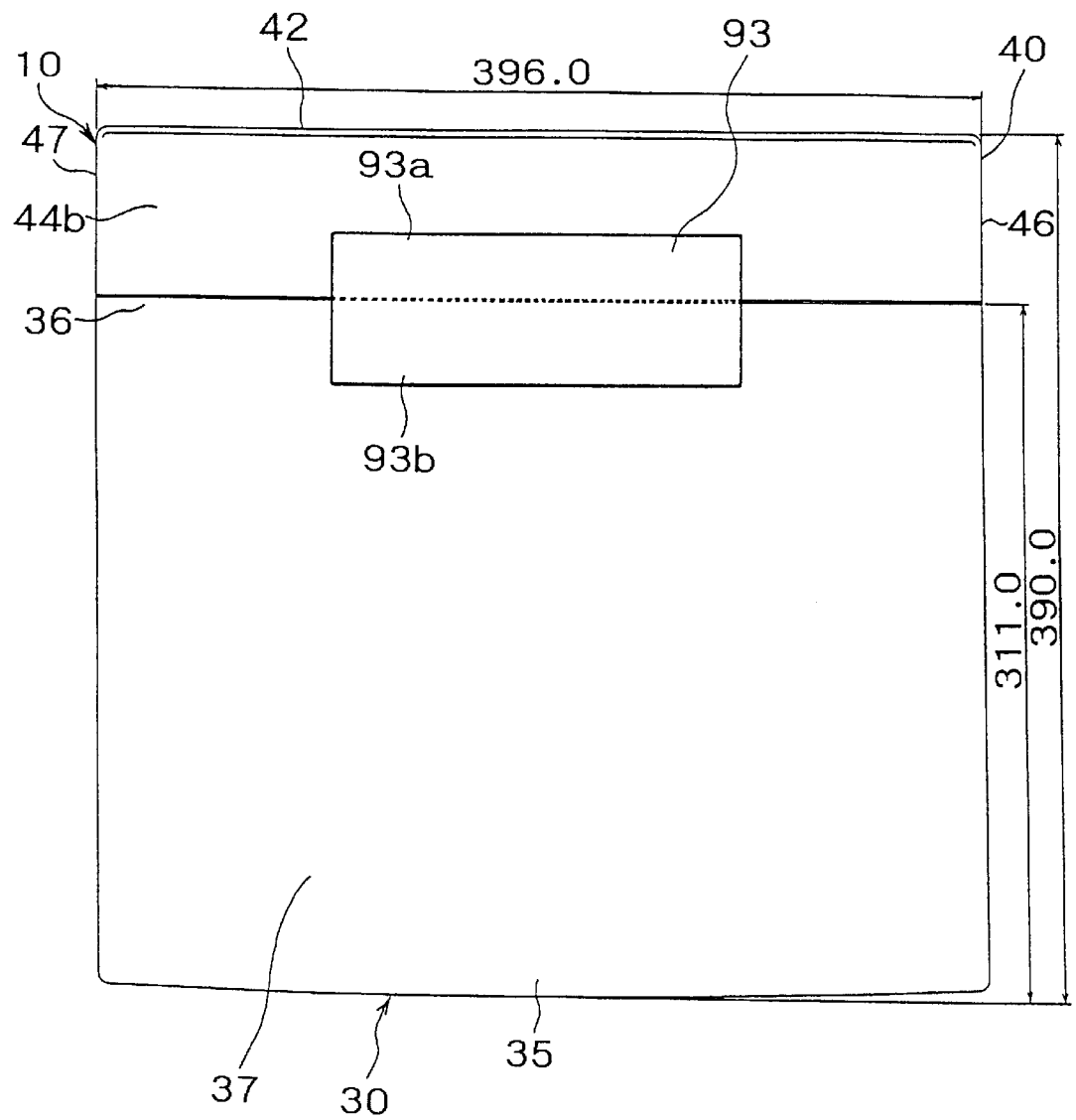
FIG. 1 is a plan view showing an information processor according to a first embodiment of the present invention (when a display device is set in a closed position)
Figure 2:
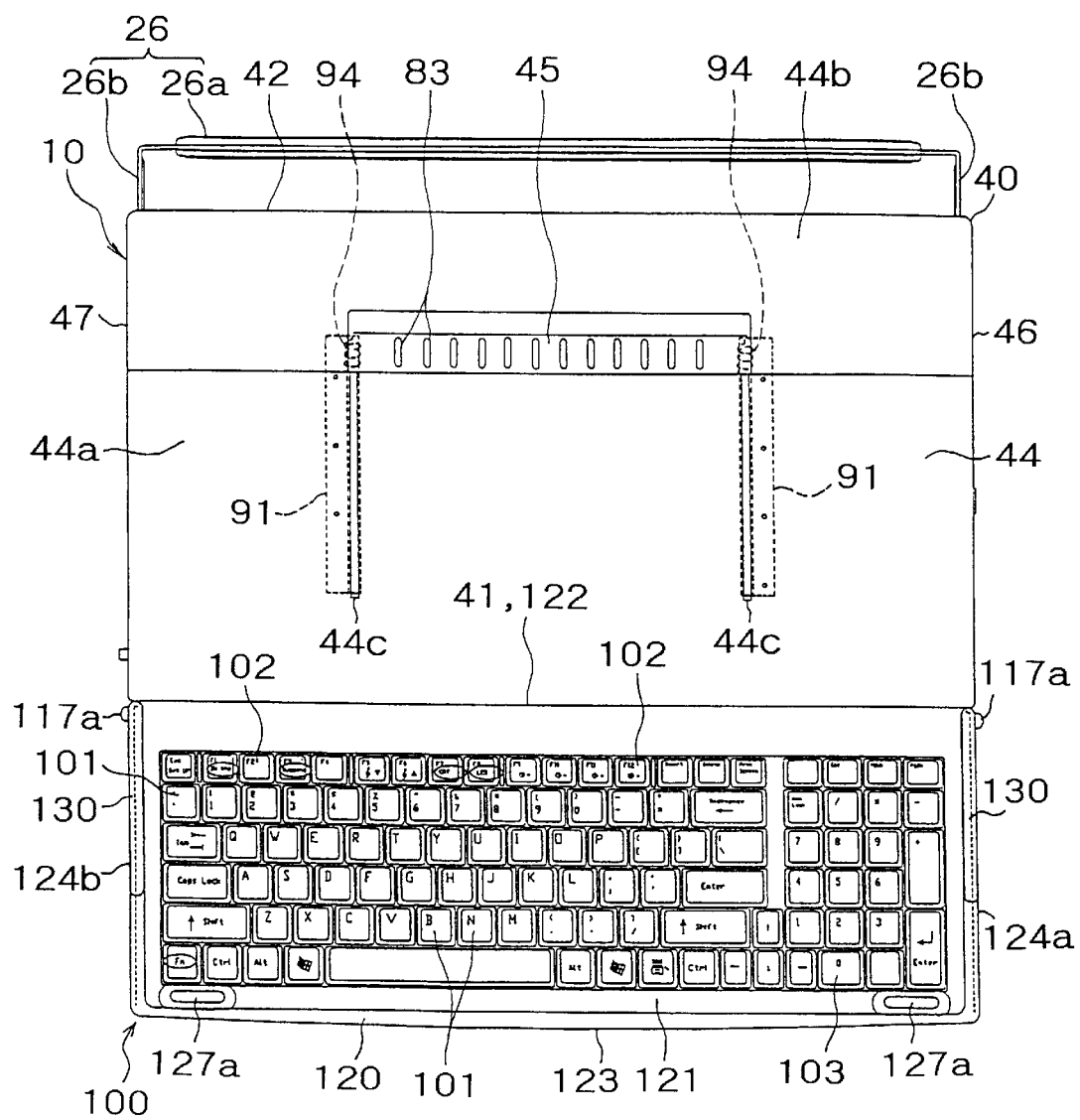
FIG. 2 is a plan view showing the information processor according to the first embodiment of the present invention (when the display device is detached)
Figure 19:
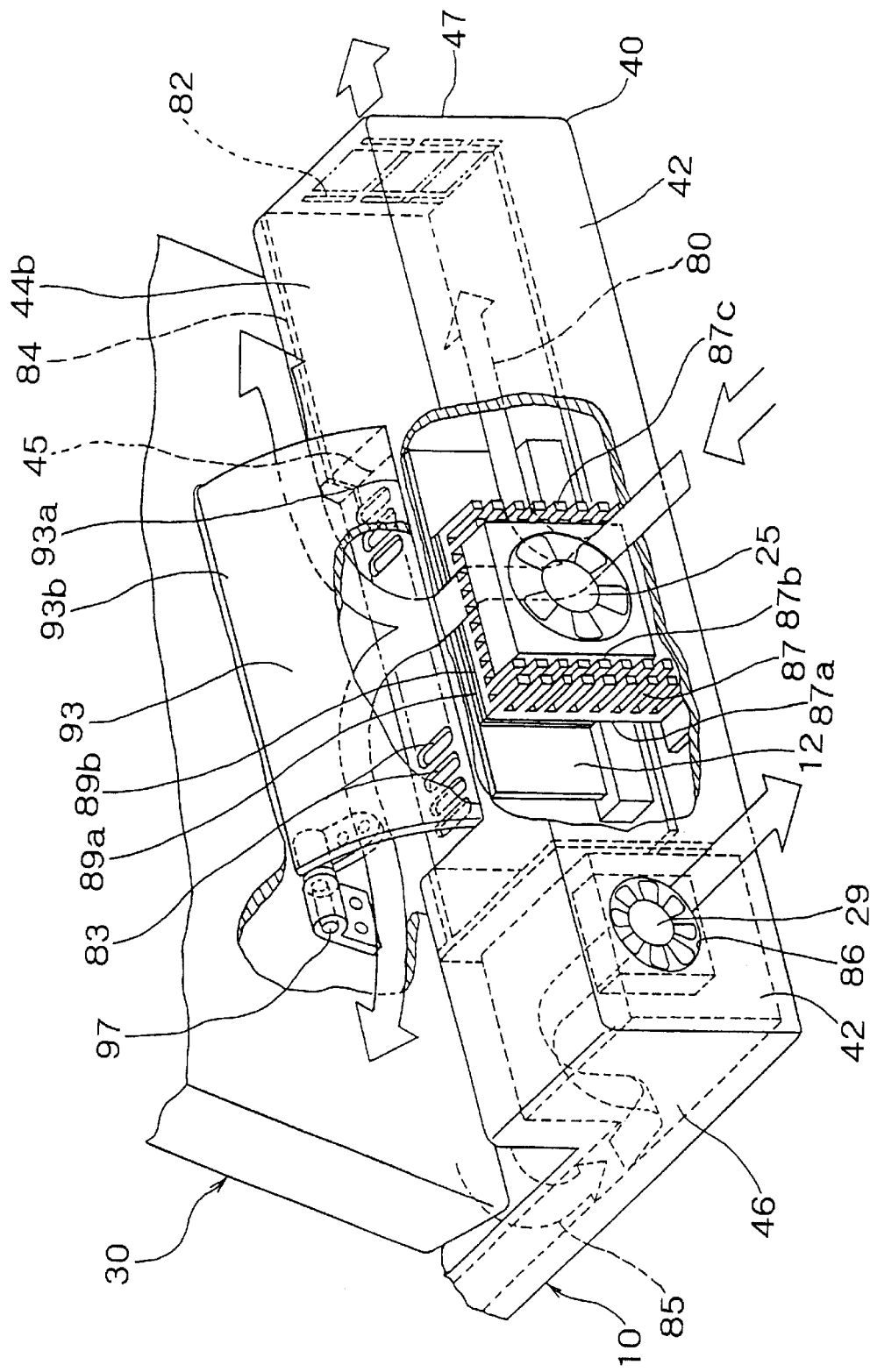
FIG. 19 is a diagram showing the flow of cooling air in the information processor of the first embodiment according to the present invention.

As shown in FIGS. 2 and 19, a retracting recess portion 45 for accommodating a swing arm 93 constituting a part of a link mechanism 90 which serves to link the display device and the main body 10 as described later is formed on the rear upper surface 44b of the main-body cover 40. A second CPU heat exhaust port 83 which penetrates from the inside of the main-body cover to the outside is formed at the bottom of the swing arm accommodating recess portion 45.

Figure 12:
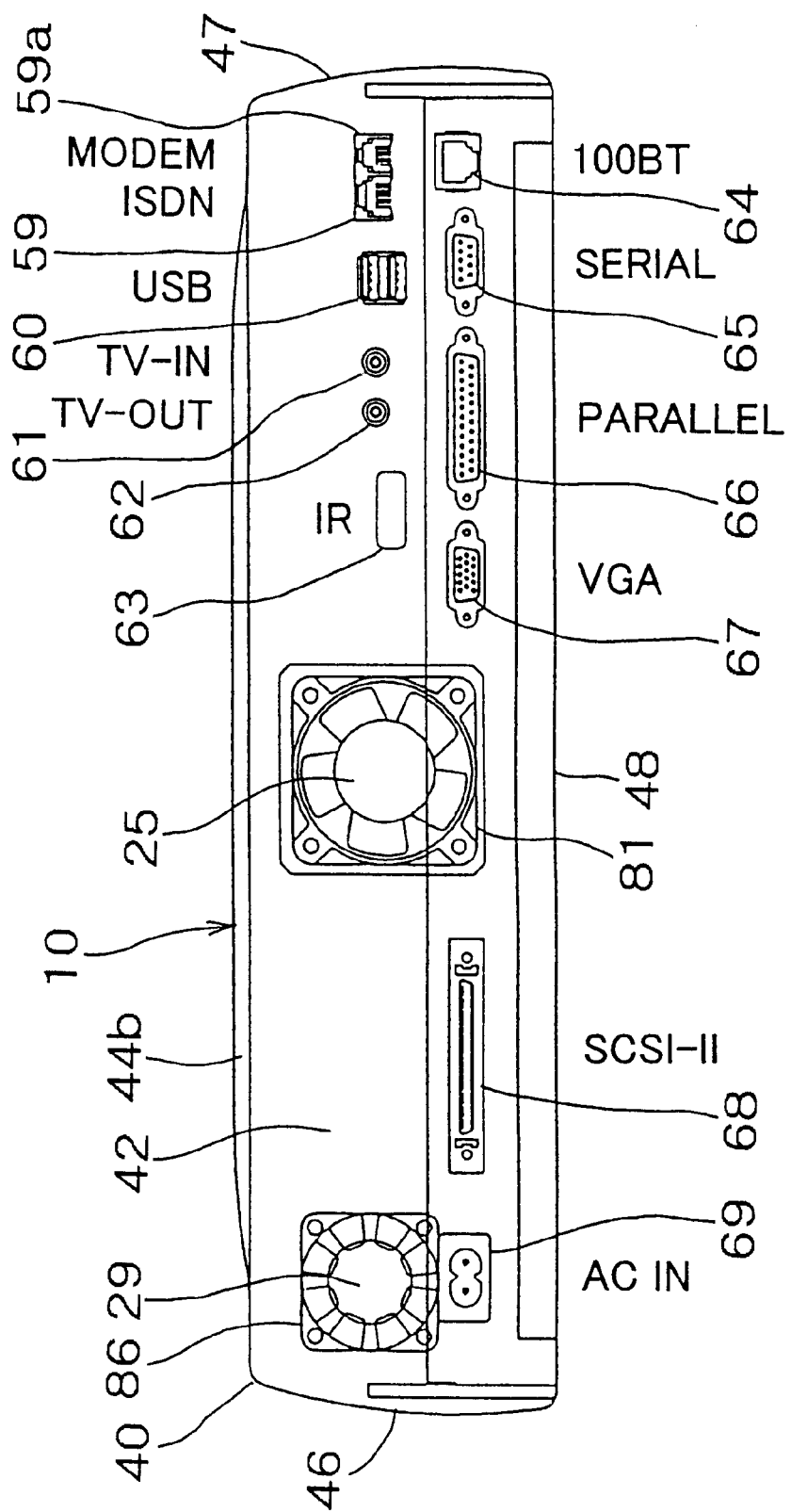
FIG. 12 is a rear view of the information processor according to the first embodiment of the present invention.

As shown in FIG. 12, on the rear surface 42 of the main-body cover 40 there are provided a modem connector 59a, an ISDN connector 59, a USB (Universal Serial Bus) connector 60, a TV-IN plug 61, a TV-OUT plug 62, an IR terminal 63, a 100 BT connector 64, a serial connector 65, a parallel connector 66, VGA (Video Graphics Array) connector 67, SCSI (Small Computer System Interference)-II connector 68, and an AC power source connector 69. The IR terminal provided on the rear surface 42 of the main-body cover 40 performs transmission/reception of infrared-ray signals with equipment other than the keyboard 100, for example, PDA (Personal Digital Assistant) such as an electronic pocket notebook or the like. A CPU cooling air take-in port 81 for taking air to cool the CPU 11, and a component heat exhaust port 86 for exhausting heat generated by parts other than the CPU 11. A CPU cooling fan 25 is provided inside the CPU cooling air take-in port 81, and a component cooling fan 29 is provided inside the part heat exhaust port 86.

Figure 8:
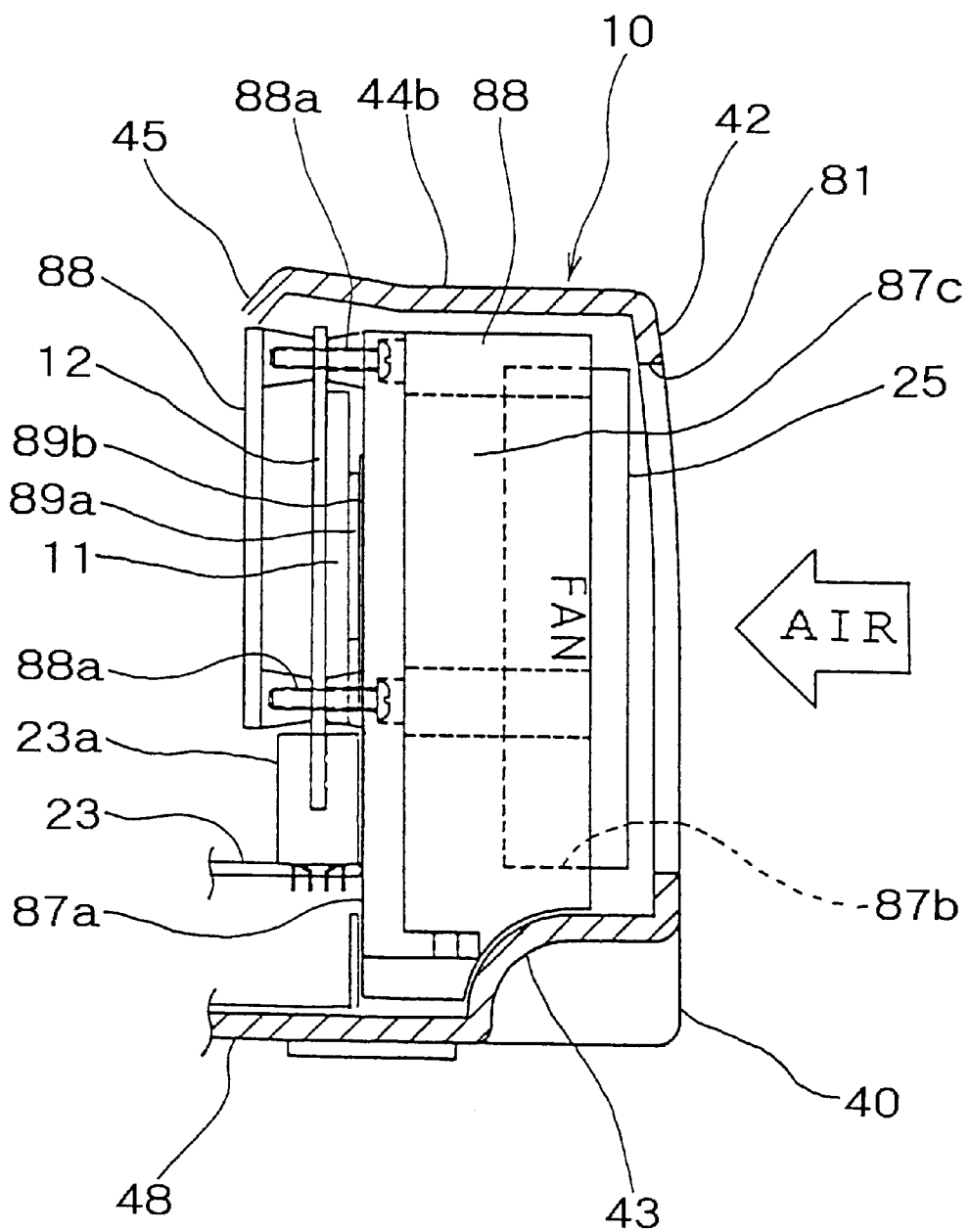
FIG. 8 is a side view showing the surrounding portion of a CPU according to the first embodiment of the present invention.
Figure 9:
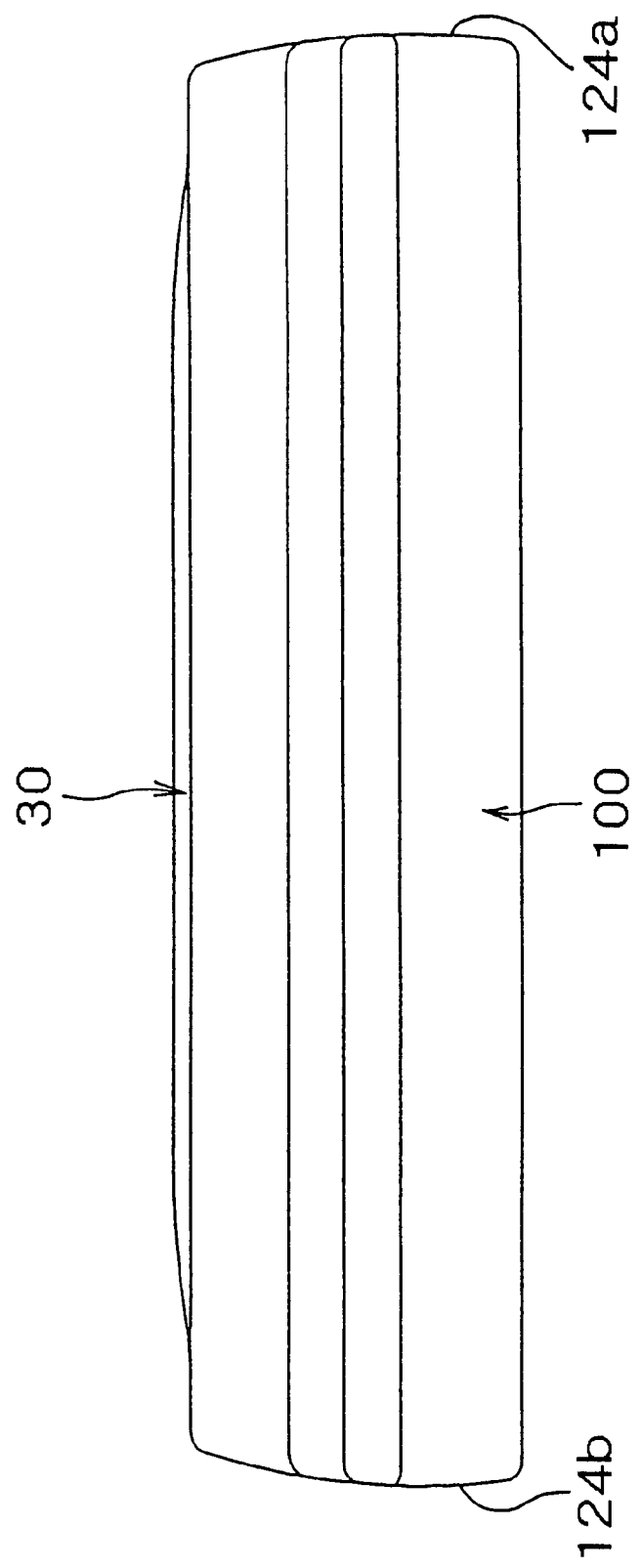
FIG. 9 is a front view showing the information processor according to the first embodiment of the present invention (when the display device is in closed position)

As shown in FIGS. 3, 5 and 8, the CPU chip 11 is mounted on the CPU board 12. The CPU board 12 is connected to the mother board 23 through a connector 23a while it is erected relatively to the mother board 23. A cooling fin 87 is fixed to the CPU board 12 with a screw 88a. The surface 87a of the cooling fin 87 which confronts the CPU chip 11 is flattened. A heat transfer plate 89a which is formed of material having high thermal conductivity is attached to the surface of the CPU chip 11. A thermally conductive flexible contact 89b having high thermal conductivity and high flexibility is disposed between the thermal transfer plate 89a of the CPU chip 11 and the flat surface 87a of the cooling film 87 so as to be brought into close contact with each of the thermal transfer plate 89a and the flat surface 87a of the cooling fin 87. The thermally conductive flexible contact 89b is formed of a mixture of silicon and metal powder. In this case, the CPU chip 11 and the cooling fin 87 are brought into contact with each other through the thermal transfer plate 89a and the thermally conductive flexible contact 89b, however, the CPU chip 11 and the cooling fin 87 may be brought into direct contact with each other. However, in order to enhance the contact between the CPU chip 11 and the cooling fin 87, it is preferable to dispose the thermal conductive contact 89a between the two.

As shown in FIG. 19, a fan accommodating portion 87b in which the CPU cooling fan 25 is mounted is formed at the opposite side to the flat surface 87a of the cooling fin 87, and plural projections 87c which actually serve as fins are formed so as to surround the fan accommodating portion 87b. The CPU cooling fan 25 is secured to the cooling fin 87 while it is accommodated in the fan accommodating portion 87b of the cooling fin 87.

As described above, the CPU 11, the CPU cooling fan 25 and the cooling fin 87 are formed integrally with each other, so that the CPU 11 can be cooled efficiently.

As shown in FIG. 8, a heat radiation plate 88 formed of material having high thermal conductivity is disposed at the opposite side to the mount side of the CPU chip 11. The heat radiation plate 88 is fixed to the CPU board 12 by the screw 88a with which the cooling fin 87 is fixed to the CPU board 12.

As shown in FIG. 3, each terminal exposed from the rear surface 42 of the main-body cover 40 is provided to an aluminum bracket which is provided along the rear surface 42 of the main-body cover 40. The bracket 28 is brought into contact with the cooling fin 87 and serves to efficiently radiate heat from the cooling fin 87. The thermally conductive flexible contact as described above is preferably disposed between the metal bracket 28 and the cooling fin 87 in order to enhance the contact between them.

As described above, since the heat radiation plate 88 and the terminal mount metal bracket 28 as well as the cooling fin 87 are provided to efficiently radiate the heat generated in the high-performance CPU 11, the high-performance CPU 11 can be cooled more efficiently in cooperation with the unification of the CPU cooling fan 25 and the CPU 11.

As shown in FIG. 19, in the main-body cover 40 there is provided a ventilation passage 80 for guiding to the first CPU heat exhaust port 82 and the second CPU heat exhaust port 83 the air which is sucked from the CPU cooling air take-in port 81 by the CPU cooling fan 25 and then warmed because it absorbs heat from the cooling fin 87 and the CPU chip 11. Further, in the main-body cover 40 there is provided a ventilation passage 85 for guiding to the component cooling fan 29 heat from various operating components such as the power source circuit 13, the memory, HDDs 14, 15, etc. except for the CPU 11 and discharging the heat from the component heat exhaust port 86. Each of the ventilation passages 80 and 85 are formed by a partition plate 84 for partitioning the CPU 11 and the various operating components excluding the CPU 11 from each other, and the main-body cover 40. Since the ventilation passage 80 exclusive for CPU and the ventilation passage 85 exclusive for the various operating components excluding the CPU 11, the various operating components can be prevented from being heated by the heat of the CPU 11, and also the cooling effect of the CPU 11 by the CPU cooling fan 25, the cooling fin 87, etc. can be prevented from being reduced by the heat of the various operating components.

The air which absorbs the heat from the CPU 11 and thus is warmed is also exhausted from the second CPU heat exhaust port 83 formed in the rear upper surface 44b of the main body, and the air exhausted from the second CPU heat exhaust port 83 may come into contact with the rear surface 37 of the display device 30 to lower the performance of the display device 30 remarkably. Therefore, a heat guard board formed of material having low thermal conductivity is secured to the rear surface 37 of the display device 30, or the second CPU heat exhaust port 83 may be closed so that the air which is warmed by the CPU 11 is mainly discharged from the first CPU heat exhaust port 82 formed on the left side surface 47 of the main body.

As shown in FIGS. 2 and 7, the knob 26 has a grip portion 26a which is gripped by a user, and arm portions 26b which are formed at both the ends of the grip portion 26a. As shown in FIG. 6, a knob accommodating recess portion 43 for accommodating the grip portion 26a of the knob 26 is formed at the lower portion of the rear surface 42 of the main-body cover 40. As shown in FIG. 7, the arm 26b of the knob 26 is fixed to the rear portion of the main-body cover 40 by a screw so that the grip portion 26a of the knob 26 can be swung between an accommodating position at which the grip portion 26a of the knob 26 is mounted in the knob accommodating recess portion 43 of the main-body cover 40 and an in-use position at which the grip portion 26a of the knob 26 comes out of the knob accommodating recess portion 43 and is located behind the rear surface 42 of the main-body cover 40. Since the knob 26 is provided at the rear surface 42 side of the main body 10 as described above, when a user carries the information processor while holding the knob 26, the weight of the display device 30 acts as force to ensure that the display device 30 is kept in the closed position at all times, so that the display device 30 can be prevented from vibrating with respect to the main body 10.

Figure 13:
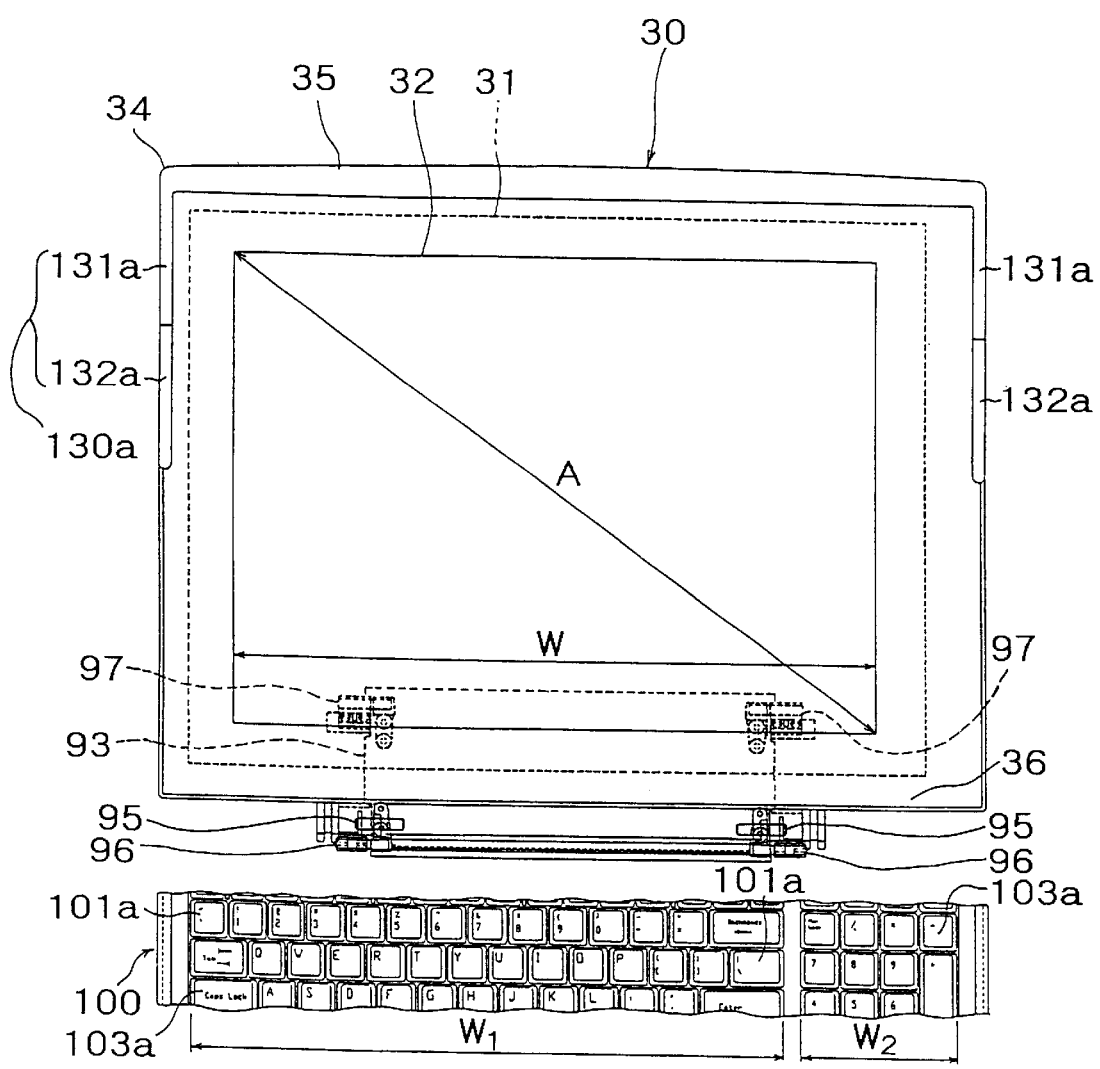
FIG. 13 is a front view showing the display device according to the first embodiment of the present invention.
Figure 14:
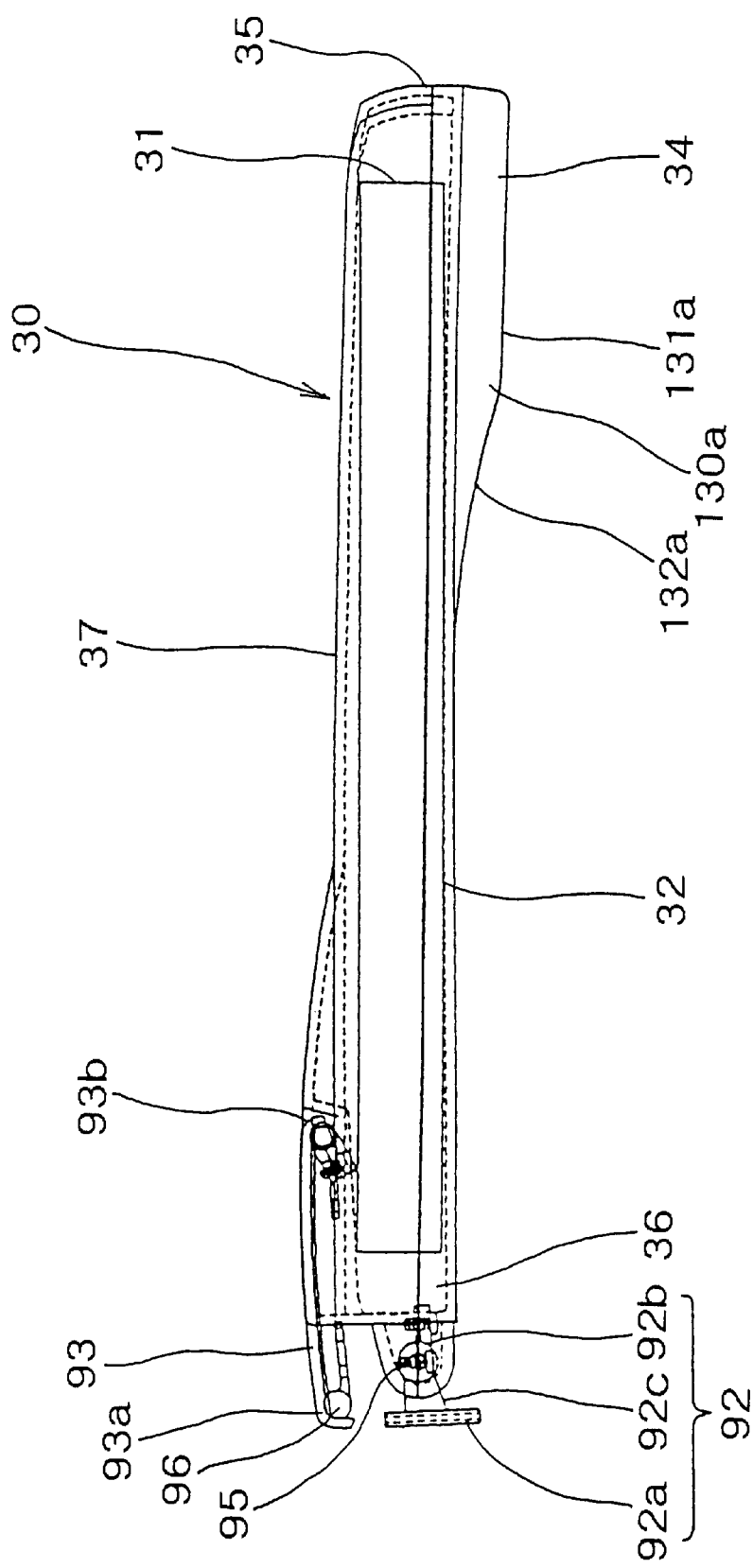
FIG. 14 is a side view showing the display device according to the first embodiment of the present invention.

As shown in FIGS. 13 and 14, the display device 30 has a TFT display panel 31 which is a kind of flat display panel, and a cover 34 which covers the TFT display panel 31. The TFT display panel 31 has a rectangular effective display face 32. As shown in FIG. 13, the dimension W of the long side of the rectangular effective display face 32 is set to be larger than the width W1 in the right-to-left direction of an alpha-numeric key group 101*a* of the keyboard 100 as described later and to be smaller than the sum of the width W1 in the right-to-left direction of the alpha-numeric key group 101*a* and the width W2 in the right-to-left direction of a ten-key group 103*a*. Specifically, the dimension W of the long side of the display screen 32 is set to 12 inches (305 mm). The dimension of the short side of the display screen 32 is set to 9 inches (229 mm), and the dimension A of the diagonal line thereof is equal to 15 inches. The TFT display panel 31 is operated in a full color mode, and the angle of visibility thereof is equal to 160 degrees. In this case, a display panel 31 of 15 inches in size is used, but a 17.5-inch display panel may be used if it can be accommodated in the present cover 34.

As shown in FIGS. 6 and 7, the link mechanism 90 for linking the display device 30 and the main body 10 is provided to the main body 10, and includes a guide member 91 having a guide passage extending in the front-and-back direction of the main body 10, a slider member 92 which is swingably secured to the base end portion 36 of the display device 30 and provided with an engaging portion 92*a* which is swingably engaged in the guide passage of the guide member 91, a swingable, arm 93, one end portion 93*a* of which is swingably secured to the rear portion of a swingable arm accommodating recess portion 45 of the main-body cover 40, and the other end portion 93*b* of which is swingably secured between the base end portion 36 and the tip portion 35 of the display device 30, and a spring 94 disposed at the rear portion side of the guide member 91. In this case, a portion of the display panel cover 34 which extends along one long side of the effective display screen 32 is referred to as the base end portion 36, and a portion of the display panel cover 34 which extends along the other long side of the effective display screen 32 is referred to as the tip portion 35.

The guide member 91 is fixed to the plate member which forms the upper surface 4*a* of the front portion of the main-body cover 40. The slider member 92 has an engaging portion 92*a* which is engagedly inserted into the guide passage of the guide member 91, a shaft securing portion 92*b* (shown in FIG. 14) to which a first swing shaft 95 is secured to link the slider member 92 and the display device 30, and a leg portion 92*c* (shown in FIG. 14) for linking the engaging portion 92*a* and the shaft securing portion 92*b*. The rear portion of the swing arm accommodating recess portion 45 of the main-body cover 40 is provided with a shaft securing portion to which a second swing shaft 96 is secured to link to one end portion 93*a* of the swing arm 93. The base end portion 36 of the display device 30 is provided with a shaft securing portion to which the first swing shaft 95 is secured, and a shaft securing portion to which a third swing shaft 97 for linking to the other end portion 93*b* of the swing arm 93 is secured is provided at a position between the base end portion 36 and the tip portion 35 on the rear surface (the surface confronting the display face 32) of the display device 30. One end portion 93*a* of the swing arm 93 is provided with a shaft securing portion to which the second swing shaft 96 is secured, and the other end portion 93*b* of the swing arm 93 is provided with a shaft securing portion to which the third swing shaft 97 is secured.

That is, the display device 30 is linked to the slider member 92 so as to be relatively swingable around the first swing shaft 95, and also linked to the swing arm 93 so as to be relatively swingable around the third swing shaft 97. The swing arm 93 is linked to the main body 10 so as to be relatively swingable around the second swing shaft 96. The display device 30, the swing arm 93 and the slider member 92 constitute a so-called slider-crank mechanism.

As shown in FIGS. 2, 6 and 7, the upper surface 44*a* of the front portion of the main-body cover 40 is provided with a groove 44*c* extending in the front-to-back direction so that the leg portion of the slider member 92 passes therethrough when the guide member 91 is slid. The spring 94 is provided at the rear side of the guide member 91 so that the leg portion of the slider member 92 comes into contact with the spring 94 when the slider member 92 is located behind the guide member 91.

As shown in FIGS. 4 and 5, when the display device 30 is in the closed position, the display face 32 of the display device 30 and the upper surface 44*a* of the front portion of the main-body 10 confront each other. Further, both the side edges of the display device 30 and both the side edges of the main-body 10 are brought into contact with each other. When the keyboard 100 is mounted in the main-body 10, the display face 32 of the display device 30 is caused to confront the upper surface 121 of the keyboard 100, and the display device 30 covers the overall upper surface 121 of the keyboard 100. The center of gravity G of the display device 30 exists in an upper area of the main-body 10 as shown in FIG. 7. Therefore, even when the keyboard 100 is not mounted in the main body 10, the mount stability of the main body 10 is ensured. Further, at that time, the spring 94 of the link mechanism 90 is brought into contact with the slider member 92 to push the slider member 92 in a forward direction so that the display device 30 is urged to open.

When a user pushes up the tip portion 35 of the display device 30 which is in the closed position, the display device 30 is swung around the first swing shaft 95, and the slider member 92 to which the first swing shaft 95 is secured is forwardly moved, so that the base end portion 36 of the display device 30 is forwardly moved. At this time, since the spring 94 of the link mechanism 90 urges the display device 30 so that the display device 30 is set to the open position as described above, the user can relatively easily set the display device 30 to the open position. When the user pushes up the tip portion 35 of the display device 30, the display device 30 is further swung around the first swing shaft 95, and also the slider member 92 is further moved forward. In this process, the slider member 92 is separated from the spring 94 of the link mechanism 90. When the slider member 92 is moved forward and finally reaches the front end portion of the guide passage, the slider member 92 cannot be moved any further forward and thus stops at that position. Therefore, the display device 30 cannot be further swung due to the relationship with the swing arm 93, and thus it is set in the fully open position.

In the fully open position, the display device 30 is erected from the main body 10 while the tip portion 35 of the display device 30 is inclined slightly backwards. In this state, the center of gravity G of the display device 30 also exists in the upper area of the main body 10 as shown in FIG. 7. That is, the center of gravity G of the display device 30 exists in the upper area of the main-body 10 no matter what position the display device 30 is in. Describing more accurately, the center of gravity G of the display device always exists in the upper area of the area sandwiched between both the side edges of the upper surface 44*a* of the front portion of the main body which are brought into contact with the display device 30 in the closed position. Accordingly, the mount stability of the main body 10 is ensured at all times.

From the viewpoint of visibility of the display screen, it is preferable that the display device 30 is located as close as possible to the front side of the main body 10 when the display device 30 is in the open position. On the other hand, from the viewpoint of the mount stability of the main body 10, it is preferable that when the keyboard 100 is mounted, the display device 30 is located as close as possible to the rear side of the main body 10 in such a range that the keyboard 100 is covered by the display device 30. Therefore, in this embodiment, the slider-crank mechanism is used, and both the viewpoints are satisfied by enabling the display device 30 to make both the swinging and sliding motions simultaneously.

Even when the display device 30 is not in the fully open position but in such an open position that the tip portion 35 thereof is located slightly more ahead than when it is in the fully open position, this state can be maintained. This is because frictional force is applied between each of the swing shafts 95, 96 and 97 and the securing portion thereof and between the slider member 92 and the guide member 91, and also the display device 30 is supported by the two members (the slider member 92 and the swing arm 93).

When the display device in the open position is set to the closed position, the tip portion 35 of the display device 30 is pushed forward and downwards. At this time, the display device 30 is set to the closed position through the reverse process to the above process. The display device 30 is brought,into contact with the spring 94 of the link mechanism 90 just before it is set to the closed position. Therefore, the spring 94 acts as a buffer member, and even when the user abruptly takes action to set the display device 30 to the closed position, the spring 94 can suppress the shock when the display device 30 is set to the closed position.

In this embodiment, the spring 94 is disposed at the rear side of the guide member 91, and it is brought into contact with the display device 30 only when the display position 30 is in the closed position or nearly in the closed position. However, it may be adopted that the spring is disposed at the front side of the guide member 91, one end portion of the spring is secured to the front end portion of the guide member 91 or the main-body cover 40 in the neighborhood of the front end portion, and the other end portion of the spring is secured to the slider member 92. With this construction, the spring force which urges the display device 30 in its open direction acts at all times irrespective of the state of the display device 30. However, when the display device 30 is in the closed position, the spring is extended to the maximum extent and the spring force is maximum, so that the spring 94 can effectively function as the buffer member when the display device 30 is nearly in: the closed position.

Further, in this embodiment, the spring 94 is used as the buffer member. In place of the spring 94, an air or gas cylinder may be used. In this case, a cylinder casing acts as the guide member, a cylinder piston acts as the slider member and air or gas acts as the buffer member. A rack may be used as the guide member and a pinion which is engaged with the rack may be used as the slider member. In this case, a silicone gear may be used as the pinion. The silicone gear is a gear in which silicone grease is provided between the tooth portion of the gear and the rotational shaft thereof, and the silicone grease acts as the buffer member.

Figure 15:
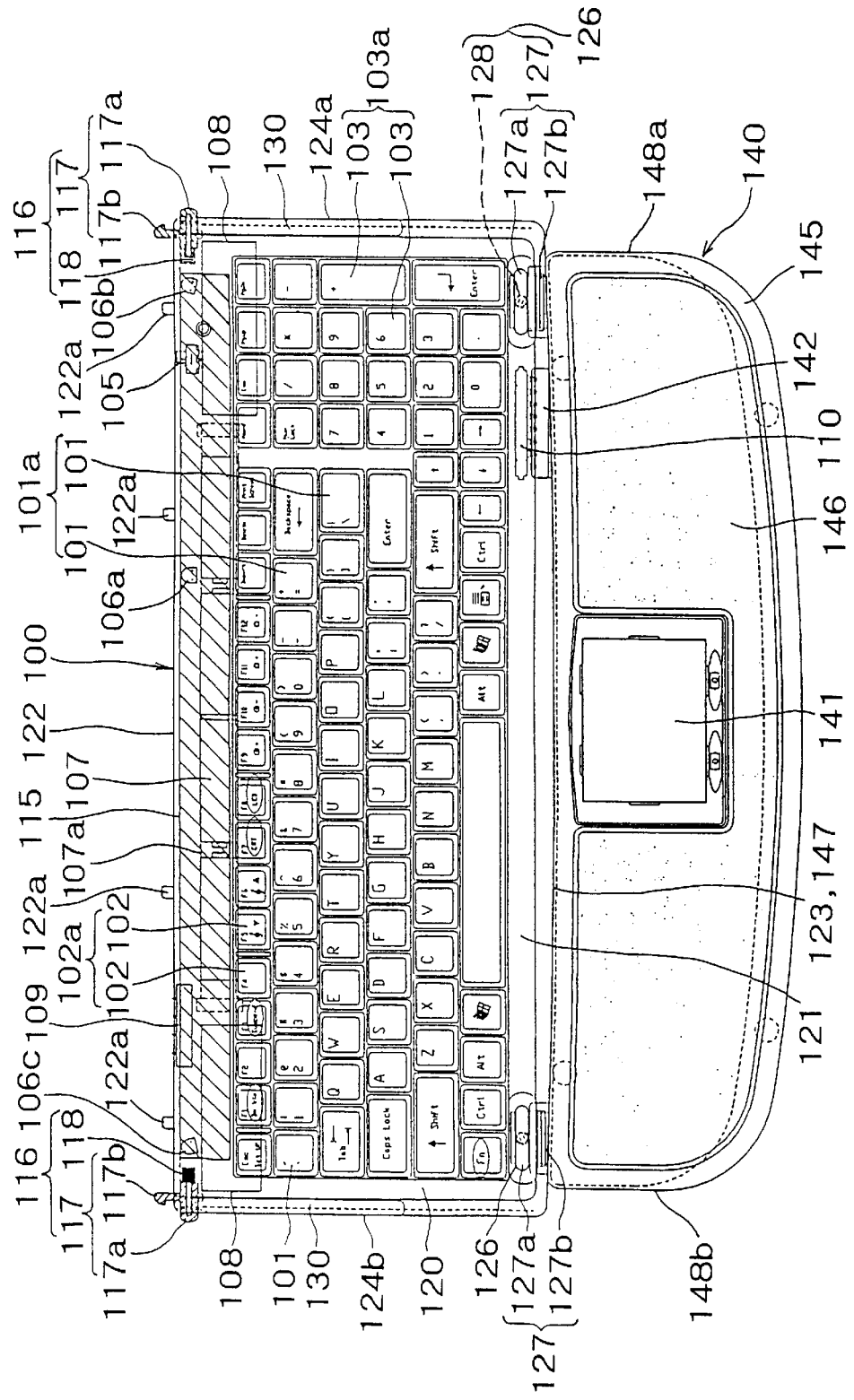
FIG. 15 is a plan view showing a keyboard and a palm rest according to the first embodiment of the present invention.
Figure 16:
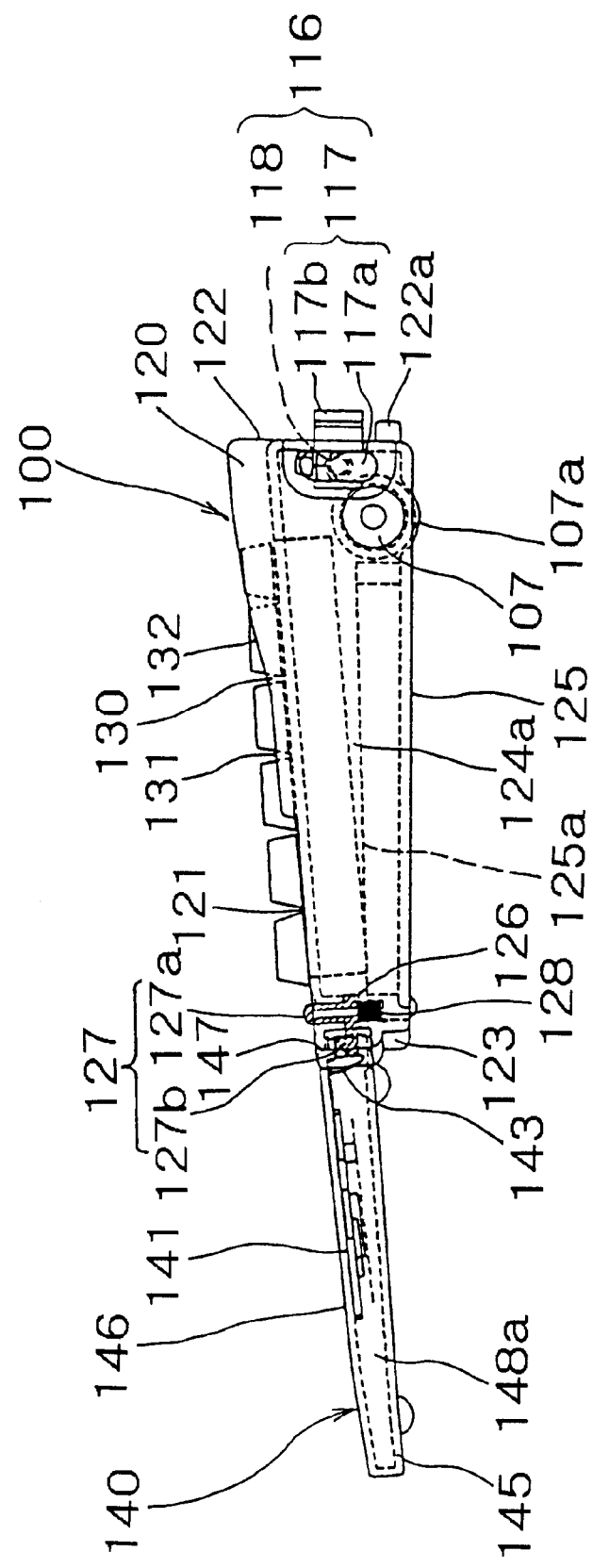
FIG. 16 is a side view showing the keyboard and the palm rest according to the first embodiment of the present invention.

As shown in FIGS. 15 and 16, the keyboard 100 includes plural keys 101, 102 and 103, a mount detection sensor 105 for detecting the mount of the keyboard 100 on the main body 10, three IR terminals 106a, 106b and 106c for performing transmission/reception of infrared-ray signals to/from the keyboard IR terminal 21 of the main body 10, a primary battery accommodating portion 107a for accommodating a primary battery 107 which is a dry cell, chargeable secondary batteries 108, a power reception connector 109 which is connected to the power feeding connector 57 of the main body 10 when the keyboard 100 is mounted on the main body 10, a palm rest connection connector 110 for performing transmission/reception of signals to/from the palm rest 140, a circuit board in which a keyboard circuit portion 111 (shown in FIG. 18) is formed, a main-body link mechanism 116 for linking the keyboard 100 to the main body 10, a palm rest link mechanism 126 for linking the keyboard 100 to a palm rest 140 which is allowed to be used, and a cover 120 for covering the above parts.

The keyboard cover 120 has an upper surface 121, a rear surface (connection end face) 122, a front surface 123, both side surfaces 124a, 124b and a lower surface 125. A palm rest accommodating portion 125a in which the palm rest 140 is freely detachably accommodated is formed on the lower surface 125 of the keyboard cover 120.

As shown in FIGS. 2 and 5, a projection wall 130 which projects upwardly from the upper surface 121 is formed at each of both the side end portions of the keyboard 100. As shown in FIGS. 5 and 13, a projection wall 130a projecting from the level of the display screen 32 is formed at each of the two side end portions of the cover 34 of the display device 30. The projecting walls 130, 130a are provided with flat portions 131, 131a which are brought into contact with each other when the keyboard 100 is mounted on the main body 10 and the display device 30 is in the closed position. Accordingly, when the keyboard 100 is mounted on the main body 10 and the display device 30 is in the closed position, the keyboard 100 supports the display device in the closed position in cooperation with the main body 10. Further, in each projecting wall 130 of the keyboard 100, a curved-surface portion 132 in which the projecting degree is gradually increased toward the rear surface side of the flat portion 131 thereof to thereby form a smoothly curved surface is formed at the rear surface side of the flat portion 131 of the projecting wall 130. Further, in each projecting wall 130a of the display device 30, a curved-surface portion 132a in which the projecting degree is gradually reduced toward the base end portion side of the flat portion 131a thereof to thereby form a smoothly curved surface is formed at the base end portion of the flat portion 131a of the projecting wall 130a. As in the case of the flat portions 131, 131a, the respective curved-surface portions 132, 132a confront each other when the keyboard 100 is mounted on the main body 10 and the display device 30 is in the closed position, but both the curved surface portions 132, 132a are not brought into contact with each other. Therefore, when the keyboard 100 is mounted on the main body 10 and the display device 30 is in the closed position, even when the keyboard 100 is pulled forward relatively to the main body 10, the keyboard 100 can be pulled forward relatively easily at the start time of the pull-out operation because there is a gap between the curved surface portions 132, 132a. When both the curved surface portions 132, 132a are brought into contact with each other as a result of a slight forward pulling operation of the keyboard 100, the curved surface portion 132a of the display device 30 follows the curved surface portion 132 of the keyboard 100 by the further forward pulling operation of the keyboard 100, and the tip portion 35 of the display device 30 is moved slightly upward and its state is slightly shifted from the closed state to the open state. Accordingly, when the keyboard 100 is mounted on the main body 10 and the display device 30 is in the closed position, the keyboard 100 is pulled forward relative to the main body 10 to separate the keyboard 100 from the main body 10, and the tip portion 35 of the display device 30 slowly jumps up without any operation of setting the display device to the open position in cooperation with the action of the spring 94 of the link mechanism 90.

Each key 101, 102, 103 projects from the upper surface 44 of the keyboard cover 120. As the plural keys 101, 102, 103 there are provided with plural alpha-numeric keys (alphabetic keys, Kana keys, numerical keys, symbol keys) 101, plural function keys 102, plural ten-key numerical pads 103, etc. The alpha-numeric key group 101a comprising the plural alpha-numeric keys 101 is disposed at the center portion which is slightly displaced to the left side on the upper surface 121 of the keyboard cover 120. The function key group 102a comprising the plural function keys 102 is mainly disposed around the alpha-numeric key group 101a. The ten-key group 103a comprising the plural ten-key numerical pads 103 is disposed at the right side of the alpha-numeric key group 101a. The interval between the respective keys, that is, the key pitch is set to 19.05 mm. As described above, the keyboard 100 is a so-called full keyboard. This embodiment uses such a full keyboard in consideration of man-machine performance.

Figure 22:
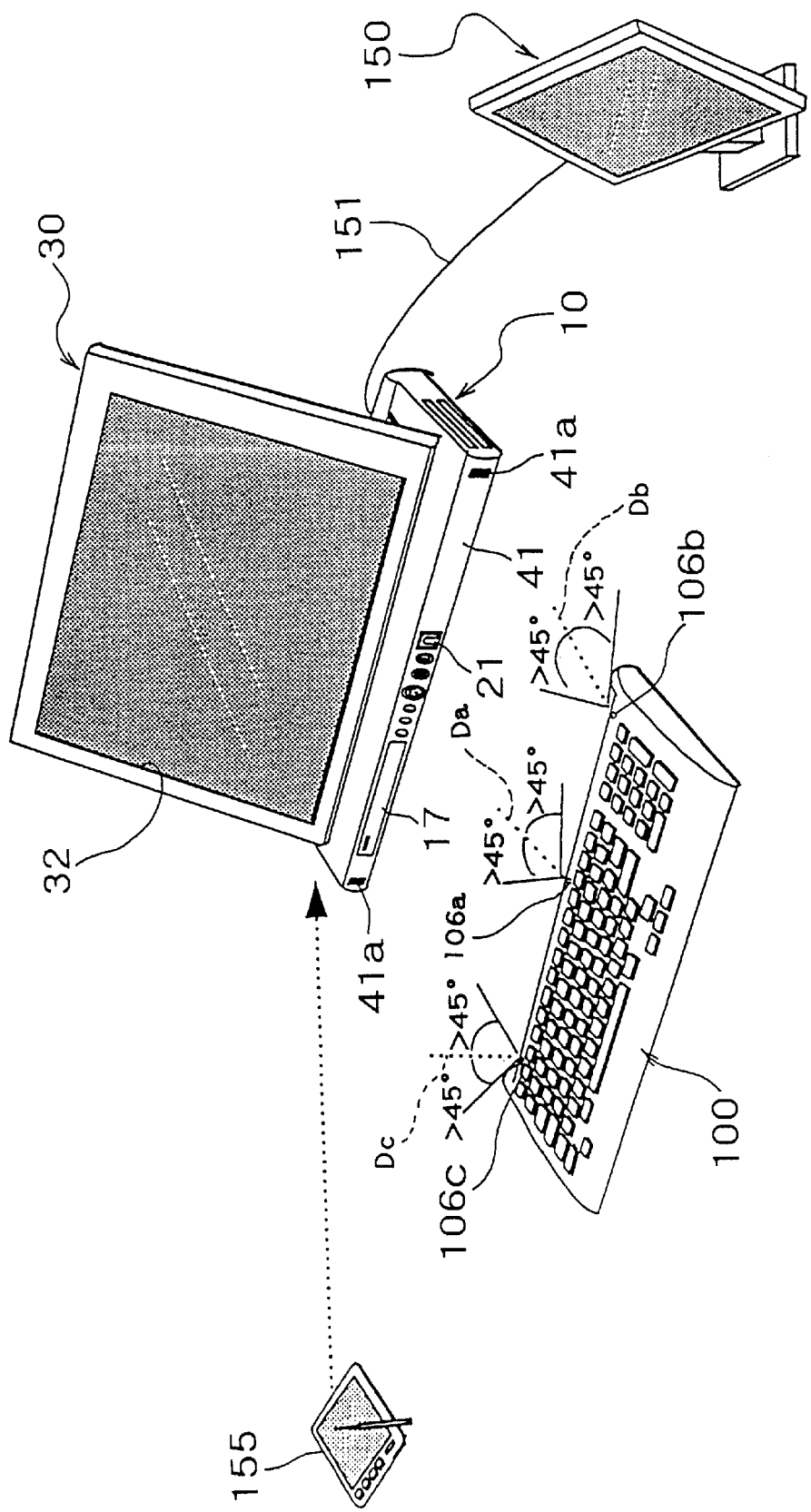
FIG. 22 is a diagram showing the in-use state of the information processing apparatus according to the first embodiment of the present invention (part 2)

The mount detection sensor 105, the three IR terminals 106a, 106b, 106c and the power reception connector 109 are disposed at the rear surface side of the keyboard cover 120. One IR terminal 106a of the three IR terminals 106a, 106b, 106c are disposed so as to confront the keyboard IR terminal 21 of the main body 10 when the keyboard 100 is mounted on the main body 10, and the other two IR terminals are provided at the right side surface side and the left side surface side respectively of the keyboard cover 120. As shown in FIG. 22, the IR terminal 106b at the right side is disposed in such a manner that the signal transmission/reception main direction Db thereof is inclined to the right side by several tens of degrees, and the IR terminal 106c at the left side is disposed in such a manner that the signal transmission/reception main direction Dc thereof is inclined to the left side by several tens of degrees. The respective IR terminals 106a, 106b, 106c can transmit/receive infrared-ray signals at a wide angle (for example, at an angle of 45 degrees or more) around the signal transmission/reception main directions Da, Db, Dc respectively. Further, as shown in FIGS. 5, 14 and 15, the rear surface (connection end face) of the keyboard cover 120 is provided with a link reinforcing projection 122a which is engagedly inserted into a projection engagement hole 41b formed on the front surface (connection end face) 41 of the main body 10 when the keyboard 100 is mounted on the main body 10.

The main-body link mechanism 116 is disposed at each of the right and left sides of the rear surface side of the main-body cover 40. Each link mechanism 116 has a link member 117 which is actually linked to the main body 10, and a spring 118 for urging the link piece 117 in the sideward direction. The link member 117 comprises a push button portion 117a which is operated by the user, and a link pawl portion 117b which is engagedly inserted into a pawl insertion hole 41a formed on the front surface 41 of the main body. In the link mechanism 116 at the right side, the push button portion 117a of the link member 117 is projected from the right side surface 124 of the keyboard cover 120, and the spring 118 urges the link member 117 to the right. In the link mechanism 116 at the left side, the push button portion 117a of the link member 117 is projected from the left side surface of the keyboard cover 120, and the spring 118 thereof urges the link member 117 to the left.

When the keyboard 100 is mounted on the main body 10, the link pawl portion 117b of the link member 117 is hooked to the pawl insertion hole 41a of the main body 10, and the push button portion 117a of the link member 117 is projected from the side surfaces 124a, 124b of the keyboard cover 120. This state of the link member 117 is kept by the spring 118. Further, at this time, the link reinforcing projection 122a of the keyboard 100 is engagedly inserted in the projection engaging hole 41b. When the keyboard 100 is separated from the main body 10, the push button portion 117a of the link member 117 is pushed in against the elastic force of the spring 118. At this time, the link pawl portion 117b of the link member 117 is also moved in interlocking fashion, and the engagement of the link pawl portion 117b with the pawl insertion hole 41a of the link pawl portion 117b is released, so that the link pawl portion 117b is allowed to be pulled out from the pawl insertion hole 41a. When the keyboard 100 is moved forward relatively to the main body 10 in the above state, the link pawl portion 117b comes out of the pawl insertion hole 41a of the main body 10, and also the link reinforcing projection 122a comes out of the projection engaging hole 41b of the main body 10, whereby the keyboard 100 is separated from the main body 10. The link pawl portion 117b of the link member 117 is mainly against the force which pulls the keyboard 100 out forwardly from the main body 10, and the link reinforcing projection 122a mainly contributes to the force which moves the keyboard 100 in the up-and-down direction and in the right-and-left direction from the main body 10.

The palm rest connection connector 110 is disposed on the front surface 123 of the keyboard cover 120.

A palm rest link mechanism 126 is provided to each of the right and left sides of the front surface side of the keyboard cover 120. The palm rest link mechanism 126 is also provided with a link member 127 comprising a push button portion 127a and a link pawl portion 127b, and a spring 128 for urging the link member 127 in a fixed direction as in the case of the main-body link mechanism 116. However, the palm rest link mechanism 126 urges the link member 127 upwardly with the spring 128 thereof, and the push button portion 127a of the link member 127 is projected from the upper surface 121 of the keyboard cover 120. The operation of the palm rest link mechanism 126 will be described after the description of the construction of the palm rest 140.

As shown in FIG. 18, the keyboard 100 further includes a selector switch 112 for performing a switching operation between the power supply from the primary battery 107 to the keyboard circuit portion 111 and the power supply from the secondary battery 108 to the keyboard circuit portion 111, and a controller 113 for controlling the operation, etc. of the selector switch 112 and the three IR terminals 106a, 106b, 106c. The power reception connector 109 of the keyboard 100 is connected to the secondary battery 108 through the selector switch 112.

The controller 113 includes a power source controller 113a for performing the operation control of the selector switch 112 and controlling the power supply to the three IR terminals 106a, 106b, 106c, etc., and a signal controller 113b for controlling a signal from a K/B circuit portion 111, signals from the respective IR terminals 106a, 106b, 106c and signals to the respective IR terminals 106a, 106b, 106c. Each of the IR terminals 106a, 106b, 106c has an infrared-ray emission element 106x, an infrared-ray detecting element 106y and a driving circuit for these infrared-ray emission and detecting elements, these parts being unified into one body.

The main body 10 is provided with a signal controller (keyboard controller) 21b for controlling the signal from the IR terminal 21 of the main body 10 and the signal to the IR terminal 21.

The power source controller 113a of the controller 113 also detects the amount of power of each of the primary battery 107 and the secondary battery 108. The detection method may be a method of detecting the power on the basis of variation of the voltage value of the battery, or a method of detecting the power on the basis of an operation time of the keyboard circuit portion 111 or the like. On the basis of a judgment as to whether the mount detection sensor 105 is pushed or not, the power source controller 113a recognizes at all times whether the keyboard 100 is mounted on the main body 10. Further, a status signal representing whether the main body 10 is in a sleep state or in an active state is emitted from the keyboard IR terminal 21 of the main body 10, and the signal controller 113b recognizes the state of the main body 10 at all times on the basis of the reception of the signal by the IR terminal 106a, 106b, 106c of the keyboard 100.

When the keyboard 100 is mounted on the main body 10, the power feeding connector 57 of the main body 10 and the power reception connector 109 of the keyboard 100 are connected to each other. Therefore, the power from the main body 10 is supplied to the secondary battery 108 through each connector 57, 109 and the elector switch 112. When the power source controller 113a detects the full charge of the secondary battery 108, it supplies an instruction to the selector switch 112, and the connection between the power reception connector 109 and the secondary battery 108 is intercepted by the selector switch 112 which receives the instruction. At this time, if the main body 10 is in the active state, the power from the secondary battery 108 is supplied to the keyboard circuit portion 111 through the selector switch 112. When the keyboard 100 is mounted on the main body 10, the power from the main body 10 is basically supplied to the secondary battery 108, so that the power amount of the secondary battery 108 is only slightly reduced. When the main body 10 is set to the sleep state, the controller 113 gives an instruction to the selector switch 112, and the selector switch 112 receiving this instruction cuts off the power supply from the secondary battery 108 to the keyboard circuit portion 111. In this case, the power supply from the primary battery 107 to the keyboard circuit portion 111 is also cut off. Only the IR terminal 106a of the three IR terminals 106, 106b, 106c, which is located at the center portion and confronts the keyboard IR terminal 21 of the main body 10, is activated by the power source controller 113a while the keyboard 100 is mounted on the main body 10.

When the keyboard 100 is separated from the main body 10, the power feeding connector 57 of the main body 10 and the power reception connector 109 of the keyboard 100 are separated from each other, so that the power supply from the main body 10 to the secondary battery 108 is cut off. During this time, all three IR terminals 106a, 106b, 106c of the keyboard 100 are activated by the power source controller 113a. When the main body 10 is in the active state, the secondary,battery 108 is first used, and the power is supplied from the secondary battery 108 to the keyboard circuit portion 111. When the power amount of the secondary battery 108 is below a predetermined value, the power source controller 113a instructs the selector switch 112 to switch the power supply operation to the keyboard circuit portion 111 from the secondary battery 108 to the primary battery 107. Upon this instruction, the selector switch 112 is operated so that the power to the keyboard circuit portion 111 is supplied from the primary battery 107. The power source controller 113a instructs the main body 10 through the IR terminal 106a, 106b, 106c to display a message for promoting charging of the secondary battery 108. When the power amount of the primary battery 107 is also below a predetermined value, the power source controller 113a instructs the main body 10 through the IR terminal 106a, 106b, 106c to display a message for promoting exchange of the primary battery 107 which is a dry battery. When the main body 10 is set to the sleep state, as in the case where the keyboard is mounted, the power source controller 113a makes an instruction to the selector switch 112, and the power supply from the secondary battery 108 and the primary battery 107 to the keyboard circuit portion 111 is intercepted by the selector switch 112 receiving this instruction.

In this embodiment, when the keyboard 100 is separated from the main body 10, the primary battery 107 is used after the secondary battery 108 is used. Conversely, after the primary battery 107 is used, the secondary battery 108 may be used. Further, a special-purpose switch may be provided to the keyboard 100 to switch the main body 10 from the sleep state to the active status or from the active state to the sleep state by operating the special-purpose switch.

Some users use their information processors while each keyboard 100 is separated from each main body 10 irrespective of the usage state (i.e., in-use or not in-use) of the information processor. Therefore, in consideration of this situation, it is preferable to provide a power feeding cable for electrically connecting the power feeding connector 57 of the main body 10 and the power reception connector 109 of the keyboard 100 to each other. Further, the connection between the keyboard 100 and the main body 10 may be performed by using a curly lead or the like as in the prior art. In this case, the curly lead or the like may be accommodated in the area for the primary battery accommodating portion which is unneeded.

When the keyboard 100 is separated from the main body 10, data generated in the K/B circuit portion 111 of the keyboard 100 are transmitted through the signal controller 113b to each IR terminal 106a, 106b, 106c to be converted to infrared ray signals, and then these signals are transmitted to the IR terminal 21 of the main body 10. When the IR terminal 21 of the main body 10 receives the infrared-ray signal from at least one of the three IR terminals 106a, 106b, 106c of the keyboard 100, the signal controller 21b of the main body 10 transmits, as the reception establishment signal, the same signal as the infrared-ray signal thus received to the IR terminal 21 of the main body 10. When at least any one of the three IR terminals 106a, 106b, 106c of the keyboard 100 receives the reception establishment signal from the main body 10, the power source controller 113a of the keyboard 100 judges according to a predetermined rule that the communication between the IR terminal 21 of the main body 10 and one of the three IR terminals 106a, 106b 106c of the keyboard 100 is established, and continues the power supply to the one IR terminal while cutting off the power supply to the light emission elements 106x of the other IR terminals.

When only one of the three IR terminals 106a, 106b, 106c of the keyboard 100 receives the reception establishment signal from the main body 10, it is judged that there is communication between the one IR terminal and the IR terminal 21 of the main body 10. Further, when two or three of the three IR terminals 106a, 106b, 106c receive the reception establishment signal, it is judged that there is communication between the IR terminal 21 of the main body 10 and one of these IR terminals which receives the reception establishment signal earliest or receives the reception establishment signal having the maximum signal intensity.

When the communication between one IR terminal of the keyboard 100 and the IR terminal 21 of the main body 10 is established and at this time at least one of the other IR terminals of the keyboard 100 receives an infrared-ray signal from another equipment, for example, PDA which is called "electronic pocket notebook", "pocket computer" or the like, the signal controller 113b of the keyboard 100 independently controls the transmission/reception signals between the IR terminal for which the communication has been established, and the IR terminal which newly receives the infrared-ray signal. Further, the signal controller 113b controls the power source controller 113a to re-start the power supply to the light emission element 106x of the IR terminal which newly receives the infrared-ray signal if any necessity arises for transmitting the infrared-ray signal from the IR terminal which newly receives the infrared-ray signal.

One IR terminal 106c of the three IR terminals 106a, 106b, 106c of the keyboard 100 may be provided so to be movable or changeable in its mount direction thereof as shown in FIG. 18.

As described above, in this embodiment, the plural IR terminals 106a, 106b, 106c are provided to the keyboard 100 while the mount position and the mount direction are different among these terminals. Therefore, even if any foreign object exists between the main body 10 and the keyboard 100, the probability of the communication between the IR terminal 21 of the main body 10 and any one of the plural IR terminals 106a, 106b, 106c of the keyboard 100 being established is increased remarkably, so that the communication problems can be avoided. Further, when the communication is established between the IR terminal 21 of the main body 10 and one of the three IR terminals 106a, 106b, 106c, the power supply to the light emission elements 106x of the other two IR terminals than the IR terminal for which the communication is established is cut-off, so that the power consumption of the keyboard 100 can be suppressed. Further, in this embodiment, the radio (wireless) communication can be simultaneously performed among plural devices.

It is preferable that the keyboard 100 is provided with a switch or the like for setting an identification code of the keyboard 100 to add the identification code to the infrared-ray signal and the main body 10 is also provided with a switch or the like for setting the identification code of the keyboard 100 to judge whether the signal received by the main body 10 is coincident with the signal from the specific keyboard 100.

As shown in FIGS. 15 to 17, the palm rest 140 includes a track pad 141 which is a kind of pointing device, a connector 142 which is connected to the palm rest connection connector 110 of the keyboard 100 when it is allowed to be used, a leaf spring 143 which is engaged with the link pawl portion 127b of the palm rest link mechanism 126 of the keyboard 100, and a palm rest cover 145 for covering the above elements.

The palm rest cover 145 has an upper surface 146, a rear surface 147 and both side surfaces 148a, 148b.

Under the accommodation state of the palm rest 140, it is accommodated in the palm rest accommodating portion 125a while the upper surface 146 of the palm rest cover 145 confronts the top surface of the palm rest accommodating portion 125a of the keyboard 100. When the palm rest 140 is in the in-use state, it is mounted on the keyboard 100 while the front surface 123 of the keyboard 100 confronts the rear surface 147 of the palm rest cover 145.

The track pad 141 is provided substantially at the center of the upper surface 146 of the palm rest cover. The user uses the keyboard 100 while putting their hands on an area which is located on the upper surface 146 of the palm rest cover 145 and is not provided with the track pad 141.

Figure 17A:
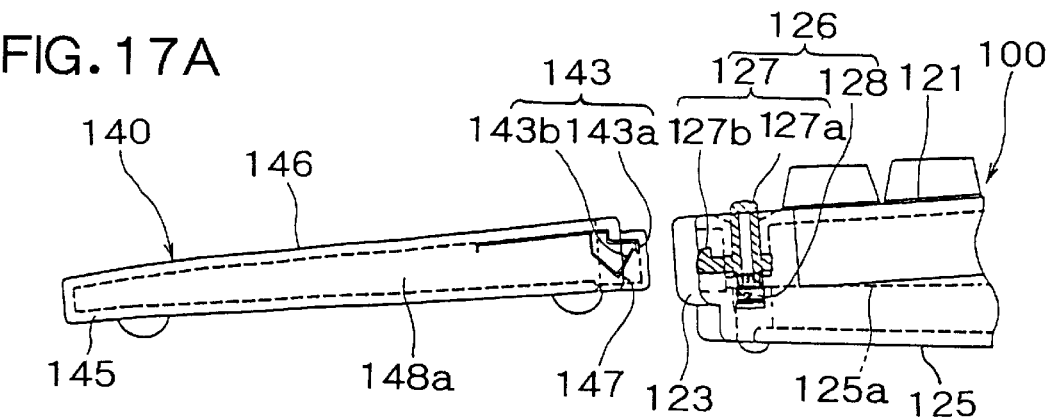
FIG. 17A is a side view of the palm rest before connection according to the first embodiment of the present invention.
Figure 17B:
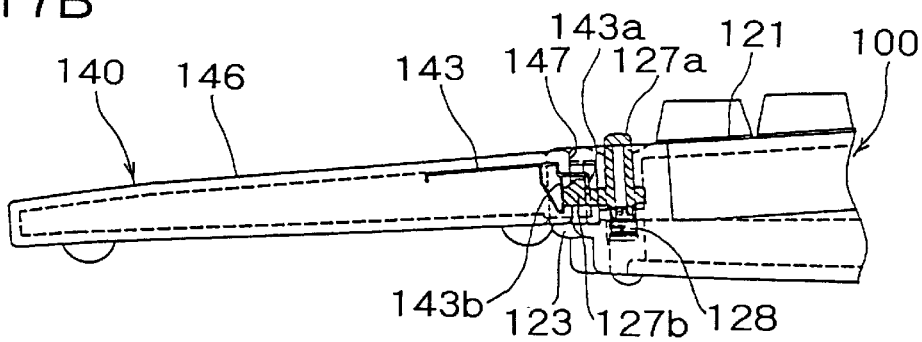
FIG. 17B is a side view showing the connection process of the palm rest according to the first embodiment of the present invention (part 1)
Figure 17C:
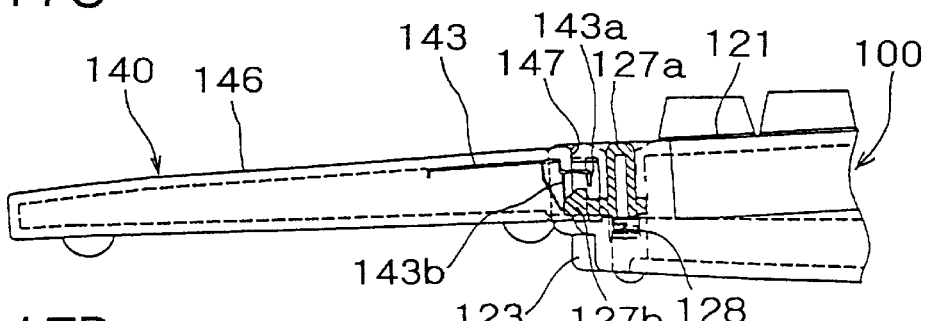
FIG. 17C is a side view showing the connection process of the palm rest according to the first embodiment of the present invention (part 2)
Figure 17D:
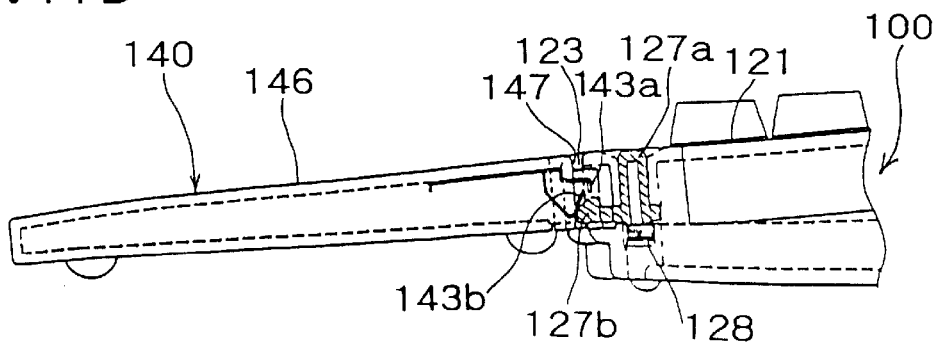
FIG. 17D is a side view showing the connection status of the palm rest according to the first embodiment of the present invention.

The leaf spring 143 is provided at the rear surface side of the palm rest cover 145 so that it confronts the palm rest link member 127 of the keyboard 100 when the palm rest 140 is set to the in-use position. As shown in FIG. 17, the leaf spring 143 includes an engaging portion 143a which is engaged with the link pawl portion 127b (engaged portion) of the palm rest link member 127 of the keyboard 100, and a separation promoting portion 143b for pushing the link pawl portion 127b of the link member 127 relatively backwards. When the palm rest 140 is in-use, as shown in FIG. 17B the engagement portion 143a of the leaf spring 143 is engaged with the link pawl portion 127b (portion being engaged) of the palm rest link member 127 of the keyboard 100, and the separation promoting portion 143b of the leaf spring 143 pushes the link pawl portion 127b of the link member 127 relatively backwards. At this time, the push button portion 127a of the palm rest link member 127 is projected from the upper surface 121 of the keyboard 100 by the urging force of the spring 128 of the palm rest link mechanism 126. When the palm rest 140 in use is separated from the keyboard 100, the push button portion 127a of the palm rest link member 127 provided to the keyboard 100 is pushed down as shown in FIG. 17C, whereby the link pawl portion 127b of the palm rest link member 127 is disengaged from the engaging portion 143a of the leaf spring 143. At this time, the separation promoting portion 143b of the leaf spring 143 also pushes the link pawl portion 127b of the palm rest link member 127 relatively backwards, so that the palm rest 140 is pushed forward relative to the keyboard 100 as shown in FIG. 17D and separated from the keyboard 100 as shown in FIG. 17A.

Next, the usage mode of the information processor thus constructed will be described.

Figure 21:
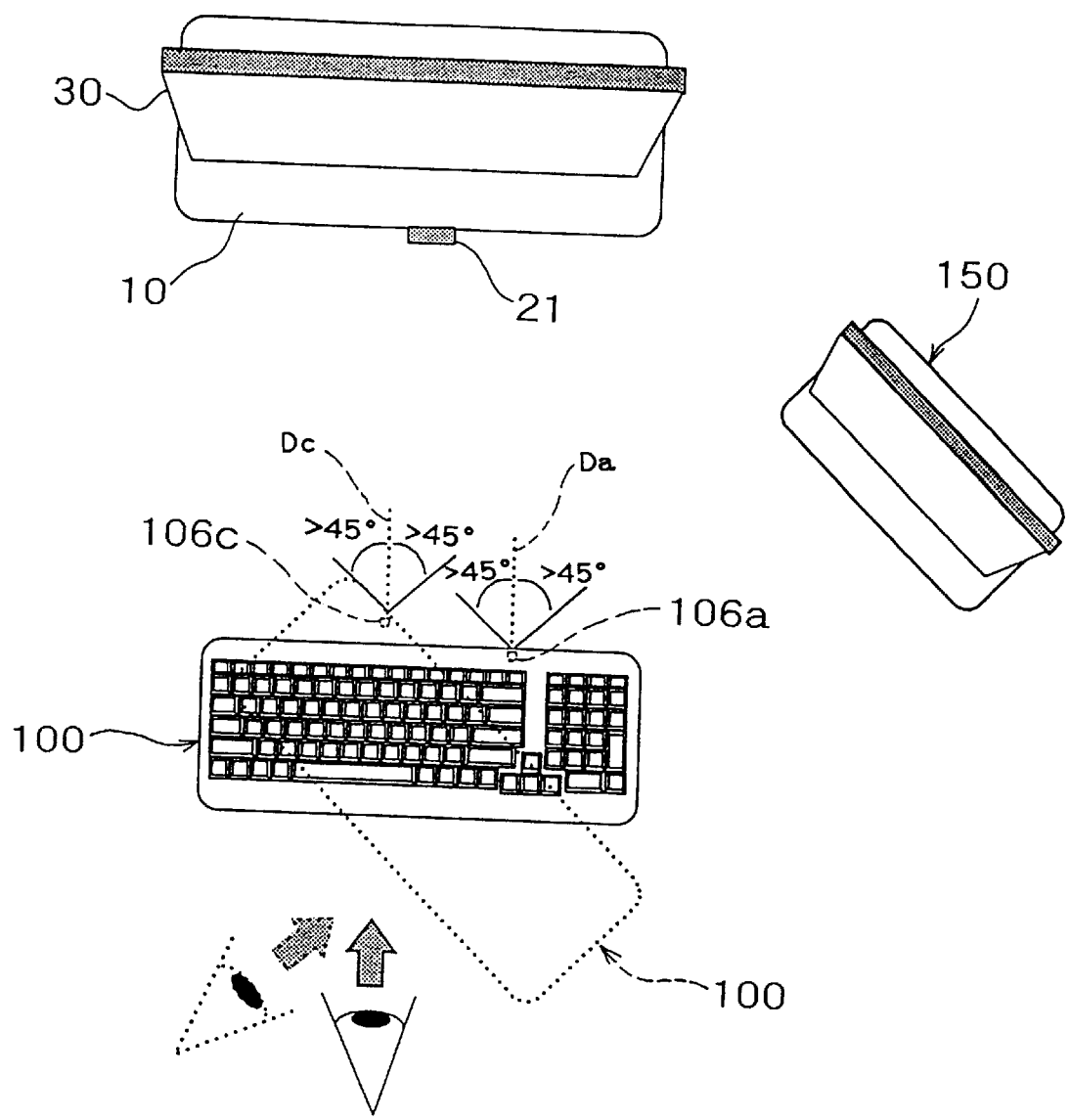
FIG. 21 is a diagram showing the in-use state of the information processor according to the first embodiment of the present invention (part 1)
Figure 23:
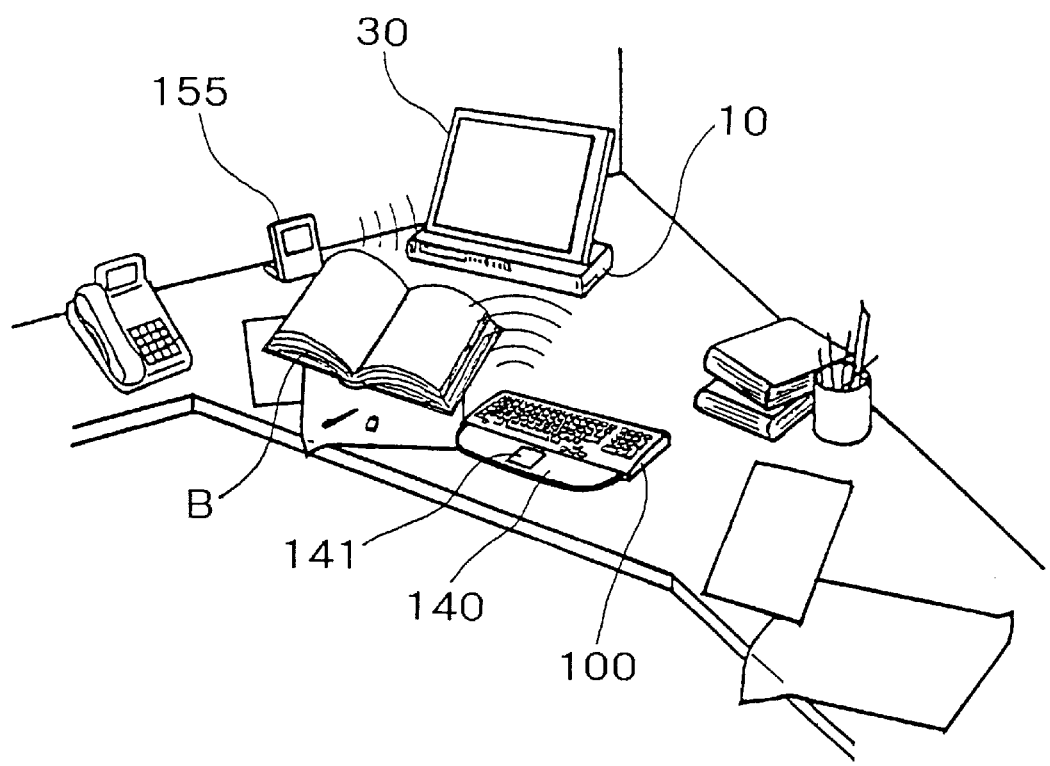
FIG. 23 is a diagram showing the in-use state of the information processor according to the first embodiment of the present invention (part 3)

A relatively-large 15-inch display panel is used as the display panel 31 of the information processor, and thus it is preferable to use the keyboard 100 while it is separated from the main body 10 to which the display device 30 is secured as shown in FIGS. 21 to 23.

When the keyboard 100 is used while being separated from the main body 10, some problem may occur in the signal transmission/reception between the main body 10 and the keyboard 100 if the arrangement direction (orientation) of the keyboard 100 is changed relative to the main body, as shown in FIG. 21, or some foreign object such as a book B or the like exists between the main body 10 and the keyboard 100 as shown in FIG. 23. Therefore, in this embodiment, the keyboard 100 is provided with the plural IR terminals 106a, 106b, 106c and the signal transmission/reception main directions thereof are set to be different between the different IR terminals, thereby avoiding the communication problem. In this embodiment, the keyboard 100 is provided with the plural IR terminals 16a, 106b, 106c, and the main body 10 is provided with one IR terminal. However, conversely, the keyboard 100 may be provided with one IR terminal and the main body 10 or the display device 30 directly connected to the main body 10 may be provided with plural IR terminals. In this case, it is preferable to perform the power control and signal control for the plural IR terminals of the main body 10 or the display device 30 in the same manner as in the case where the keyboard 100 is provided with the three IR terminals as described above.

A dealer relating to the securities business usually does his/her work while watching stock price information. In such a case, as shown in FIGS. 21 and 22, a sub display device 150 having a relatively small display area (for example, 13-inch size) may be further provided in addition to the main display device 30 secured to the main body 10, and data obtained through a LAN or the like in the main body 10 may be transmitted to the sub display device through a VGA connector 67 of the main body 10 and an image transfer cable 151. That is, in the above case, the sub display device can be positioned as a device which handles news information containing mainly characters.

The distance between the sub display device 150 and the user may be smaller than the distance between the main display device 30 and the user so that characters, etc. are displayed on the main display device 30 substantially in the same size as the characters, etc. displayed on the sub display device 150, or the distance between the sub display device 150 and the user may be substantially equal to the distance between the main display device 30 and the user so that the user need take no action to adjust his/her vision when the visual target is changed from the main display device 30 to the sub display device, and vice versa.

The display content of the sub display device 150 is changed by operating the keyboard 100. A signal requesting the change of the display content of the sub display device 150 is output to the main body 10. At this time, the main body 10 transmits video data corresponding to the content of the signal to the sub display device 150 through the VGA connector 67 of the main body 10 and the image transfer cable 151. It is considered that for the above keyboard operation, the user arranges the keyboard 100 so that the keyboard 100 faces the sub display device 150 as shown in FIG. 21. In such a case, the infrared-ray signal can be reliably transmitted from the keyboard 100 to the main body 10 because the keyboard 100 is provided with the plural IR terminals 106a, 106b, 106c whose signal transmission/reception,main directions Da, Db, Dc are different, as described above.

The main body 10 is provided with the IR terminal 63 as well as the keyboard IR terminal 21. Therefore as shown in FIGS. 22 and 23, the main body 10 can simply perform data exchange with PDA 155, which is known as an "electronic pocket notebook", "pocket computer" or the like.

As described above, the information processor according to this embodiment supports the requirements of sales managers, marketing managers, etc. who make presentations at their customer sites. Therefore, this embodiment has large advantages in that a sale manager or the like can operate the display device 30 at a remote place by separating the keyboard 100 from the main body 10, and that even when a small client group (containing three to six persons, for example) is remote from the display device 30 to some extent, each member of the group can clearly watch the display content on the display device 30 because a 15-inch high-quality TFT display device 30 which is relatively large in size is used as the display device 30.

Therefore, the information processor of this embodiment can be simply used to make presentations with high quality. From the viewpoint of simplicity, the method of use thereof is basically the same as normal PCs (personal computers), and thus it is one merit that any normal PC user will know the method of use. Further, from the viewpoint that high-quality presentations can be performed, it is also an important merit that full-color display can be performed by the TFT display 30. In addition, the information processor of this embodiment can enable flexible presentations. This is because it is possible to use not only traditional presentation software, but also other application software such as software for connecting to WWW (World Wide Web) through a modem, software for performing a videoconference, software for connecting to multimedia, etc.

The information processor of this embodiment has the following features to support the requirements of users who make presentations at customer sites.
(1) It uses a wide-visual TFT display 30 which has a relatively wide display screen 32 with full color high quality.
(2) It is relatively light and has portability.
(3) It is designed to be slim.
(4) The keyboard 100 is a wireless keyboard which is freely detachable from the main body 10.
(5) A communication port for modem, LAN or the like is provided to obtain information therethrough.
(6) It is designed in such a multimedia support type that it can be connected to many acoustic devices, etc.

Here, the wide visual angle of the display device 30 will be briefly described.

Figure 20:
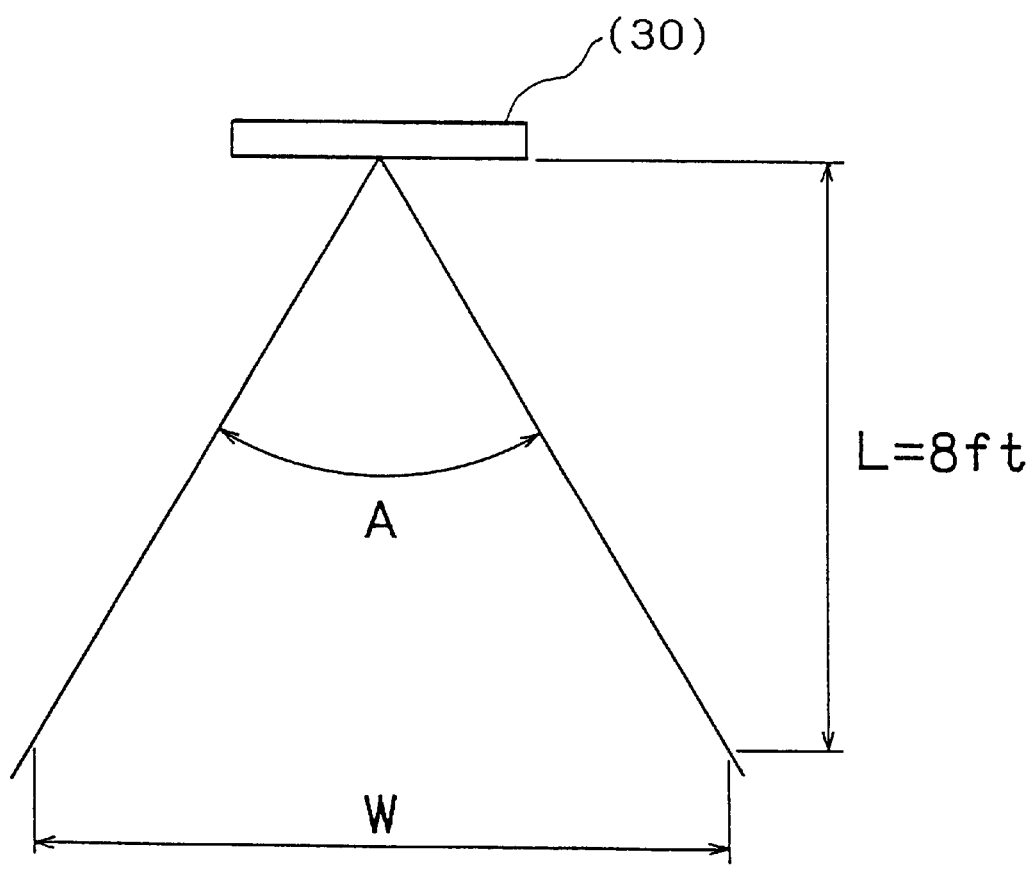
FIG. 20 is a diagram showing an angle of visibility according to the display device.

The visual angle A of a conventional liquid crystal display device is equal to about 60 degrees, and limited to 90 degrees at maximum. As shown in FIG. 20, at a distance of 8 feet from the display device, only a person who is located within a width range of 9 feet to 12 feet at maximum can watch the display content of the display device. On the other hand, the display device 30 of this embodiment has a visual angle of 160 degrees. Therefore, at a distance of 8 feet from the display device, a person who is located in a width range of 90 feet can watch the display content of the display device 30. Accordingly, even when the conventional liquid crystal display device has the same display area as the display device 30 of this embodiment, a larger number of people can watch the display content of the display device 30 according to this embodiment.

The information processor according to this embodiment can also support the requirements of users who are sensitive to the style and size of the information processor, such as architect designers who are sensitive to the style from a work viewpoint, graphic designers, web designers, high executives of companies, etc.

Figure 40:
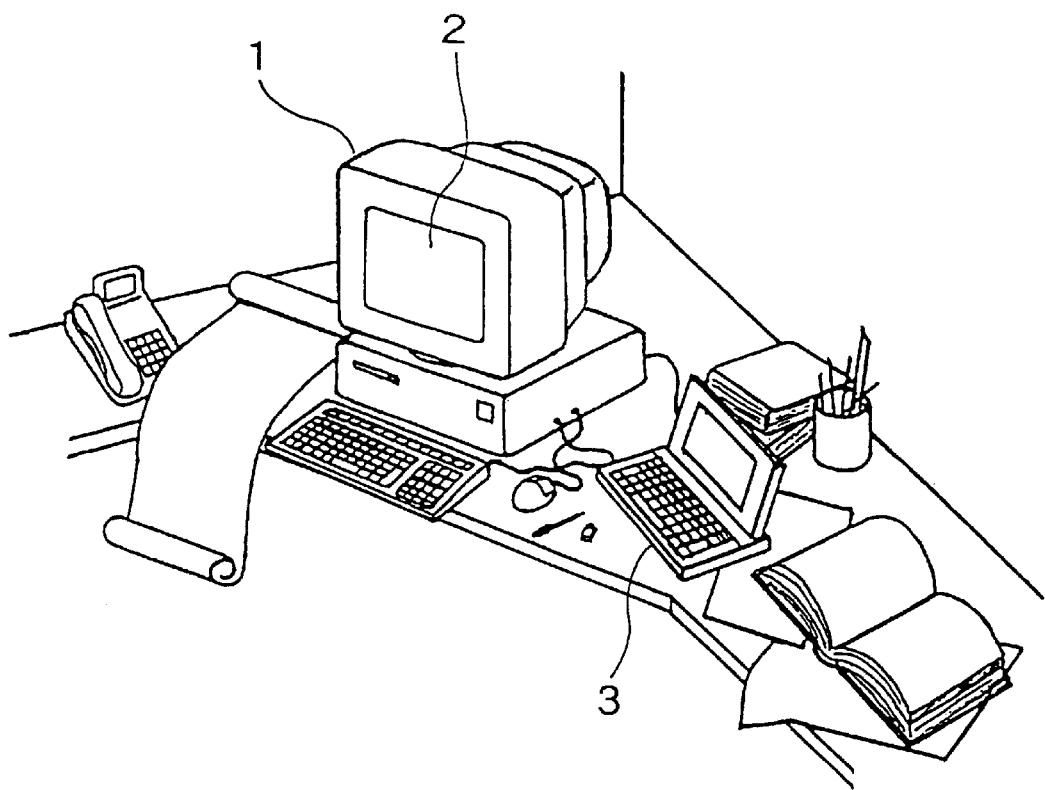
FIG. 40 is a diagram showing the in-use state of a conventional information processor.

As shown in FIG. 23, this is based largely on the fact that the top of a desk can be put in order (as compared with the prior art of FIG. 40) by space savings, and also the fact that the information processor is produced in a refined design. These factors are important in creating slim office environments. Further, this is also based largely on the fact that a high-performance platform is used, specifically, a high-performance CPU 11 is provided and the latest OS (Operating System) such as Windows NT (registered trademark by Microsoft Company in U.S.A.) is installed.

The information processor has the following features in order to support the requirements of users which are sensitive to the style and size thereof.
(1) It is produced in a refined and space-saving industrial design.
(2) It has high performance.
(3) It uses a large flat panel display 30 and a wireless keyboard 100.

(4) It is provided with a communication port such as a modem, LAN or the like to obtain information.

(5) It is such a multimedia-supporting device that it can be connected to many acoustic devices, etc.

Further, the information processor can support the requirements of users who must work at home and at their workplace or at different plural workplaces, such as engineers, accountants, consultants, etc.

This is largely based on the fact that although the information processor according to the present invention basically targets users who use their information processors with no movement, it is designed to be portable if occasions demand and it has various communication capabilities. Further, it has a performance which sufficiently exceeds the performance of a notebook type. Specifically, it is based on the fact that the high-performance CPU 11 is provided, the latest OS such as Windows NT (produced by Microsoft company in U.S.A.) is installed, and a 15-inch TFT display 30 and a full-size keyboard 100 with ten-key numerical pads are provided.

The information processor has the following features in order to support the requirements of users who work at home.

(1) It is relatively light.

(2) It has high performance.

(3) It uses a large flat panel display 30 and a wireless full-size keyboard 100 with ten-key numerical pads.

(4) It is provided with a communication port such as a modem, LAN or the like to transmit/receive information therebetween.

Next, an information processor according to a second embodiment of the present invention will be described with reference to FIGS. 24 to 31.

Figure 24:
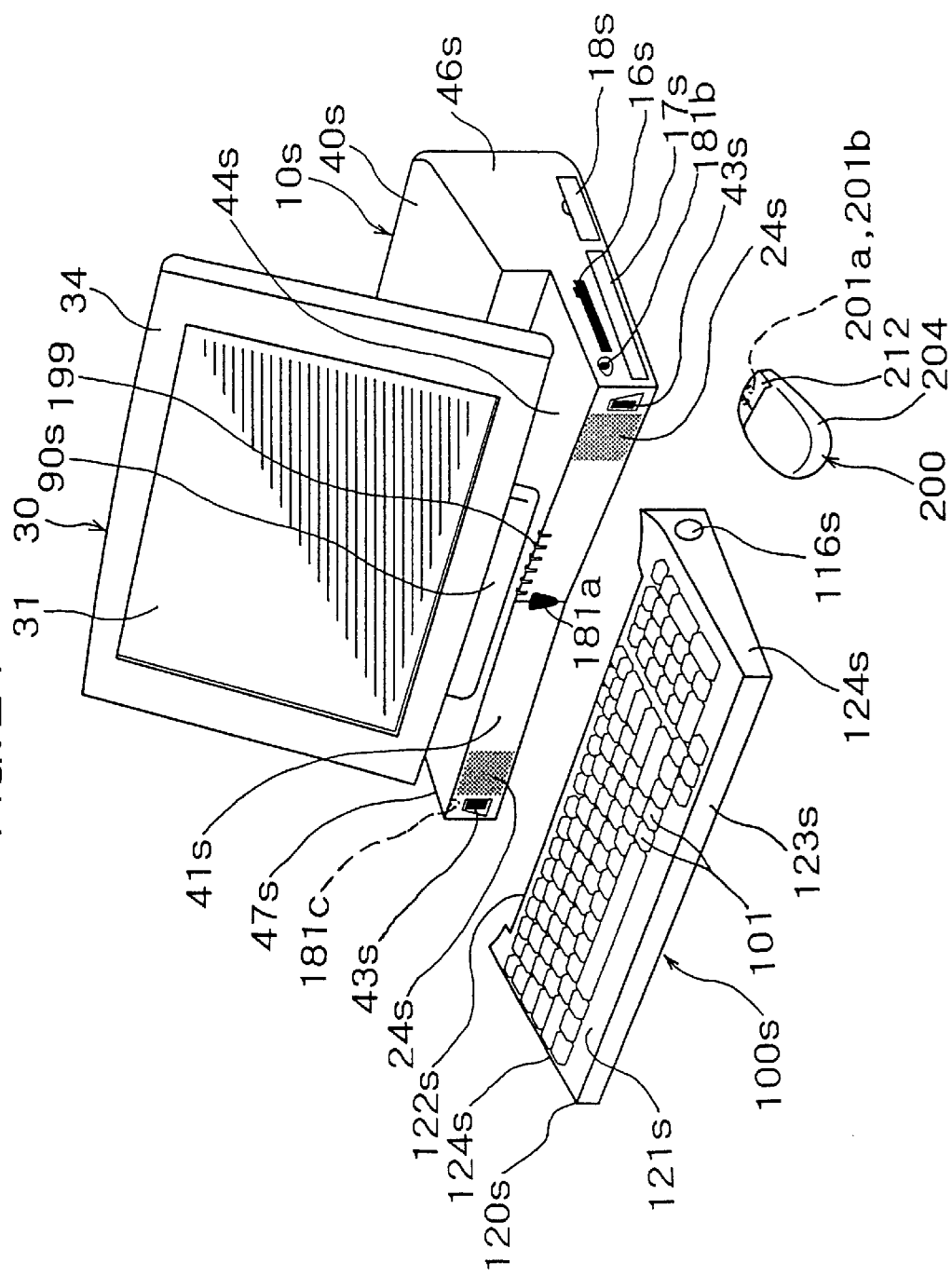
FIG. 24 is a perspective view showing the information processor according to a second embodiment of the present invention.
Figure 25:
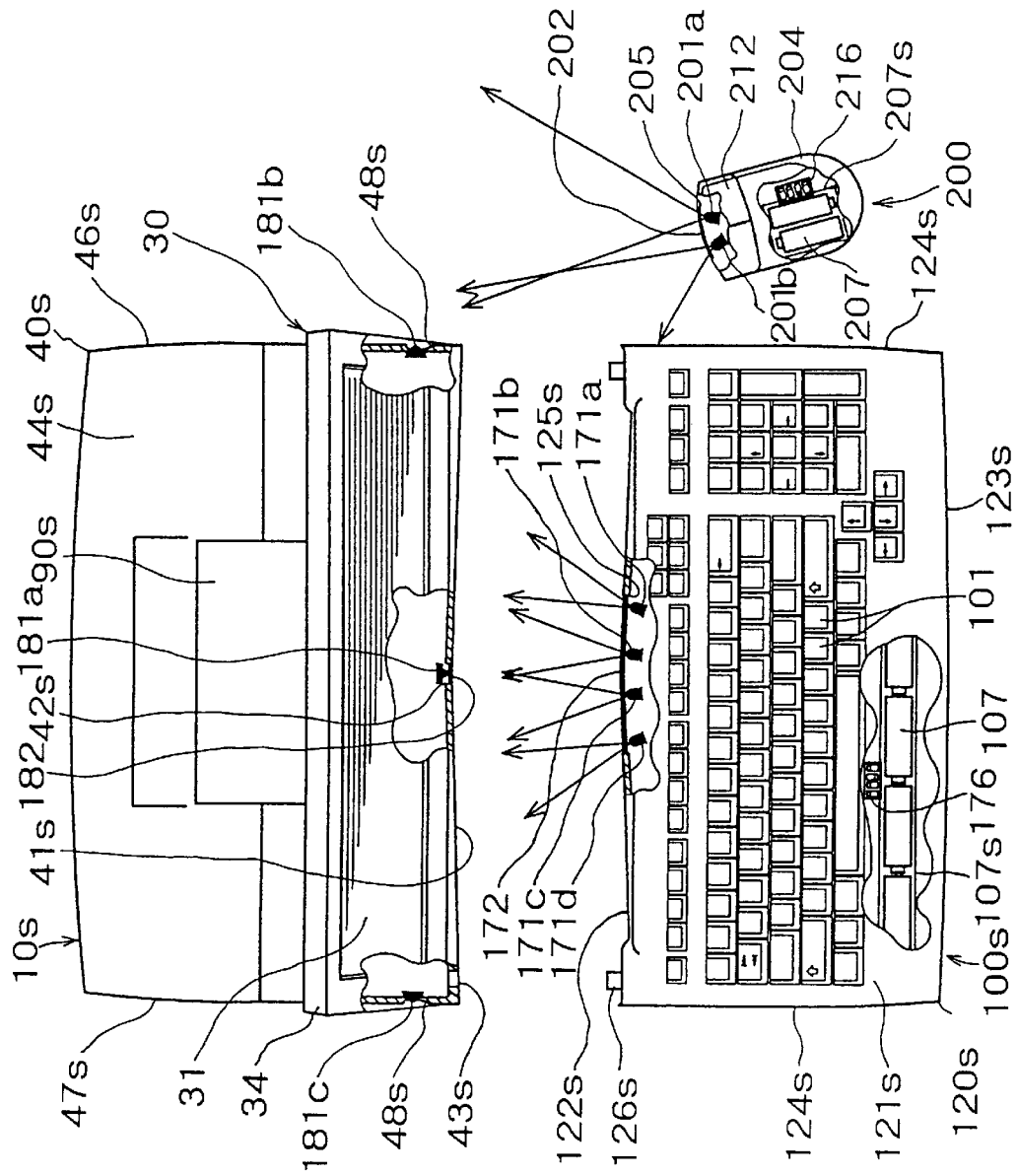
FIG. 25 is a plan view showing the information processor according to the second embodiment of the present invention.

As shown in FIGS. 24 and 25, the information processor of this embodiment includes a main body 10s having a CPU for performing various operations, a display device 30 for displaying processing results of the main body 10s, etc., a keyboard 100s which is freely detachably mounted on the main body 10s, and a mouse 200. The main body 10s and the display device 30 are linked to each other by a link mechanism 90s as in the case of the first embodiment.

Figure 26:
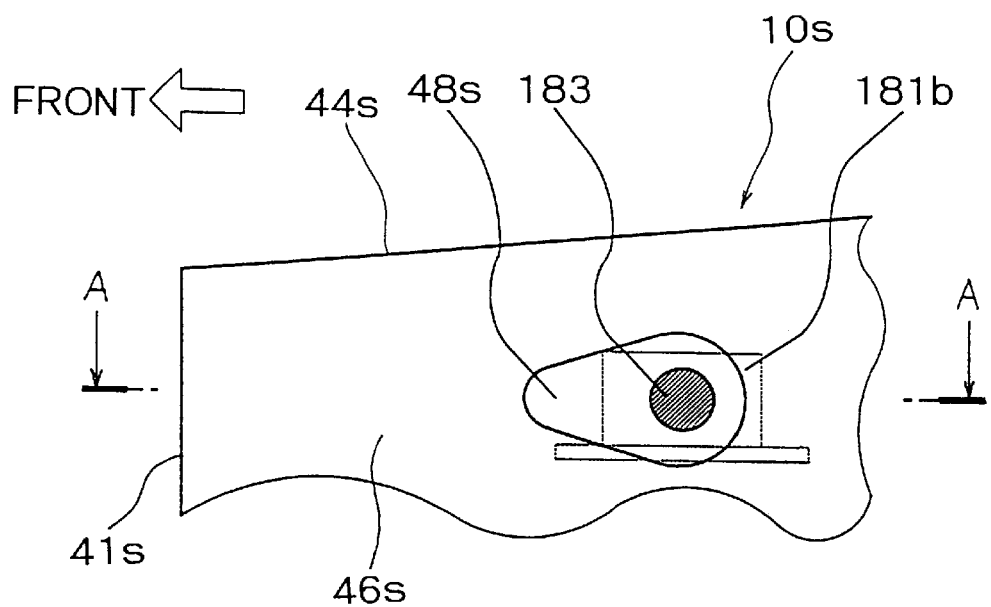
FIG. 26 is a side view showing the main body of the information processor according to the second embodiment of the present invention.
Figure 27:
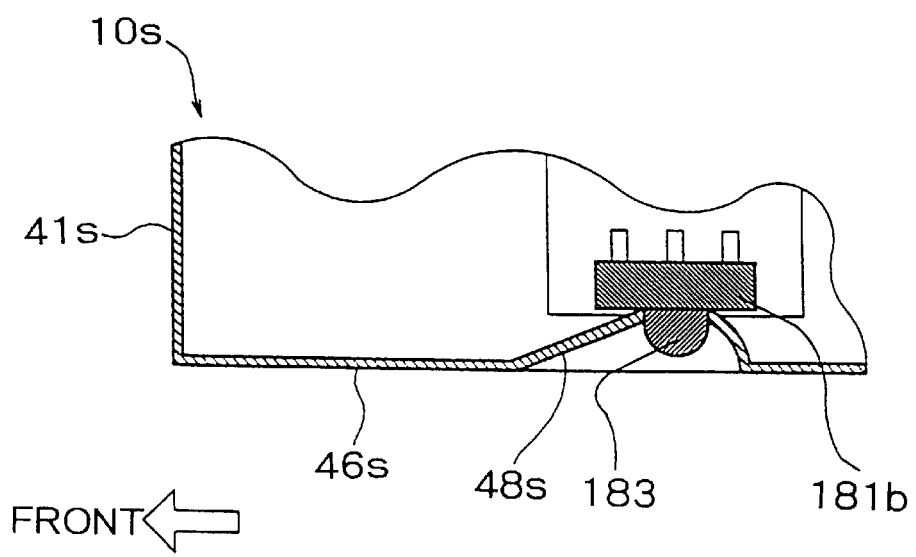
FIG. 27 is a cross-sectional view which is taken along A—A line of FIG. 26.

The main body 10s includes a main-body cover 40s for covering the CPU, various circuit boards, etc., plural infrared-ray receiving elements 181a, 181b, 181c, an indicator 199, speakers 24s, a floppy disk drive device 16s, a CD-ROM driving device 17s, and a PC card slot 18s. The main-body cover 40s has a front surface (connection end face) 41s, a rear surface, an upper surface 44s, a bottom surface and both side surfaces 46s, 47s. The front surface 41s of the main-body cover 40s is provided with the indicator 199 at the center upper portion thereof, and also provided with link pin insertion holes 43s and speakers 24s at both the sides thereof. An opening 42s (see FIG. 25) is formed at the center of the front surface 41s of the main-body cover 40s, and it is covered by an element protection cover 182. An infrared-ray receiving element 181a at the center portion is provided at the inside of the element protection cover 182. The element protection cover 182 is transparent to the infrared ray. The right side surface 46s of the main-body cover 40s is provided with the floppy disc driving device 16s, the CD-ROM driving device 17s and the PC card slot 18s. As shown in FIGS. 26 and 27, an opening 48s which is gradually expanded toward the outside is formed on the right side surface 46s of the main-body cover 40s. The light reception portion 183 of the infrared-ray receiving element 181b is exposed from the opening 48s. The expansion degree of the opening 48s is larger at the front surface side with respect to the infrared-ray receiving element 181b, and smaller at the rear surface side with respect to the infrared-ray receiving element 181b. In other words, the opening surface of the opening 48s at the front surface side with respect to the infrared-ray receiving element 181b is designed at a relatively large obtuse angle to the flat right side surface 46s, and the opening surface of the opening 48s at the rear surface side with respect to the infrared-ray receiving element 181b is designed at a right angle or an obtuse angle which is slightly larger than the right angle. That is, the opening 48s forms a signal directivity guide portion 48s for enhancing the reception performance of infrared-ray signals from the front and slightly-right side. As shown in FIG. 25, the signal directivity guide portion 48s for enhancing the reception performance of infrared-ray signals from the front and slightly-left side is formed on the left side surface 47s of the main-body cover 40s as in the case of the right side surface 46s, and the light reception portion of the infrared-ray receiving element 181 is exposed to this portion.

Figure 30:
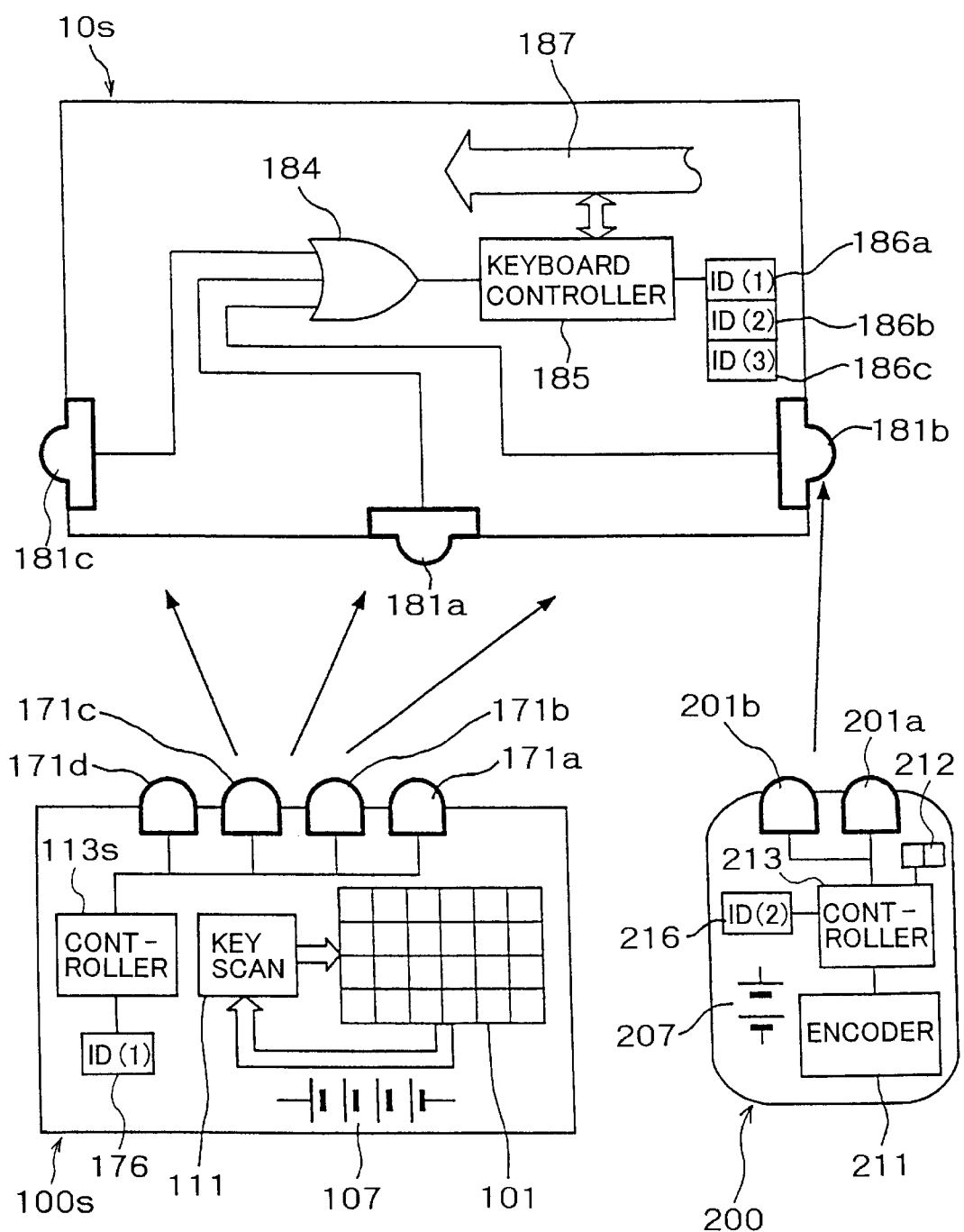
FIG. 30 is a circuit block diagram showing the information processor according to the second embodiment of the present invention.

As shown in FIG. 30, the main body further includes an OR gate 184 for subjecting electrical signals from three infrared-ray receiving elements 181a, 181b, 181c to logical OR, a keyboard controller (signal control means) 185 to which the signal from the OR gate 184 is input, identification code setting switches 186a, 186b, 186c for setting the identification codes of the keyboard 100, the mouse 200 and the other equipment respectively, and a bus 187 for signal connection with the CPU, the memory, etc.

The display device 30 includes a TFT display panel 31 and a display panel cover 34 for covering the TFT display panel 31, as shown in FIGS. 24 and 25.

Figure 28:
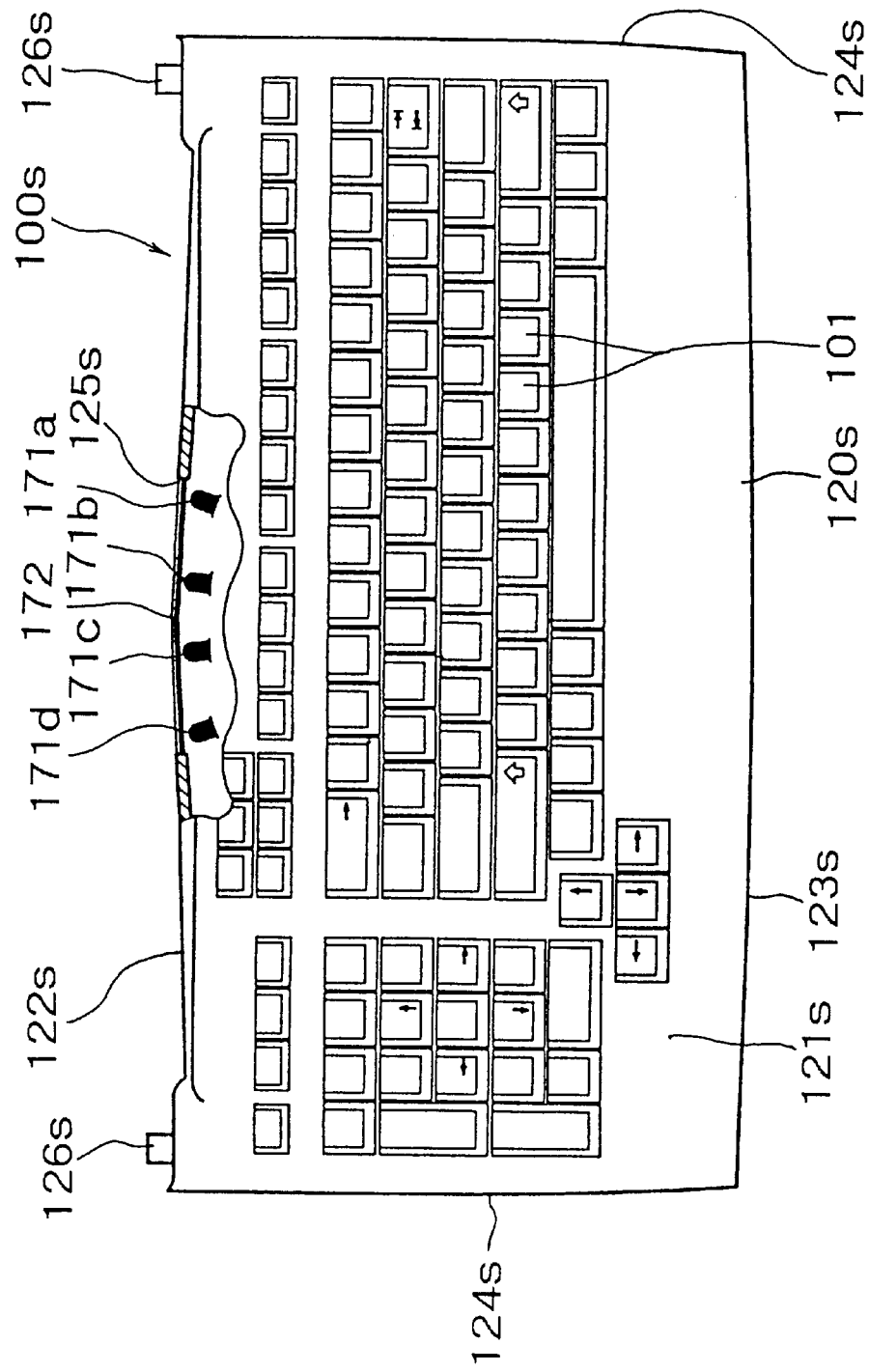
FIG. 28 is a plan view showing a keyboard according to the second embodiment of the present invention.
Figure 29:
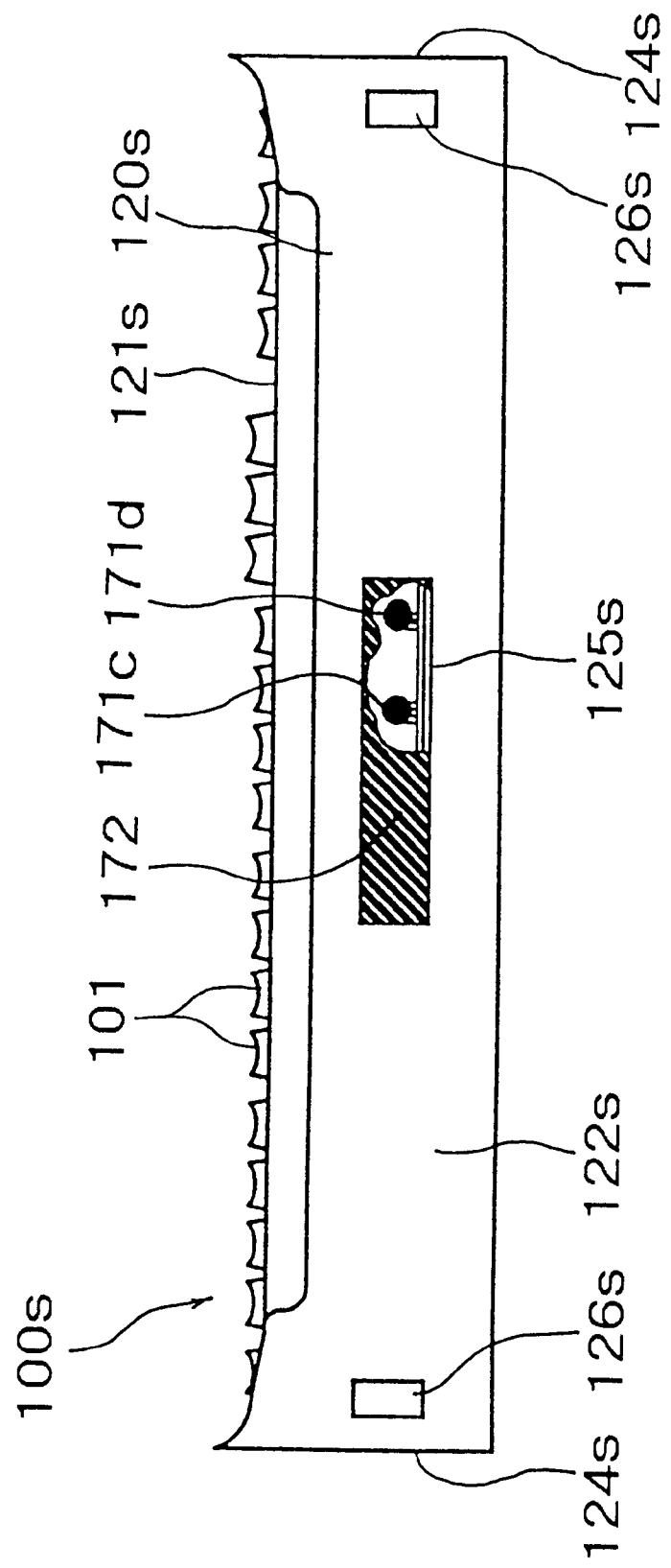
FIG. 29 is a rear view showing the keyboard according to the second embodiment of the present invention.

As shown in FIGS. 24 and 25, the keyboard 100sincludes plural keys 101, plural infrared-ray emission elements 171a, 171b, 171c, 171d, a keyboard cover 120s for covering the keyboard circuit board, etc., a battery accommodating portion 107s for accommodating a battery 107, and a main-body link mechanism 116s for linking the keyboard 100s to the main body 10s. The keyboard cover 120s includes an upper surface 121s, a rear surface (connection end face) 122s, a front surface 123s, both side surfaces 124s and a lower surface. The plural keys 101 are exposed from the upper surface 121s of the keyboard cover 120s. As shown in FIGS. 28 and 29, an opening 125s which is expanded in the lateral direction is provided at the center portion on the rear surface 122s of the keyboard cover 120s, and link pins 126s for linking the keyboard 100s to the main body 10s are provided at both the sides thereof. The opening 125s is covered by an element protection cover 172. Four infrared-ray emission elements 171a, 171b, 171c, 171d are arranged in the lateral direction so that the respective signal transmission main directions thereof are slightly displaced from one another.

As shown in FIG. 30, the keyboard 100s further includes a keyboard, circuit portion 111, a controller 113s for performing power source control, signal control, etc. of the plural infrared-ray emission elements 171a, 171b, 171c, 171d, and an identification code setting switch 176 for setting the identification code of the keyboard 100s.

As shown in FIG. 30, the mouse 200 includes plural infrared-ray emission elements 201a, 201b, a battery accommodating portion 207s for accommodating a battery 207, an encoder 211 for detecting the shift amount of the mouse 200 itself, an identification code setting switch 216 for setting the identification code of the mouse 200, a mouse cover 204 for accommodating these parts (see FIG. 25), and a click button 212. The click button 212 is provided on the upper surface of the mouse cover 204 as shown in FIGS. 24 and 25. An opening 205 is formed on the rear surface of the mouse cover 204. The opening 205 is covered by an element protection cover 202. The infrared-ray emission elements 201a and 201b are arranged in the lateral direction inside the element protection cover 202 so that the respective signal transmission main directions thereof are different from one another.

As shown in FIG. 25, the operation end of each of the identification setting switches 176, 216 of the keyboard 100 and the mouse 200 is exposed from the inner wall of each of the battery accommodating portions 107s, 207s, whereby these switches can be operated when the batteries 107 and 207 are accommodated in the battery accommodating portions 107s and 207s.

Next, the operation of the information processor of this embodiment and the usage mode thereof will be described.

When the user starts to use the information processor, he/she operates each of the identification code setting switches 176 and 216 of the keyboard 100s and the mouse 200 to set the identification codes thereof. In this embodiment, the identification code is expressed with three bits. For example, "001" is set as the identification code of the keyboard 100s and "010" is set as the identification code of the mouse. With respect to the main body 10s, the identification codes of the keyboard 100s and the mouse 200 are set by operating the keyboard identification code setting switch 186a and the mouse identification code setting switch 186b.

Figure 31:
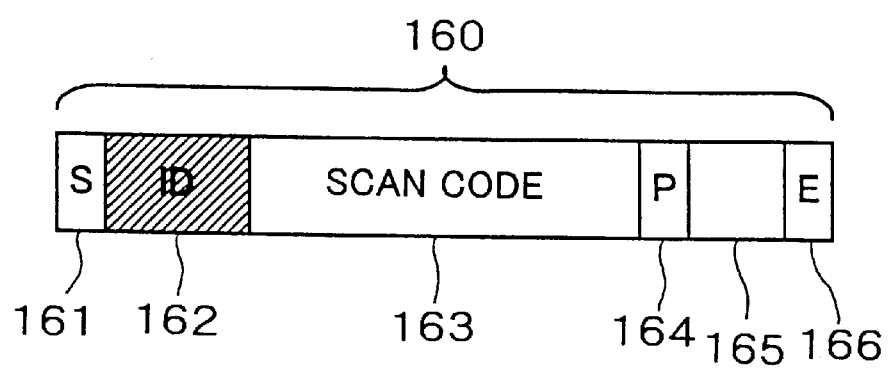
FIG. 31 is a diagram showing the data structure of radio signals according to the second embodiment of the present invention.

By operating the key 101 of the keyboard 100s when the main body 10s and the keyboard 100s are separated from each other, the infrared-ray signal corresponding to the key operation is transmitted from each infrared-ray emission element 171a, 171b, 171c, 171d of the keyboard 100s. As shown in FIG. 31, the data structure 160 of the infrared-ray signal includes a single start bit 161, a 3-bit keyboard identification code 162 in which the identification code is set by the operation of the identification code setting switch 176 of the keyboard 100s, a scan code 163 corresponding to the key operation, a single parity bit 164, a two-bit parameter 165 and a single end bit 166 (i.e., the infrared-ray signal comprises 16 bits in total). The number of bits of each area is an example, and it is not limited to the specific number. The infrared-ray signals having the same data are instantaneously transmitted from the respective infrared-ray emission elements 171a, 171b, 171c, 171d at several times. The transmission frequency is set in the parameter bit 165, and thus only the data of the parameter bit 165 out of the data of the respective infrared-ray signals which are transmitted over several times are changed every time. As described above, the infrared-ray signal having basically the same data are is transmitted several times for the following reason. That is, there is such a case that the main body cannot receive the data transmitted by the first transmission operation, but the main body can receive the data transmitted by a subsequent transmission operation, and thus the frequency at which the infrared-ray signal having the same data is transmitted is increased, and the communication problem is avoided as reliably as possible.

The infrared-ray signal transmitted from each infrared-ray emission element 171a, 171b, 171c, 171d of the keyboard 100s is received by any one of the infrared-ray receiving elements 181a, 181b, 181c of the main body 10s. The electrical signal from the infrared-ray receiving element 181a, 181b, 181c of the main body 10s is passed through the OR gate 184 and transmitted to the keyboard controller 185. Therefore, if one or two of the plural infrared-ray receiving elements 181a, 181b, 181c of the main body 10s receive the infrared-ray signal, this signal is transmitted to the keyboard controller 185. The keyboard controller 185 checks the identification code of this signal. If the identification code thus checked is coincident with the identification code set by the keyboard identification code setting switch 186a of the main body 10s, this signal is judged as a signal transmitted from the specific keyboard 100s, and transmitted through the bus 187 to the CPU, etc. If the signal transmitted from the OR gate 184 is coincident with the identification code set by the mouse identification code setting switch 186b or the preliminary identification code setting switch 186c of the main body 10s, the signal is judged as a signal transmitted from the specific mouse 200 or another specific equipment, and transmitted through the bus 187 to the CPU, etc. If the signal transmitted from the OR gate 184 is not coincident with the identification code which is set by any one of the keyboard identification code setting switch 186a, the mouse identification code setting switch 186b and the preliminary identification code setting switch 186c of the main body 10s, or the identification code cannot be recognized, this signal is neglected and thus it is not transmitted to the CPU, etc. When no identification code is set in the received signal and thus the identification code cannot be recognized, this signal may be judged as a signal from specific equipment in which no identification code is set, and transmitted to the CPU, etc.

When the keyboard is mounted on the main body 10s, as in the case of the first embodiment, it is preferable that only the light emission element 171 which confronts the light emission element 181a at the center of the main body 10s is driven, whereby the communication between the main body 10s and the keyboard 100s is made by performing the communication between the light emission element 181a at the center of the main body 10s and the light emission element 171b of the keyboard 100s which confronts the light emission element 181a.

When the mouse 200 is shifted or the click button 212 of the mouse 200 is operated, the infrared-ray signal corresponding to the mouse operation is transmitted from each infrared-ray emission element 201a, 201b of the mouse 200. As in the case of the data structure of the infrared-ray signal from the keyboard 100s as described above, the data structure of the infrared-ray signal contains a 3-bit mouse identification code in which the identification code is set by the operation of the identification code setting switch 216 of the mouse 200. As in the case of the keyboard 100s, the infrared-ray signal having the same data is instantaneously, transmitted from each infrared-ray emission element 201a, 201b several times.

The infrared ray signal transmitted from each infrared-ray emission element 201a, 201b of the mouse 200 is received by any one of the infrared-ray receiving element 181a, 181b, 181c of the main body 10s to be converted to an electrical signal and then the electrical signal is transmitted through the OR gate 184 to the keyboard controller 185. Therefore, if any one or two of the plural infrared-ray receiving elements 181a, 181b, 181c of the main body 10s, receive the infrared-ray signal, this signal is transmitted to the keyboard controller 185. As in the case of the signal from the keyboard 100s, the keyboard controller 185 of the main body 10s checks the identification code of the signal, and if the identification code thus checked is coincident with the identification code set by the mouse identification code setting switch 186b of the main body 10s, this signal is judged as a signal from the specific mouse 200, and then transmitted through the bus 187 to the CPU, etc.

Figure 32:
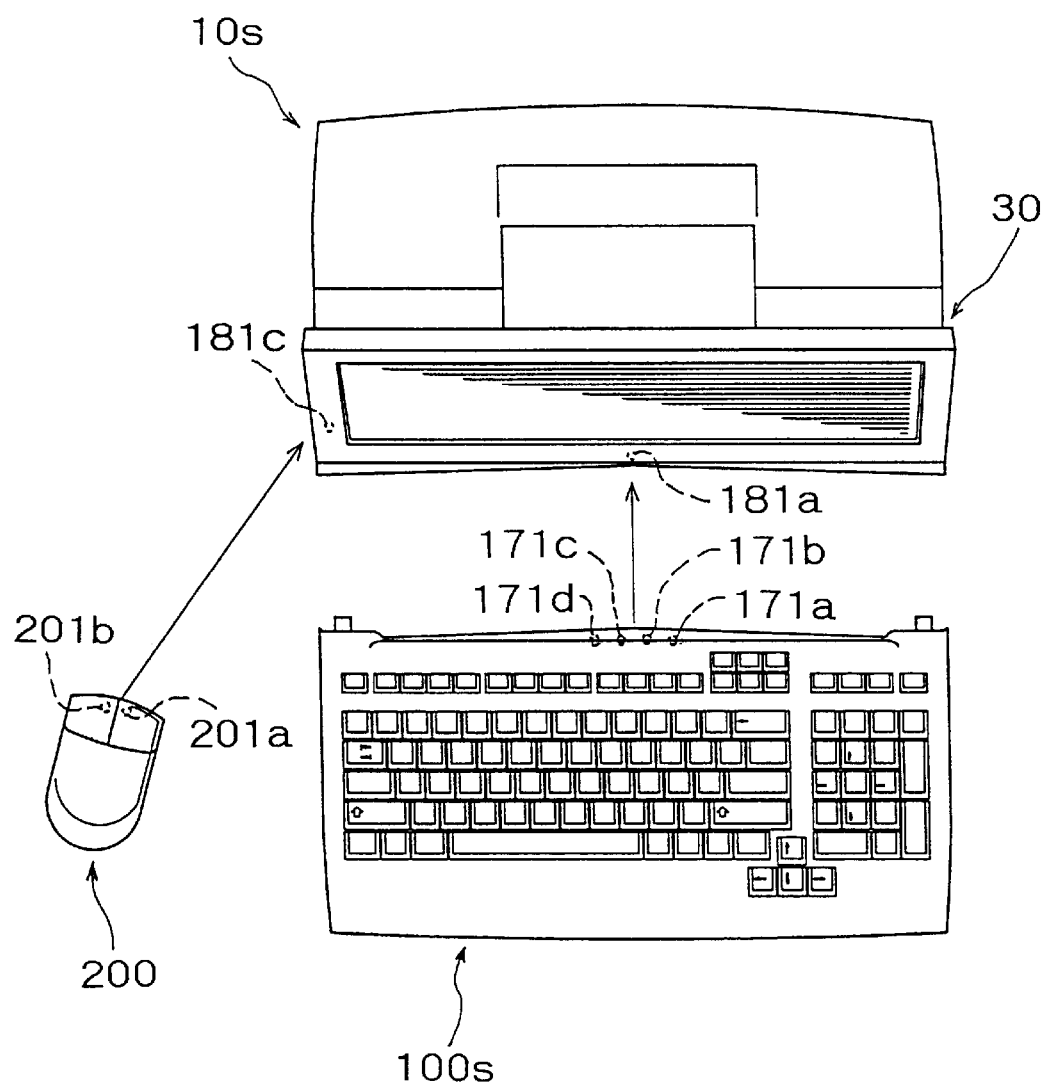
FIG. 32 is a diagram showing a usage mode of the information processor according to the second embodiment of the present invention.

As described above, according to this embodiment, the keyboard 100s and the mouse 200 are respectively provided with plural infrared-ray emission elements which are disposed to face in different directions, and also the main body 10s is provided with plural infrared-ray receiving elements which are disposed to face in different directions. Therefore, even when some foreign object exists between the main body 10s and the keyboard 100s or between the main body 10s and the mouse 200, there is a high probability that any light receiving element receives the infrared-ray signal emitted from any light emission element, and also substantially the same data are transmitted from the keyboard 100s and the mouse 200 several times, so that the communication problem between the main body 10s and the keyboard 100s and between the main body 10s and the mouse 200 can be suppressed to the minimum level. Particularly, the mouse 200 is used by being moved, and thus in some cases a foreign object or the like exists between the mouse 200 and the main body 10s or the facing direction of the mouse 200 with respect to the main body 10s is changed during the movement of the mouse 200. Therefore, the above structure is very effective in the communication between the mouse 200 and the main body 10s. Further, according to the above structure between the mouse 200 and the main body 10s, as shown in FIG. 32, the mouse 200 can be operated at the left side with respect to the keyboard 100s, and thus the freedom of using the mouse 200 is more enhanced for left-handed users.

Further, since the information processor of this embodiment has the above effects, business men can easily make presentations at their customer sites.

Figure 33:
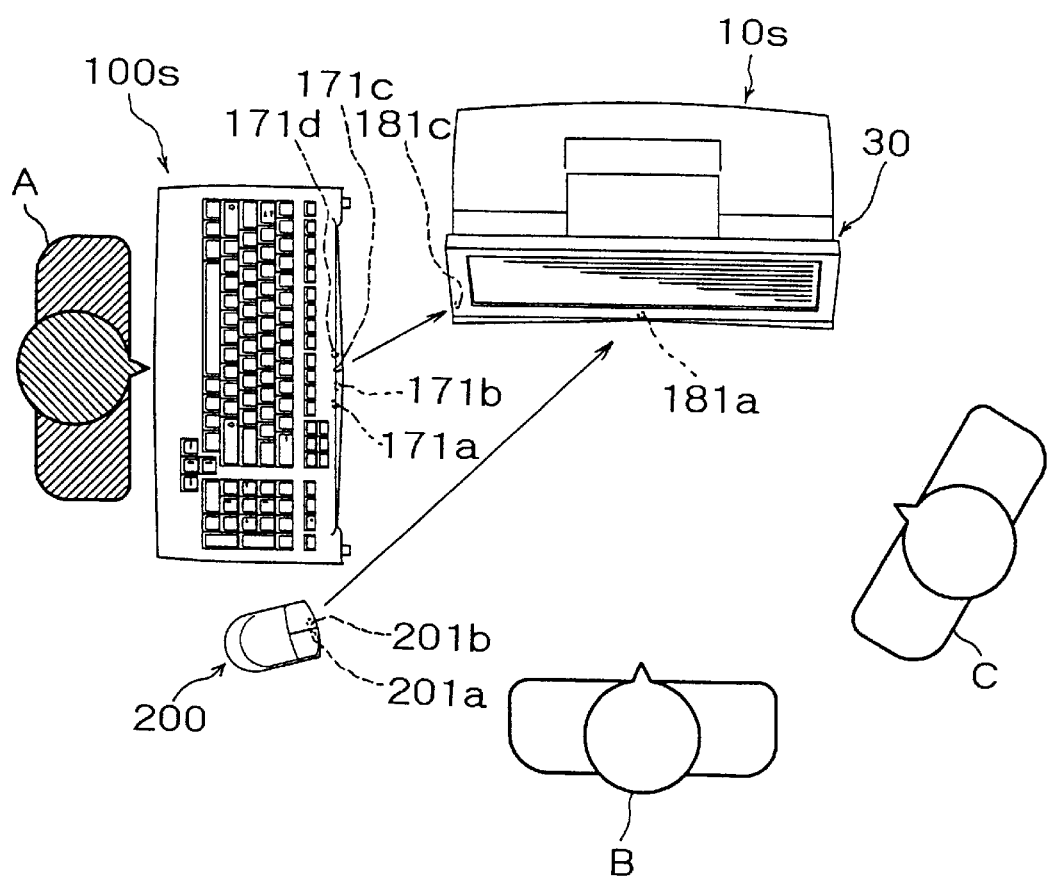
FIG. 33 is a diagram showing another usage mode of the information processor according to the second embodiment of the present invention.

For example, it is the normal situation in a presentation, etc. for customers B, C to be located in front of the display screen of the display device 30 and slightly to the right side with the main body 10s and the display device 30 located at the center, and a business man A and both the keyboard 100s and the mouse 200 to be operated by the business man A to be located at the left side of the main body 10s, as shown in FIG. 33. Even in such a case, the communication between the light emission element 171c having the main signal transmission direction displaced to a slightly left side in the plural light emission elements of the keyboard 100 and the light receiving element 181c at the left side in the plural light receiving elements of the main body 10s can be mainly ensured, and the communication between the light emission element 201b having the main signal transmission direction displaced to a slightly right side in the plural light emission elements of the mouse 200 and the light receiving element 181a at the center in the plural light receiving elements of the main body 10s can be mainly ensured.

That is, in this embodiment, no limitation is imposed on the positional relationship between the main body 10s and the keyboard 100s and the positional relationship between the main body 10s and the mouse 20.

Figure 34:
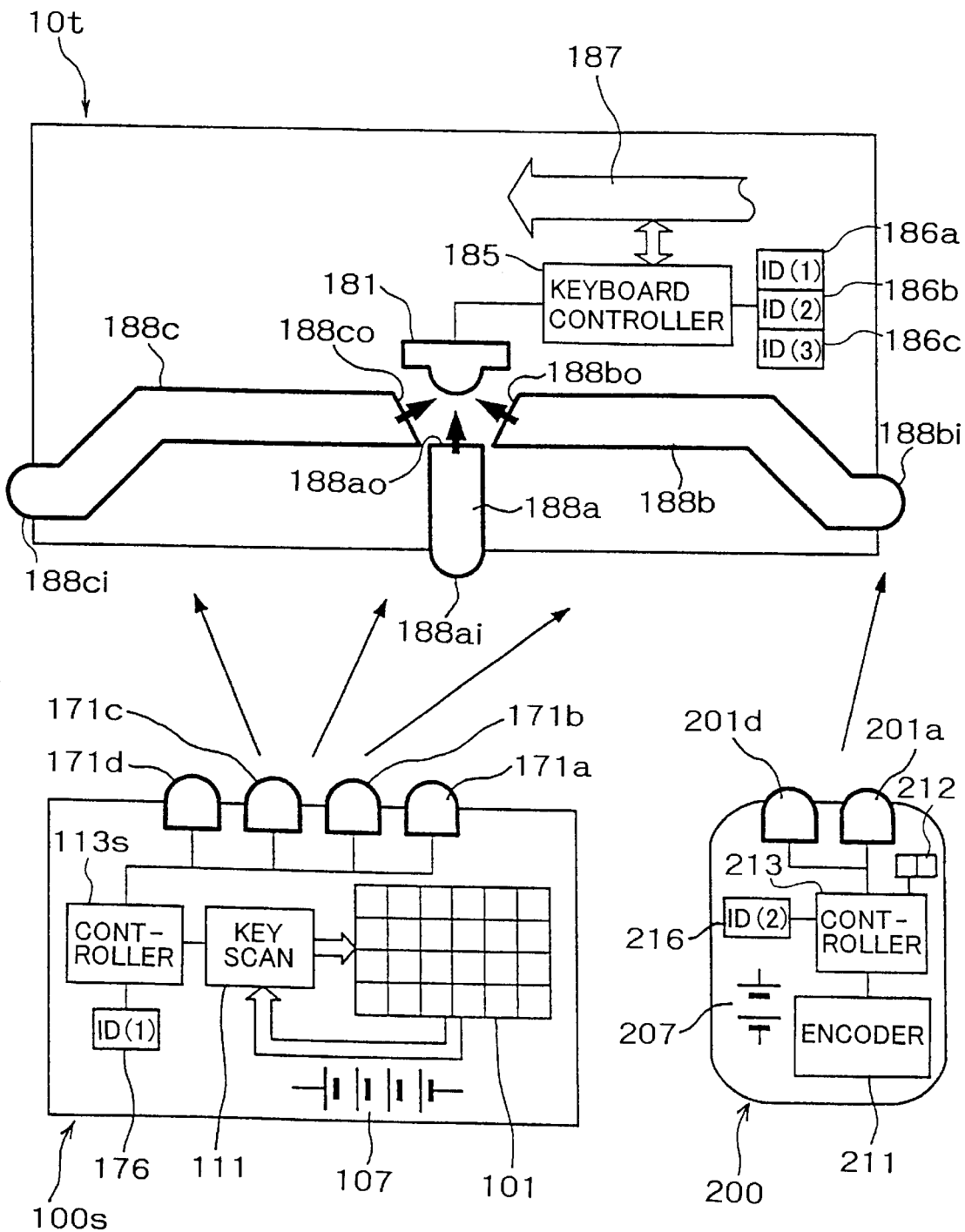
FIG. 34 is a circuit block diagram showing an information processor according to a third embodiment of the present invention.

Next, the information processor according to a third embodiment will be described with reference to FIG. 34.

The information processor according to the third embodiment is different from the second embodiment only in the mode of the signal reception means of the main body 10t, and the other construction of the main body 10t and the construction of the keyboard 100s and the mouse 200 are the same as the second embodiment.

In this embodiment, the signal reception means of the main body lot includes an infrared-ray receiving element 181, and three optical fibers 188a, 188b, 188c serving as optical guides. Each optical fiber 188a, 188b, 188c has one end portion serving as an optical input portion 188ai, 188bi, 188ci, and the other portion serving as an optical output portion 188ao, 188bo, 188co. The respective optical input portions 188ai, 188bi, 188ci of the three optical fibers 188a, 188b, 188c are exposed from the front surface, the right side surface and the left side surface of the main body cover, and the respective optical output portions 188ao, 188bo, 188co of the three optical fibers 188a, 188b, 188c are arranged so that the light beams output from the optical output portions are converged in one place. One infrared-ray receiving element 181 is provided at the place where the respective output portions 188ao, 188bo, 188co of the three optical fibers 188a, 188b, 188c are gathered.

Even when the signal reception means of the main body 10t is constructed as described above, the main body 10t can receive the infrared-ray signals at plural different positions, and thus the same effect as the second embodiment can be achieved.

Further, according to this embodiment, the three optical fibers 188a, 188b, 188c are used, but only one infrared-ray receiving element 181 is used. Therefore, only one driving circuit may be used for the infrared-ray receiving element 181. In addition, one infrared-ray receiving element 181 plays the same role as the OR gate 184 of the second embodiment, and thus no OR gate 184 is required. Therefore, the manufacturing cost can be more remarkably reduced compared with the second embodiment. Further, since the optical fiber can be freely adjusted in length and also relatively freely bent, the one infrared-ray receiving element and the driving circuit thereof can be located at proper positions, and the degree of freedom of the layout in the main-body case can be enhanced.

Next, the information processor according to a fourth embodiment of the present invention will be described with reference to FIGS. 35 and 36.

Figure 35:
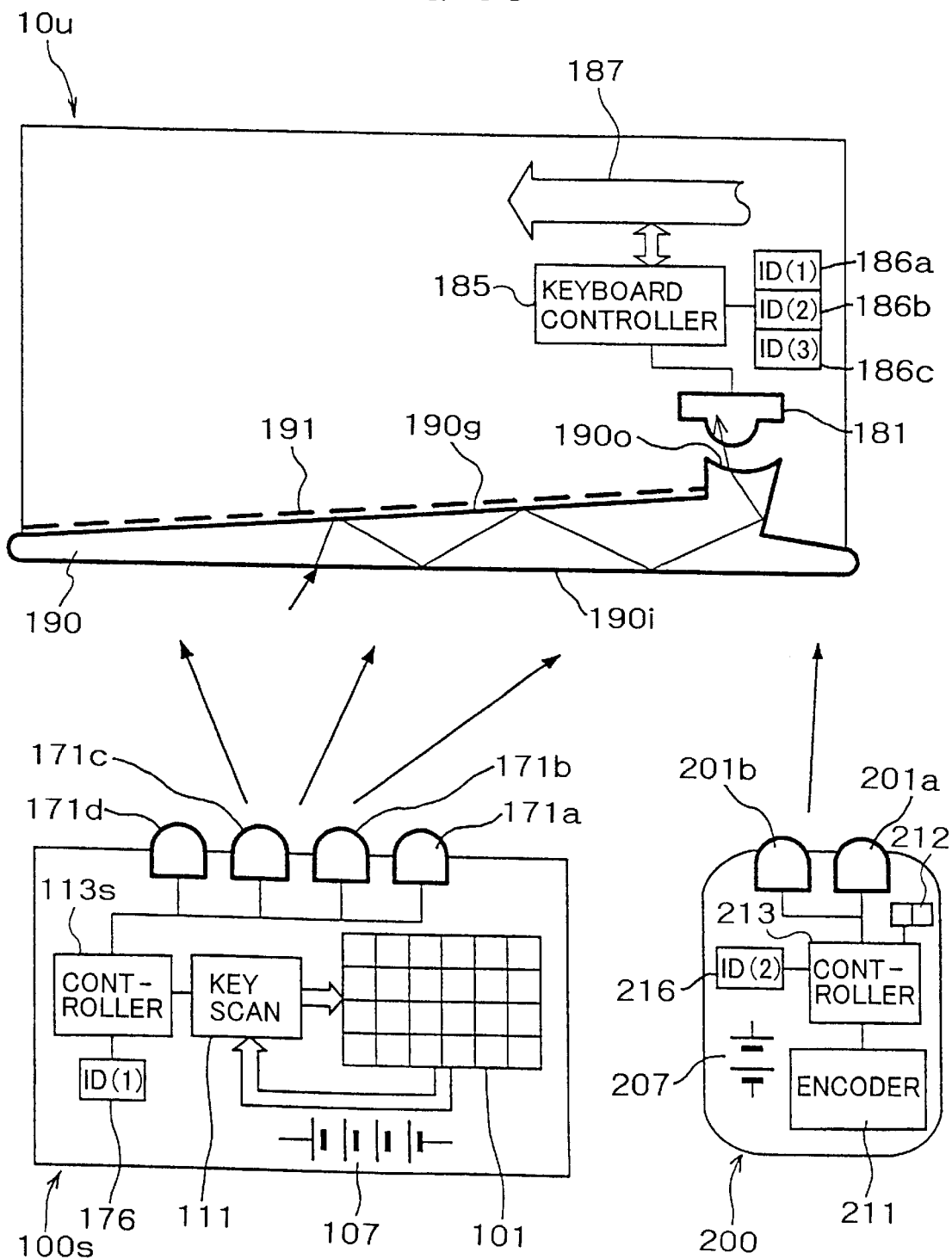
FIG. 35 is a circuit block diagram showing an information processor according to a fourth embodiment of the present invention.
Figure 36:
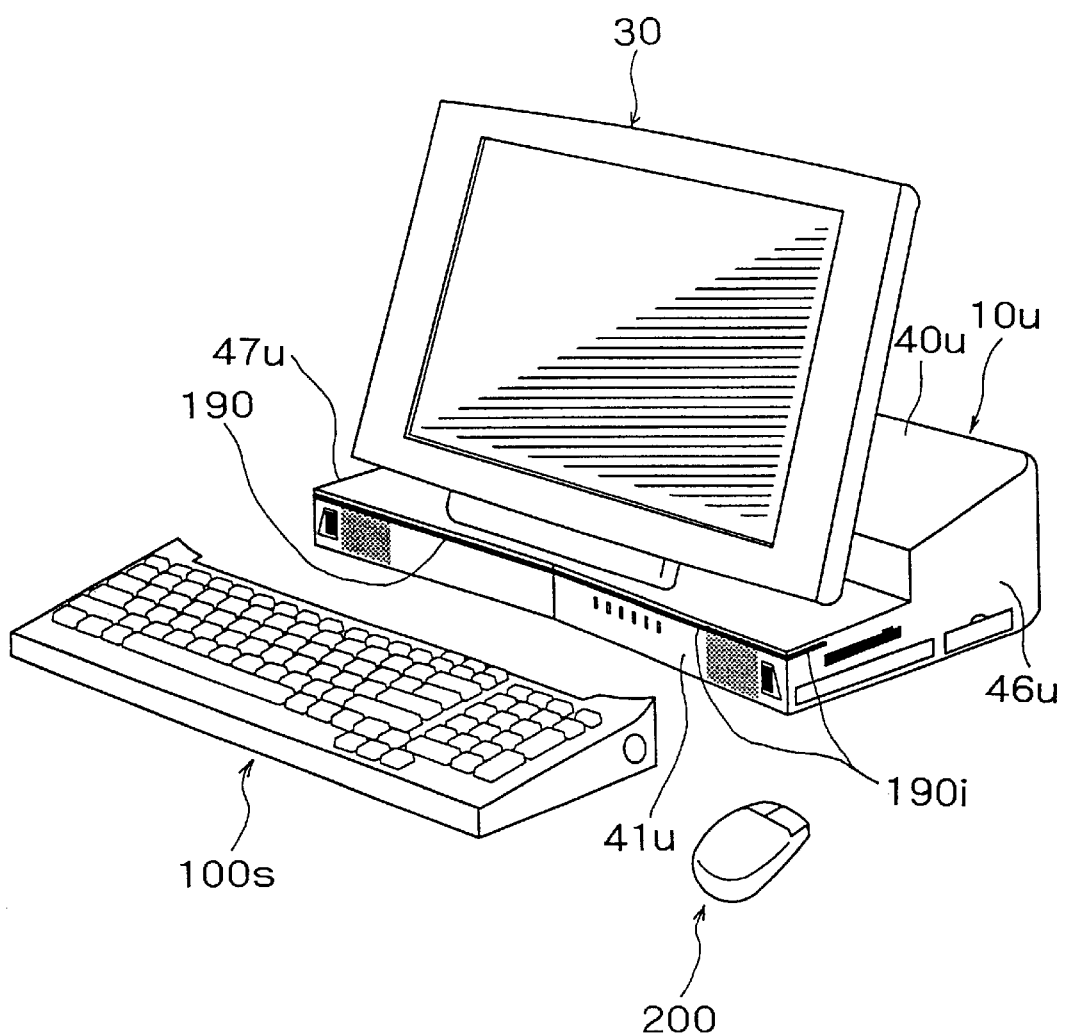
FIG. 36 is a perspective view showing the information processor according to the fourth embodiment of the present invention.

As shown in FIG. 35, the information processor of the fourth embodiment is different from the second embodiment only in the mode of the signal reception means of the main body 10u, and the other construction of the main body 10u and the construction of the keyboard 100s and the mouse 200 are the same as the second embodiment.

In this embodiment, the signal reception means of the main body 10u includes one infrared-ray receiving element 181 and one optical guide 190. The optical guide 190 includes a one-dimensionally expanded optical input portion 190i, an optical output portion 190o for outputting light from the optical input portion 190i, and an optical guide portion 190g for guiding all infrared-ray signals incident at any position of the optical input portion 190i to the optical output portion 190o. The infrared-ray receiving element 181 is provided at the optical output portion 190o. The optical guide portion 190g is provided with a reflection member 191 on the surface thereof. The optical input portion 191i is exposed from the front surface 41u of the main-body cover 40u and both the side surfaces 46u, 47u of the main-body cover 40u as shown in FIG. 36. When the infrared-ray signal transmitted from the keyboard 10s or the mouse 200 is input to any part of the optical input portion 190i of the optical guide 190 of the main body 10u, it is guided to the optical output portion 190o while being reflected on the boundary surface of the optical guide portion 190, and reaches the infrared-ray receiving element 181.

Even when the signal reception means of the main body 10u is constructed as described above, the main body 10u can receive the infrared-ray signals at plural different positions, and thus the same effect as the second embodiment can be achieved.

Further, according to this embodiment, as in the case of the third embodiment, only one infrared-ray receiving element is used, and thus only one driving circuit is required.

In addition, the same role of the OR gate 184 of the second embodiment can be taken by only one optical guide 190, and no OR gate is required, so that the circuit structure can be simplified.

Various types of optical guide may be used, for example, an optical guide having a two-dimensionally expanded optical input portion, an optical guide having an optical input portion whose section is designed in a saw tooth shape so that the infrared-ray signal incident from the optical input portion propagates in a specific direction.

Figure 37:
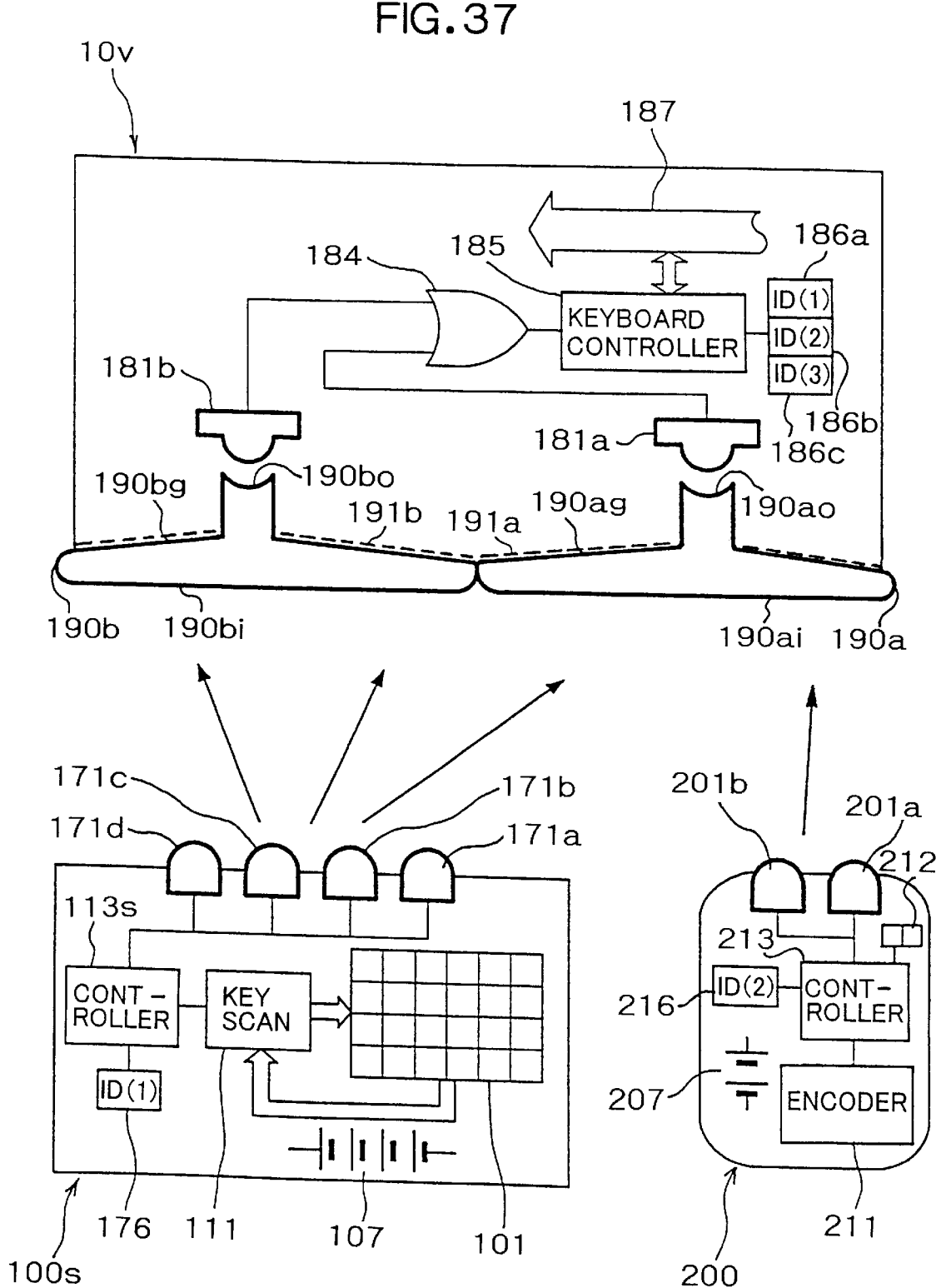
FIG. 37 is a circuit block diagram showing an information processor according to a fifth embodiment of the present invention.

Next, a fifth embodiment according to the information processor of the present invention will be described with reference to FIG. 37.

The information processor of this embodiment is a modification of the fourth embodiment, and the construction of the keyboard 100s and the mouse 200 is the same as the second embodiment.

In this embodiment, the signal reception means of the main body 10v includes two optical guides 190a, 190b, two infrared-ray receiving elements 181a, 181b, and one OR gate 184. Each of the two optical guides 190a, 190b includes a one-dimensionally expanded optical input portion 190ai, 190bi, an optical output portion 190ao, 190bo for outputting light from the optical input portion 190ai, 190bi, and an optical guide portion 190ag, 190bg for guiding all the infrared-ray signals incident at any position of the optical input portion 190ai, 190bi to the optical output portion 190ao, 190bo as in the case of the optical guide 190 of the fourth embodiment. The optical guide portion 190ag, 190bg is coated with a reflection member 191a, 191b on the surface thereof. The optical input portion 191i of one optical guide 190a is exposed from the front surface and the right side surface of the main-body cover, and the optical input portion 190bi of the other optical guide 190 is exposed from the front surface and the left side surface of the main-body cover. The infrared-ray receiving element 181a, 181b is provided at the optical output portion 190ao, 190bo of the optical guide 190a, 190b. The OR gate 184 is provided at the output side of the two infrared-ray receiving elements 181a, 181b. When the infrared-ray signal transmitted from the keyboard 100s or the mouse 200 is input to any part of the optical input portion 190ai, 190bi of any optical guide 190a, 190b of the main body 10v, it is guided to the optical output portion 190ao, 190bo while being reflected from the boundary surface of the optical guide portion 190ag, 190bg, and reaches the infrared-ray receiving element 181a, 181b. The electrical signal from each infrared-ray receiving element 181a, 181b is passed through the OR gate 184 and reaches the keyboard controller 185.

Even when the signal reception means of the main body 10u is constructed as described above, the main body 10u can receive the infrared-ray signals at plural different positions, and thus the same effect as the second embodiment can be obtained.

In this embodiment, the two infrared-ray elements 181a, 181b and one OR gate 184 are used as well as the two optical guides 190a, 190b. However, it may be adopted that the optical output portions 191ao, 190bo of the optical guides 190a, 190b are gathered at one place, and one infrared-ray element is provided there. Alternatively, it may be adopted that an optical fiber is connected to each optical output portion 190ao, 190bo of each optical guide 190a, 190b, the end portions of the optical fibers are gathered at one place and one infrared-ray element is provided there.

Figure 38:
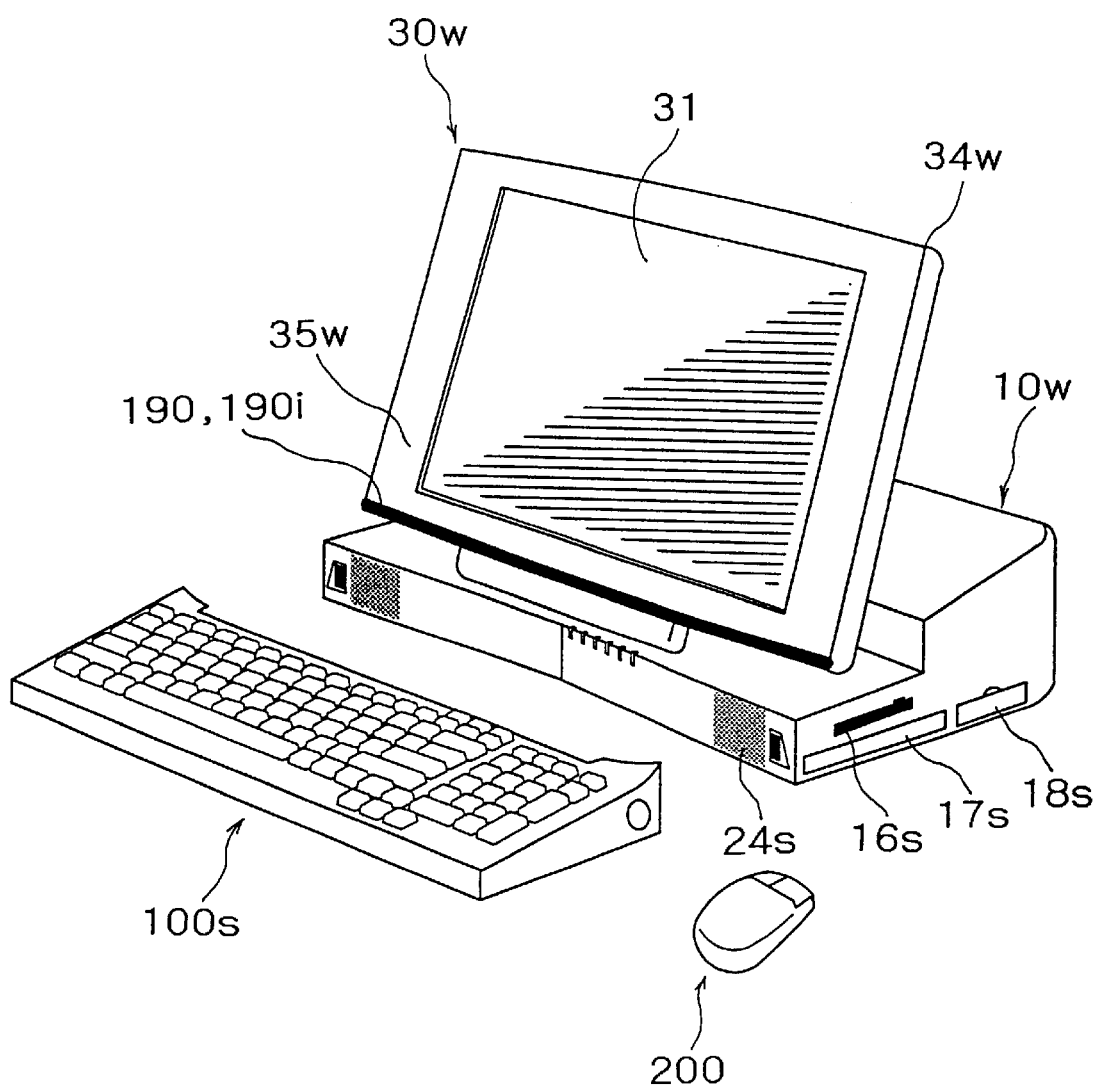
FIG. 38 is a perspective view showing an information processor according to a sixth embodiment of the present invention.

In all the above-described embodiments, the reception means for the infrared-ray signals from the keyboard or the mouse is provided to the main body. However, as shown in FIG. 38, it may be provided to a display device 30w which is swingably mounted on the main body. In this case, it is preferable that the infrared-ray receiving portion or the infrared-ray optical input portion 190i of the reception means is mainly provided to the front surface 35w of the plural surfaces of the display panel cover 34w, which is located at the same side as the display face of the display panel 31.

Figure 39:
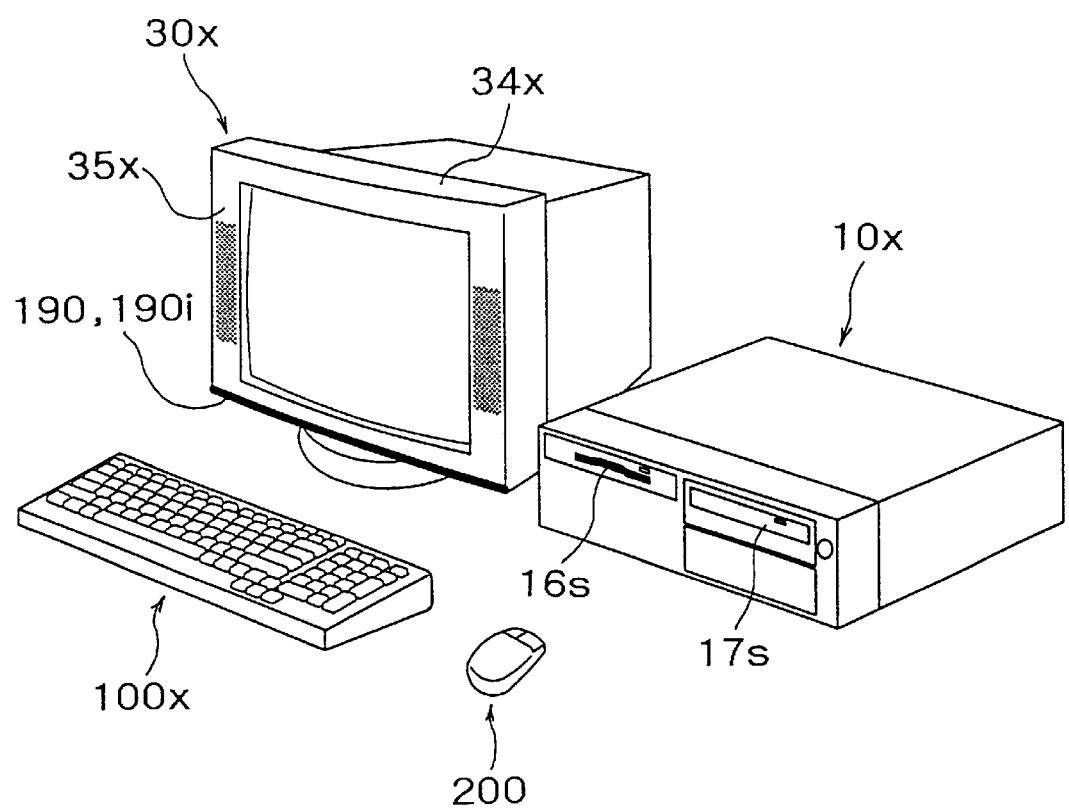
FIG. 39 is a perspective view showing the information processor according to the sixth embodiment of the present invention.

Further, in all of the above-described embodiments, the keyboard is detachably mounted on the main body, and the display device is swingably secured to the main body. However, the present invention may be applied to a separate type information processor in which a main body 10x, a display device 30x and a keyboard 100x are perfectly separated from one another as shown in FIG. 39. In this case, the display device 30x is more frequently located so as to face the keyboard 100x than when the main body 10x is located so as to face the keyboard 100x, and thus the reception means 190 is preferably provided to the display device 30x (rather than the main body 10x). In this case, the infrared-ray receiving portion or the infrared-ray optical input portion 190i of the reception means is preferably provided to the front surface 35x of the display cover 34x.

In both the cases shown in FIGS. 38 and 39, the optical guide 190 of the third embodiment is used. In place of this optical guide 190, plural infrared-ray receiving elements may be used as in the case of the second embodiment.

What is claimed is:

1. An information processor comprising a main body having a CPU for performing various data processing, an input device for inputting data to the main body and a display device for displaying the data on a screen in accordance with an instruction from the main body, wherein said input device includes:

plural input-side transmission means which transmit radio signals and are disposed at different positions so as to face in different directions; and input-side identification code setting means for setting an identification code of said input device in the signals to be transmitted from said input-side transmission means, wherein:

one of said main body and said display device includes:
   body-side reception means for receiving the radio signals from said input-side transmission means; and
   body-side identification code setting means for setting the identification code of said input device, and said main body includes signal control means for judging whether the same identification code as set by said body-side identification code setting means exists in the radio signals received by said body-side reception means, and processing the radio signals received by said body-side reception means when the same code exists.

2. The information processor as claimed in claim 1, further comprising a plurality of body-side reception means which are provided at different positions from one another.

3. The information processor as claimed in claim 2, wherein:

said main body has a body cover having a front surface and right and left side surfaces, and said plural body-side reception means are provided on the front surface, the left side surface and the right side surface, respectively.

4. The information processor as claimed in claim 3, wherein a signal directivity guide portion is provided to each of the left side surface and the right side surface of said body cover to enhance the reception performance of each of said body-side reception means provided to the left side surface and the right side surface for the radio signals transmitted from the front-surface side direction.

5. The information processor as claimed in claim 2, wherein:
said display device has a display screen and a display device cover which covers the edge of said display screen and has a front surface at the same side as said display screen, and
at least one of said plural body-side reception means is provided to the front surface of said display device cover.

6. The information processor as claimed in claim 1, wherein:
said plural input-side transmission means are input-side optical signal transmission means for transmitting optical signals as the radio signals,
said body-side reception means is body-side optical signal reception means for receiving the optical signals as the radio signals, and
said body-side optical signal reception means includes an optical guide having an optical input portion for receiving the optical signal and an optical output portion for outputting the optical signals from said optical input portion, and a light receiving element for receiving the optical signals from the optical output portion of said optical guide and converting the optical signals to electrical signals.

7. The information processor as claimed in claim 6, wherein said optical guide is designed so that said optical input portion is at least one-dimensionally expanded, and the optical signals received at any position of the optical input portion is guided to the optical output portion.

8. The information processor as claimed in claim 6, wherein:
said body-side optical signal reception means has a plurality of optical guides,
the respective optical input portions of said plural optical guides are located at different positions from one another, and
each of the optical output portions of said plural optical guides is located so that said light receiving element can receive the optical signal from each optical output portion.

9. The information processor as claimed in claim 7, wherein:
said main body includes a body cover having a front surface, and
said at least one-dimensionally-expanding optical input portion of said optical guide is exposed from at least the front surface of said body cover.

10. The information processor as claimed in claim 7, wherein:
said display device includes a display screen and a display device which covers the edge of said display screen and has a front surface formed at the same side as said display screen, and
said at least one-dimensionally expanding optical input portion of said optical guide being exposed from at least the front surface of said display device cover.

11. The information processor as claimed in claim 1, wherein said input device has signal control means for adding data corresponding to a series of operations from the external of said input device into the radio signals transmitted from said plural input-side transmission means, and controlling said respective input-side transmission means to transmit the radio signals containing the same data at plural times.

12. The information processor as claimed in claim 1, wherein:
said input device is a keyboard,
each of said main body and said keyboard has a connection end face through which said main body and said keyboard are mutually connected to each other,
the connection end face of said main body is provided with said body-side reception means,
normal-use transmission means which is one of said plural input-side transmission means is provided to the connection end of said keyboard so as to confront said body-side reception means when said keyboard is connected to said main body, and
said keyboard includes connection detection means for detecting whether the connection with said main body is established, and power source control means for allowing only said normal-use transmission means in said plural input-side transmission means to perform signal transmission when the connection with said main body is detected by said detection means and allowing all said input-side transmission means to perform the signal transmission when the disconnection from said main body is detected by said connection detection means.

13. The information processor as claimed in claim 1, wherein:
said input device is a keyboard, and
each of said main body and said keyboard has a connection end face through the connection is established therebetween, wherein:
said main body includes a power source circuit for supplying power to various types of operating components containing said CPU and a power supply terminal for supplying power from said power source circuit to the keyboard,
said keyboard includes a primary battery accommodating portion in which a primary battery for supplying power to the various types of operating components mounted in said keyboard is accommodated, a secondary battery which is chargeable and serves to supply power to the various types of operating components mounted in said keyboard, a power receiving terminal connected to said secondary battery, said power receiving terminal being connected to said power supply terminal of said main body when the connection with said main body is established, switching means for allowing only one of said primary battery and said secondary battery to supply the power to the various types of operating components mounted in said keyboard, and power source control means for instructing said switching means to preferentially use a predetermined one of said primary battery and said secondary battery, and detecting a power amount stocked in each of said primary battery and the secondary battery, and instructing said switching means to use the other battery when the power amount of the predetermined one battery is below a predetermined power amount.

14. An information processor comprising a main body having a CPU for performing various types of processing, an input device for inputting data to the main body and a display device for performing a screen display in accordance with an instruction from the main body, wherein:
one of said input device and said main body or said display device includes:
one or more first transmission/reception means each comprising transmission means for transmitting signals under the radio condition and reception means which receives the signal under the radio condition and is provided so as to be integral with or adjacent to said transmission means; and
signal control means for controlling said transmission means of said first transmission/reception means so that when the reception means of any one of said one or more transmission/reception means receives a radio signal, said transmission means of said transmission/reception means concerned is controlled to transmit a reception establishment signal in cooperation with said reception means, and
the other of said input device and said main body or said display device includes:
a plurality of second transmission/reception means each comprising transmission means for transmitting signals under radio conditions, and reception means which receives signals under radio conditions and is provided so as to be integral with or adjacent to said transmission means; and
power source control means for controlling power supply to the transmission means of said plural second transmission/reception means so that when at least one of said plural second transmission/reception means receives the reception establishment signal, it is judged according to a predetermined rule that communication is established between one of said second transmission/reception means and said first transmission/reception means transmitting the reception establishment signal, and the power supply to said transmission means of the second transmission/reception means concerned is continued while the power supply to the other transmission means of said second transmission/reception means is cut off.

15. The information processor as claimed in claim 14, wherein the reception establishment signal is the same as the signal transmitted from said second transmission/reception means.

16. The information processor as claimed in claim 14, wherein the rule for the reception of the reception establishment signal by said plural second transmission/reception means is determined so that one of said second plural transmission/reception means which receives the earliest reception establishment signal or receives the strongest reception establishment signal is set as said second transmission/reception means which establishes the communication with said first transmission/reception means.

17. The information processor as claimed in claim 14, wherein said second transmission/reception means is further provided with signal control means, and when under the condition that the communication establishment between one second transmission/reception means and said first transmission/reception means is judged by said power source control means, another second transmission/reception means receives a radio signal from another equipment, said signal control means independently controls each of signals which are transmitted/received to/from both the one second transmission/reception means and the other second transmission/reception means which receives the radio signal from the other equipment.

18. The information processor as claimed in claim 17, wherein when under the condition that the communication establishment between one second transmission/reception means and said first transmission/reception means is judged by said power source control means and another second transmission/reception means receives a radio signal from another equipment, so that it is required to transmit signals from said transmission means of the other transmission/reception means to the other equipment, said power control means is made to re-start the power supply to said transmission means of the other second transmission/reception means.

19. The information processor as claimed in claim 14, wherein at least one of said plural second transmission/reception means is provided so as to be capable of being made to face in different directions.

20. The information processor as claimed in claim 14, wherein said second transmission/reception means has identification code setting means for setting an identification code thereof in a signal to be transmitted therefrom, and said first transmission/reception means includes identifying code setting means for setting the identification code of said second transmission/reception means, wherein said signal control means of said first transmission/reception means judges whether the same identification code as set by said identification code setting means of said first transmission/reception means exists in the signal received by said first transmission/reception means, and if the same identification code exists, said signal control means processes the signal received by said first transmission/reception means and controls said first transmission/reception means to transmit the reception establishment signal.

21. The information processor as claimed in claim 14, wherein:
said input device is a keyboard, and
each of said main body and the keyboard has a connection end face through which the connection therebetween is made,
the connection end face of said main body is provided with said transmission/reception means,
the connection end face of said keyboard is provided with one normal-use transmission/reception means of said plural input-side transmission/reception means which is provided so as to confront said transmission/reception means of the main,body when said keyboard is connected to said main body, and
said keyboard includes:
connection detection means for detecting whether the connection with said main body is established; and
power source control means for controlling said plural transmission/reception means so that only said normal-use transmission/reception means of said plural transmission/reception means is allowed to perform signal transmission when the connection with said main body is detected by said detection means, and all of said plural transmission/reception means are allowed to perform signal transmission when the disconnection from said main body is detected by said connection detection means.

22. The information processor as claimed in claim 14, wherein:
said input device is a keyboard, and
each of said main body and said keyboard has a connection end face through which the connection therebetween is made, wherein:
said main body includes:

a power source circuit for supplying power to various types of operating components containing said CPU and a power supply terminal for supplying power from said power source circuit to said keyboard, said keyboard includes:
- a primary battery accommodating portion in which a primary battery for supplying power to the various types of operating components mounted in said keyboard is accommodated,
- a secondary battery which is chargeable and serves to supply power to the various types of operating components mounted in said keyboard,
- a power receiving terminal connected to said secondary battery, said power receiving terminal being connected to said power supply terminal of said main body when the connection with said main body is established,
- switching means for allowing only one of said primary battery and said secondary battery to supply the power to the various types of operating components mounted in said keyboard, and
- power source control means for instructing said switching means to preferentially use a predetermined one of said primary battery and said secondary battery, and detecting a power amount stocked in each of said primary battery and said secondary battery, and instructing said switching means to use the other battery when the power amount of the predetermined one battery is below a predetermined power amount.

23. The information processor as claimed in claim 1, wherein said input device is a keyboard.

24. The information processor as claimed in claim 14, wherein said input device is a keyboard.

25. The information processor as claimed in claim 1, wherein said input, device is a mouse.

26. The information processor as claimed in claim 14, wherein said input device is a mouse.

27. An input device for inputting data to a main body having a CPU for performing data processing, comprising:
- plural input-side transmission means which serve to transmit a radio signal, are located at different positions and face in different directions; and
- input-side identification code setting means for setting the identification code of said input device in the radio signal transmitted from said input-side signal transmitting means.

28. The input device as claimed in claim 27, wherein said input device is a keyboard.

29. The input device as claimed in claim 27, wherein said input device is a mouse.

30. An input device for inputting data to a main body having a CPU for performing various data processing, comprising:
- plural transmission/reception means each comprising transmission means for transmitting a radio signal and reception means which receives the signal under radio conditions and is provided integrally with or adjacently to said transmission means; and
- power source control means for controlling power supply to said transmission/reception means so that when at least one of said plural transmission/reception means receives a reception establishment signal from said main body, it is judged according to a predetermined rule that communication is established between one of said transmission/reception means and said main body, and the power supply to said transmission means of the transmission/reception means concerned is continued while the power supply to the other transmission means of said transmission/reception means is cut off.

31. The input device as claimed in claim 30, wherein said input device is a keyboard.

32. The input device as claimed in claim 30, wherein said input device is a mouse.

33. A display device for performing screen display corresponding to an operation of an input device, comprising:
- plural optical guides each comprising an optical input portion for receiving an optical signal from said input device and an optical output portion for outputting the optical signal from said optical input portion; and
- a light receiving element for receiving the optical signal from each of said optical output portion of said plural optical guides to convert the optical signal to an electrical signal.

34. A display device for performing screen display corresponding to an operation of an input device, comprising:
- an optical guide having at least one-dimensionally expanding optical input portion for receiving an optical signal from said input device, and an optical output portion for outputting the optical signal from said optical input portion; and
- a light receiving element for receiving the optical signal from said optical output portion of said optical guide to convert the optical signal to an electrical signal.

35. A display device for performing screen display corresponding to an operation of an input device, comprising:
- plural transmission/reception means each comprising transmission means for transmitting a radio signal and reception means which receives the signal under radio conditions and is provided integrally with or adjacent to said transmission means; and
- power source control means for controlling power supply to said transmission/reception means so that when at least one of said plural transmission/reception means receives a reception establishment signal from said input device, it is judged according to a predetermined rule that communication is established between one of said transmission/reception means and said input device, and the power supply to said transmission means of the transmission/reception means concerned is continued while the power supply to the other transmission means of said transmission/reception means is cut-off.

\* \* \* \* \*